US007721307B2

(12) United States Patent
Hendricks et al.

(10) Patent No.: US 7,721,307 B2
(45) Date of Patent: May 18, 2010

(54) METHOD AND APPARATUS FOR TARGETING OF INTERACTIVE VIRTUAL OBJECTS

(75) Inventors: John S. Hendricks, Potomac, MD (US); Alfred E. Bonner, Bethesda, MD (US); John S. McCoskey, Castle Rock, CO (US); Michael L. Asmussen, Oak Hill, VA (US)

(73) Assignee: Comcast IP Holdings I, LLC, Wilmington, DE (US)

( * ) Notice: Subject to any disclaimer, the term of this patent is extended or adjusted under 35 U.S.C. 154(b) by 1642 days.

(21) Appl. No.: 09/975,312

(22) Filed: Oct. 12, 2001

(65) Prior Publication Data

US 2002/0112249 A1 Aug. 15, 2002

Related U.S. Application Data

(63) Continuation-in-part of application No. 09/597,893, filed on Jun. 19, 2000, now Pat. No. 7,168,084.

(51) Int. Cl.
*H04N 7/10* (2006.01)
*H04N 7/025* (2006.01)
*H04H 60/33* (2008.01)
(52) U.S. Cl. .............................. 725/34; 725/9
(58) Field of Classification Search ............ 725/34, 725/36
See application file for complete search history.

(56) References Cited

U.S. PATENT DOCUMENTS 4,331,974 A 5/1982 Cogswell et al. ............ 725/34
4,641,205 A 2/1987 Beyers, Jr.
4,706,121 A 11/1987 Young
4,896,354 A 1/1990 Inagaki et al.
4,930,160 A 5/1990 Vogel ........................... 725/30
5,003,591 A 3/1991 Kauffman et al.
5,142,690 A 8/1992 McMullan, Jr. et al.
5,155,591 A 10/1992 Wachob ........................ 725/35
5,270,809 A 12/1993 Gammie et al.
5,283,639 A 2/1994 Esch et al.

(Continued)

FOREIGN PATENT DOCUMENTS

EP 0620689 A1 10/1994

(Continued)

OTHER PUBLICATIONS

Pereira, F., et al., "MGEG-4—Opening new frontiers to broadcast services", EBU Technical Review, Spring 1999, pp. 28-35.

(Continued)

*Primary Examiner*—Dominic D Saltarelli
(74) *Attorney, Agent, or Firm*—Banner & Witcoff, Ltd.

(57) ABSTRACT

A method and an apparatus are used to target interactive virtual objects to subscribers in a television delivery system. Programs are selected and virtual object locations are defined in the selected programs. The virtual objects available for targeting are categorized and the categories are correlated to subscriber information to determine the optimum targeting of the virtual objects. The invention uses upstream data reception hardware, databases and processing hardware and software, and corresponding features in the televisions to accomplish these functions.

71 Claims, 39 Drawing Sheets

U.S. PATENT DOCUMENTS

| | | | |
|---|---|---|---|
| 5,303,361 A | | 4/1994 | Colwell et al. |
| 5,317,391 A | | 5/1994 | Banker et al. |
| 5,361,091 A | | 11/1994 | Hoarty et al. |
| 5,374,951 A | | 12/1994 | Welsh |
| 5,446,490 A | | 8/1995 | Blahut et al. |
| 5,467,402 A | | 11/1995 | Okuyama et al. |
| 5,515,098 A | | 5/1996 | Carles ......................... 725/35 |
| 5,550,863 A | | 8/1996 | Yurt et al. |
| 5,588,104 A | | 12/1996 | Lanier et al. |
| 5,588,139 A | | 12/1996 | Lanier et al. |
| 5,600,364 A | * | 2/1997 | Hendricks et al. ............... 725/9 |
| 5,621,456 A | | 4/1997 | Florin et al. |
| 5,635,989 A | | 6/1997 | Rothmuller |
| 5,636,346 A | * | 6/1997 | Saxe ........................... 705/1 |
| 5,715,315 A | | 2/1998 | Handelman |
| 5,721,956 A | | 2/1998 | Martin et al. |
| 5,724,521 A | | 3/1998 | Dedrick |
| 5,727,065 A | | 3/1998 | Dillon |
| 5,729,471 A | | 3/1998 | Jain et al. |
| 5,737,533 A | | 4/1998 | de Hond |
| 5,745,710 A | | 4/1998 | Clanton, III et al. |
| 5,754,938 A | | 5/1998 | Herz et al. |
| 5,774,122 A | | 6/1998 | Kojima et al. |
| 5,818,511 A | | 10/1998 | Farry et al. |
| 5,819,301 A | | 10/1998 | Rowe et al. |
| 5,844,890 A | | 12/1998 | Delp et al. |
| 5,848,396 A | | 12/1998 | Gerace |
| 5,917,537 A | | 6/1999 | Lightfoot et al. |
| 5,929,849 A | | 7/1999 | Kikinis ....................... 725/113 |
| 5,991,735 A | | 11/1999 | Gerace |
| 6,119,154 A | | 9/2000 | Weaver et al. |
| 6,144,944 A | * | 11/2000 | Kurtzman et al. ............. 705/14 |
| 6,177,931 B1 | | 1/2001 | Alexander et al. |
| 6,201,536 B1 | | 3/2001 | Hendricks et al. |
| 6,279,112 B1 | * | 8/2001 | O'Toole et al. ................ 726/10 |
| 6,282,713 B1 | * | 8/2001 | Kitsukawa et al. ............ 725/36 |
| 6,331,877 B1 | | 12/2001 | Bennington et al. |
| 6,446,261 B1 | * | 9/2002 | Rosser ......................... 725/34 |
| 6,463,468 B1 | * | 10/2002 | Buch et al. ................... 709/219 |
| 6,493,872 B1 | | 12/2002 | Rangan et al. |
| 6,530,082 B1 | * | 3/2003 | Del Sesto et al. .............. 725/9 |
| 6,698,020 B1 | * | 2/2004 | Zigmond et al. .............. 725/34 |
| 6,973,436 B1 | | 12/2005 | Shkedi |
| 2001/0013123 A1 | | 8/2001 | Freeman et al. |
| 2002/0056129 A1 | * | 5/2002 | Blackketter et al. ......... 725/112 |
| 2004/0261127 A1 | | 12/2004 | Freeman et al. |

FOREIGN PATENT DOCUMENTS

| | | |
|---|---|---|
| EP | 0924629 | 6/1999 |
| GB | 2344009 A | 5/2000 |
| JP | 09227193 | 8/1997 |
| WO | WO 94/16527 | 7/1994 |
| WO | WO 96/08109 | 3/1996 |
| WO | WO 99/26415 | 5/1999 |
| WO | 9945491 | 9/1999 |
| WO | WO 99/52285 | 10/1999 |
| WO | WO 01/24083 A | 4/2001 |
| WO | WO 01/67763 A | 9/2001 |
| WO | WO 01/75649 A | 10/2001 |

OTHER PUBLICATIONS

Supplementary Search Report in corresponding EP 02776187.3, Mar. 31, 2005, Sedna Patent Services LLC.

Examiner's Report for Canadian Application No. 2,462,160 dated Jan. 20, 2009.

Koenen, et al., "MPEG-4: Context and Objectives", Signal Processing Image Communication 9 (1997), pp. 295-304.

* cited by examiner

|  | SPORTS | NEWS | MYSTERIES | CHILDREN | ENTERTAINMENT |
|---|---|---|---|---|---|
| 1 | I | X | III | IV | VI |
| 2 | X | II | X | VII | VI |
| 3 | I | X | III | D | D |
| 4 | IX | VIII | X | IV | V |
| 5 | IX | II | X | VII | V |

Fig. 21

| I | II | III | IV | V | VI | VII | VIII | IX | X |
|---|---|---|---|---|---|---|---|---|---|
| 1101 | 1102 | 1103 | 1104 | 1105 | 1106 | 1107 | 1108 | 1109 | 1110 |

Fig. 22

METHOD AND APPARATUS FOR TARGETING OF INTERACTIVE VIRTUAL OBJECTS

This application is a continuation-in-part of U.S. application Ser. No. 09/597,893, filed Jun. 19, 2000, entitled METHODS AND APPARATUS FOR TARGETING VIRTUAL OBJECTS.

TECHNICAL FIELD

The technical field relates to a method and apparatus for providing interactive virtual objects that are targeted to subscribers. The method and apparatus specifically relate to monitoring, controlling and managing a content delivery network including an operations center, a local insertion center, or a subscriber's local terminal for the delivery of interactive virtual objects and the management of the respective responses to interactive requests.

BACKGROUND

Television as an advertising medium has undergone significant advances since its inception in 1939. Modern advances in digital technology now allow viewers to be very selective in choosing programs to watch. Other advances in digital technology have led to such programming enhancements as a "tail" on a hockey puck, or an overlaid first down marker on a football field. The same technological advances allow improvements in the way advertisements are currently presented. Many sporting events are now presented with virtual object advertisements included in the video. For example, the broadcast of a major league baseball game may include one or more virtual object spots in which an advertisement is displayed. The advertisements are then seen by television viewers, but not by fans who attend the game. However, the advertisements are fixed, and are not varied according to individual viewers.

SUMMARY

A system and a method delivers interactive targeted virtual objects to reception sites. A virtual object is a realistic, synthetic replica of an actual object. The virtual object is viewable within video programming and may be combined with original video and audio to supplement or replace portions of the original video and audio content. Virtual objects may be overlaid on video, partially or entirely obscuring the underlying video. An overlaid object may be static in nature, such as a graphical icon or the like, or alternatively may be dynamic, such as a video clip, animation, or scrolling alphanumeric characters, for example. Overlaid objects may be limited spatially to a fixed portion of the video screen, limited temporally to a given time for display, limited by a combination of both location and time, or tied to a spatially changing portion of the screen that is moving with time. Alternatively, virtual objects may be added to and embedded within the actual video. Multiple virtual objects may be embedded in the video in a multi-layer fashion. The virtual object is indistinguishable from the other video content sharing the field of view. Virtual objects may be interactive in nature. That is, a viewer may select an object and the selection will initiate a process whereby a reception site takes some action based on the interactive virtual object or the reception site sends a command to a location designated by the interactive virtual object to initiate some action.

An interactive virtual object management center defines interactive objects, and provides the interactive objects to the operations center for delivery, and the interactive virtual objects response management guidelines to an interactive object servicing center. An operations center may process the video signal to allow for the insertion of virtual objects into the video. An object delivery center serves as a standalone or supplemental system to the operations center to deliver virtual objects independently of the video with which the virtual objects are to be associated. A delivery network includes any of a number of different delivery systems to support the delivery of video and virtual objects from the operations center and the object delivery center to a local insertion center, or directly to a reception site. The delivery network is also used to deliver video and virtual objects from the local insertion center to the reception site. The reception site receives the video and virtual objects and associates the appropriate virtual objects with the video based on targeting algorithms.

The reception site collects virtual object viewing information and makes the viewing information available to a local data collection center or a central data collection center using the delivery network. The local data collection center provides information collected from the reception site to the local insertion center to assist in the targeting of the virtual objects. The central data collection center provides information collected from the reception site to the operations center to assist in the targeting of virtual objects. Alternatively, the reception site may use the virtual object viewing information and other information stored at the reception site to locally target the virtual objects at the reception site. The reception site may provide interactive requests, which are driven by the selection of interactive virtual objects, to an interactive object servicing center using the delivery network. Interactive responses are returned by the interactive object servicing center to the requesting reception site based on the interactive virtual object response guidelines provided to the interactive object servicing center by the interactive virtual object management center.

A targeting routine makes use of a viewer's demographic information and viewing habits to determine those virtual objects that may be most effective when displayed to that particular viewer. In so doing, the targeting routine generates packages of virtual objects targeted to each viewer, or to groups of viewers.

The process of managing the content and the virtual objects to be included in the content begins with a number of configuration and set-up steps. Individual reception site address information can be collected at the operations center. This information is used to uniquely identify each reception site and to associate with that identifier necessary information to aid in the targeting process. The reception site address information may be provided to the operations center upon installation or activation of the reception site in the viewer's home. Other information may be collected from various sources, including viewer surveys and marketing databases correlated by address, zip code+4, Nielsen or Arbitron program rating services, for example.

Next, reception site groups are determined. This is needed if the management of information and targeting to individual reception sites is not practical initially, either due to lack of availability of information to the appropriate level of detail, or lack of technology to control and deliver virtual objects to an individual reception site. For a number of target categories, groups are defined. Examples of target categories include demographic targeting (age/sex/income) and location, such as Area of Dominant Influence (ADI), for example. Each target category is then segmented into appropriate groups. For example, the ADI may include Los Angeles, Calif. and Washington D.C. New target categories can be added and the groups redefined after their initial establishment. Anywhere from one to all reception sites may be assigned to a single group.

For each target category, each reception site is assigned to a group based on the information collected about the reception site. Once the reception site is assigned to a group, the group assignment is conveyed to the reception site and stored therein. Alternatively, the reception site may use information collected locally to assign the reception site to groups.

The group assignment information that is stored at the reception site is able to survive power cycling of the reception site, and other normal service interruptions. Finally, as groups are modified or group assignments change, reception sites are notified of the changes. Additionally, the group assignment information may be periodically resent to the reception sites to ensure that newly added reception sites and those that have accidentally lost their information are up-to-date.

A virtual object location definer system determines where in the content the virtual objects are to be placed and the rules associated with their placement. Content may be video programming, commercials and advertisements, or electronic program guide (EPG) information, for example. A virtual object selector system determines those available virtual objects suitable for placement in a virtual object location. A targeted virtual object management system determines which reception sites or reception site groups should receive and display which virtual object for a given virtual object location. The virtual objects and targeting information are then distributed to reception sites.

After reception sites receive and store the virtual objects and targeting information, the reception site will place the most appropriate virtual object into virtual object locations based on the targeting information, and will display the combined content with the overlaid or embedded virtual object.

The reception site stores information indicating that a virtual object was inserted. The accumulated history information may be collected from the reception site at a later time for review purposes. The unique reception site identification information may also be provided with the collected data. As mechanisms become available to identify specific viewers in a household, the system will allow for individual identification information to also be provided with collected data. Finally, after collection of the reception site viewing history data, the reception site returns used reception site memory space to the reception site.

A centralized operations center can determine virtual object locations available for virtual object placement. Alternatively, a local insertion center can determine the virtual object locations. The operations center can determine the specific virtual objects to be placed in a virtual object location. Alternatively, the local insertion center may determine the specific virtual object to be placed in a virtual object location. The reception site itself can determine which virtual object is to be placed in a virtual object location based on its own internal routines.

Content, virtual objects, and associated targeting/virtual object placement control can be relayed to reception sites and information extracted from the reception site. The reception site may reside within a digital cable set top box that has access to a delivery network. Alternately, the reception site may be components of digital television satellite receivers. The reception site may be incorporated into the circuitry of a television, thereby eliminating the need for a separate control device attached to the television. Alternatively, the reception site may be incorporated into a personal computer, personal data device, smart phone with a display, or electronic book device

DESCRIPTION OF THE DRAWINGS

The detailed description will refer to the following drawings in which like numerals refer to like items, and in which:

FIG. 21 shows a representation of reception site groupings;

FIG. 22 shows an example of a division of available bandwidth;

DETAILED DESCRIPTION

Figure 1:
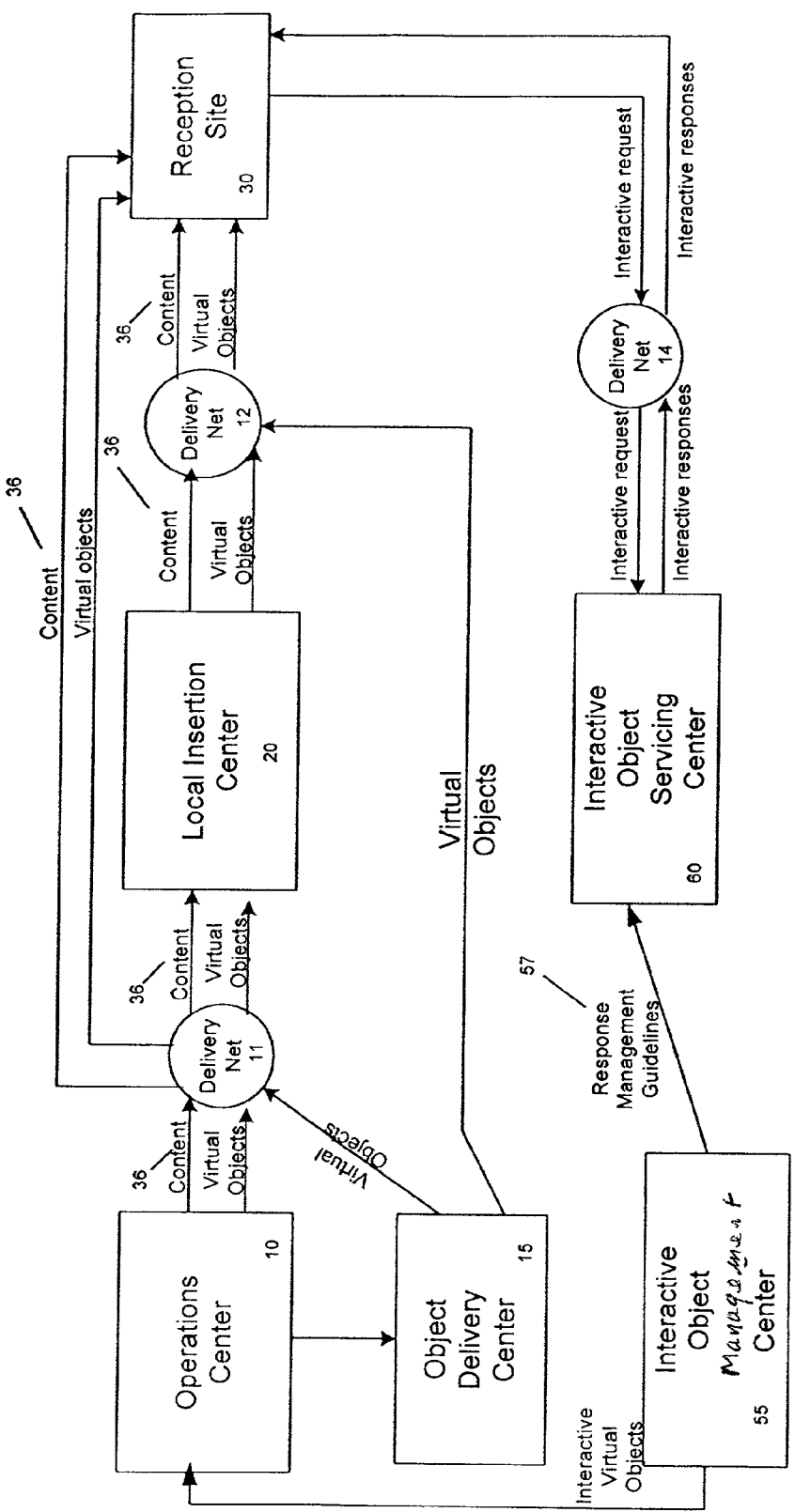
FIG. 1 is an overview of the virtual object targeting delivery system.

An overview of the interactive virtual object delivery and targeting system is depicted in FIG. 1. An operations center 10 performs the processing of a video content signal to allow for the insertion of virtual objects into the content 36. An object delivery center 15 serves as a standalone or supplemental system to the operations center 10 to deliver virtual objects independent of the content with which the virtual objects are to be associated. A delivery network 11 includes any of a number of different delivery systems to support the delivery of the content 36 and virtual objects from the operations center 10 and the object delivery center 15 to a local insertion center 20 or directly to a reception site 30. A delivery network 12 is used to deliver content and virtual objects from a local insertion center 20 to the reception site 30. The reception site 30 may be any device or terminal capable of receiving video, including a set top terminal, a television, a personal computer, a wireless telephone, a wired telephone, a PDA device, an electronic book, a digital satellite television receiver, or any similar device or terminal.

The reception site 30 receives the content 36 and virtual objects and associates the appropriate virtual objects with the content 36 based on targeting algorithms. The reception site 30 may collect virtual object viewing information and make the viewing information available to a local data collection center 40 or a central data collection center 50 using a delivery network 13. Alternatively, the reception site 30 may retain all virtual object viewing information and use the information to target virtual objects locally without control from the operations center 10. The local data collection center 40 provides information collected from the reception site 30 to the local insertion center 20 to assist in the targeting of virtual objects. The central data collection center 50 provides information collected from the reception site 30 to the operations center 10 to assist in the targeting of virtual objects. The interactive virtual object management center 55 provides for the creation and definition of interactive virtual objects. An interactive virtual object, discussed in more detail below, contains virtual object identifying information, the actual virtual object, an interactive virtual object trigger action 56, and virtual object response management guidelines 57. An interactive virtual object trigger action 56 defines those actions which the reception site 30 takes once an interactive virtual object is selected at the reception site. An interactive virtual object response management guideline 57 may be provided to the interactive object servicing center 60 by the interactive virtual object management center 55 and used by the interactive object servicing center 60 to determine the appropriate response upon receipt of an interactive request from a reception site 30. The reception site 30 provides interactive requests, which are driven by the selection of interactive virtual objects, to an interactive object servicing center 60 using a delivery network 14. Interactive responses are returned by the interactive object servicing center 60 to the requesting reception site 30.

Figure 2:
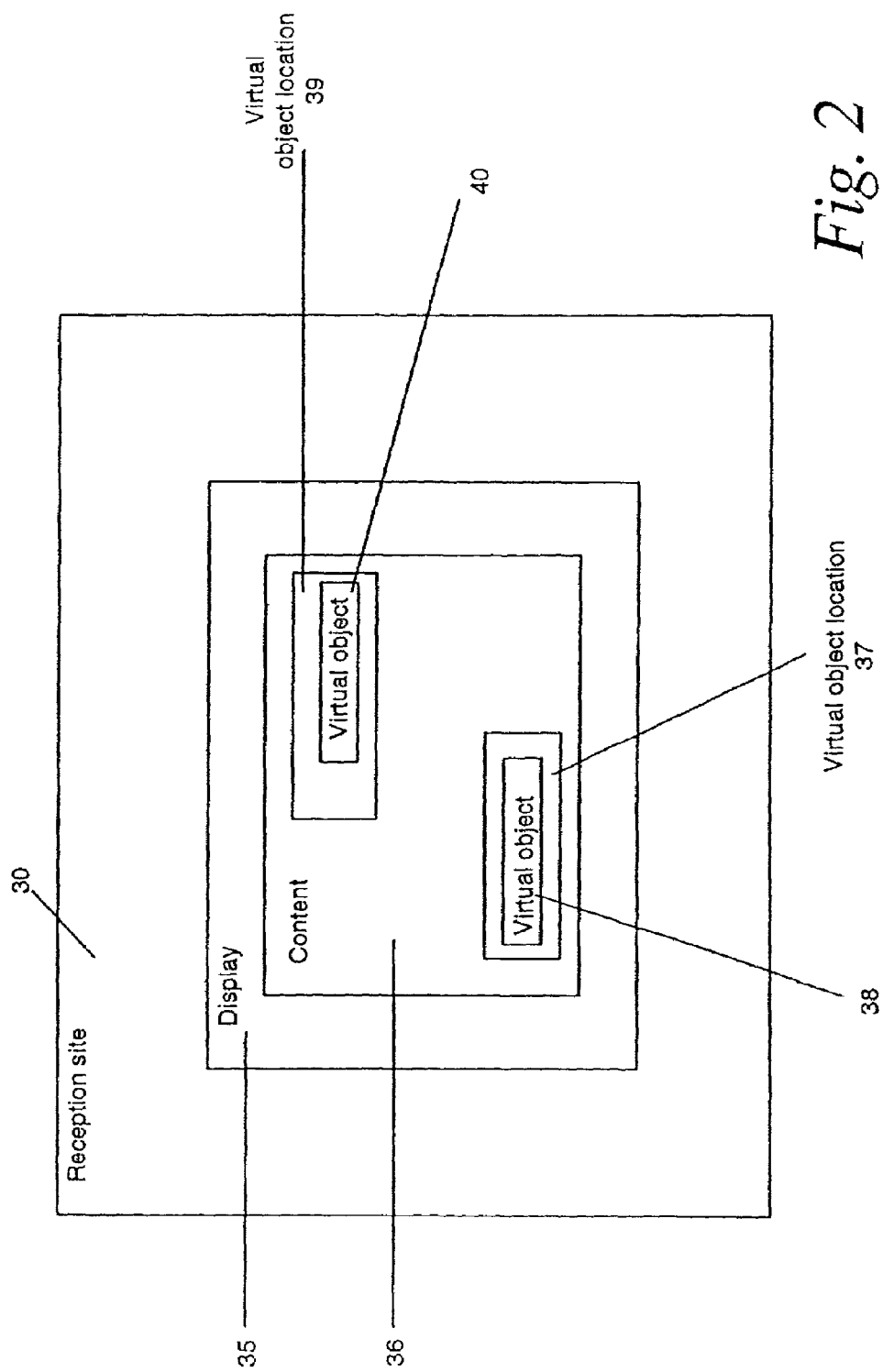
FIG. 2 provides a pictorial representation of virtual objects and virtual object locations.

Virtual objects may be realistic, synthetic replicas of actual objects. Virtual objects may also be caricatures of actual individuals, photographs or other life-like renderings of actual individuals, cartoon figures, text objects, graphical renderings, or icons, for example. The virtual objects may be animated or fixed. The virtual objects are combined with video and audio to supplement or replace portions of video and audio in original content 36. As shown in FIG. 2, the reception site 30 may contain or be connected to a display 35 on which the content 36 may be displayed. An opportunity, advertisement spot, or location, in the content 36 that is available for the placement of the virtual object will be denoted as a virtual object location 37 henceforward. Within the virtual object location 37, one or more individual virtual objects may be assigned, each denoted as a virtual object 38 henceforward. Multiple virtual object locations, shown as virtual object locations 37 and 39 may be present in the content 36. Multiple virtual objects, shown as virtual objects 38 and 40 may be present within the virtual object locations.

Figure 3:
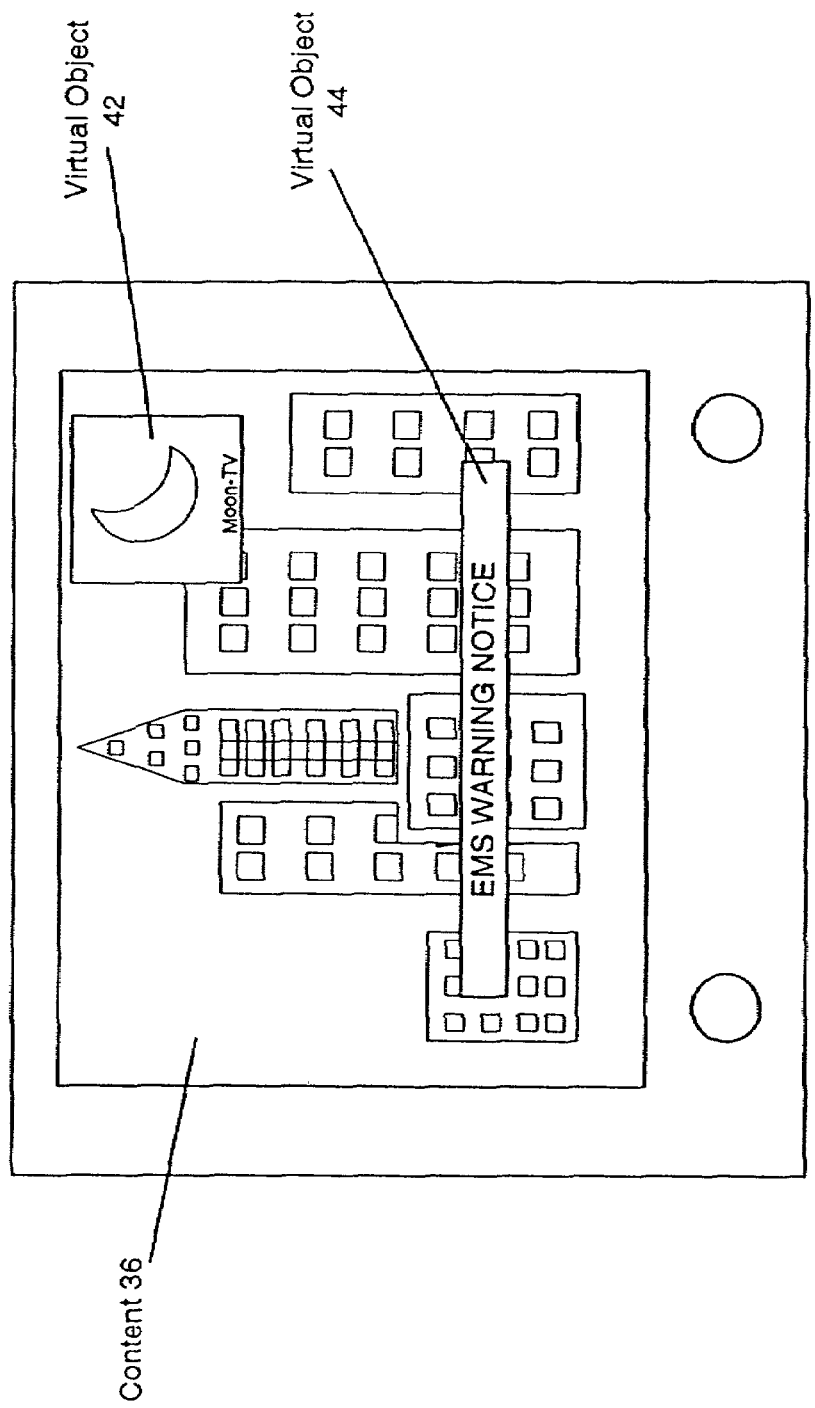
FIG. 3 is an example of an overlaid virtual object.

As shown in FIG. 3, virtual objects may be overlaid on video, partially or entirely obscuring the underlying video. An overlaid virtual object may be static in nature, like a graphical icon, as shown by virtual object 42. Alternatively the overlaid virtual object may be dynamic, like a video clip, animation, or scrolling alphanumeric characters as shown by virtual object 44. Overlaid virtual objects may be limited spatially to a fixed portion of the video, limited temporally to a given time for display, or limited by a combination of both location and time. Overlaid virtual objects may also be tied to a spatially changing portion of the video that is moving with time.

Figure 4:
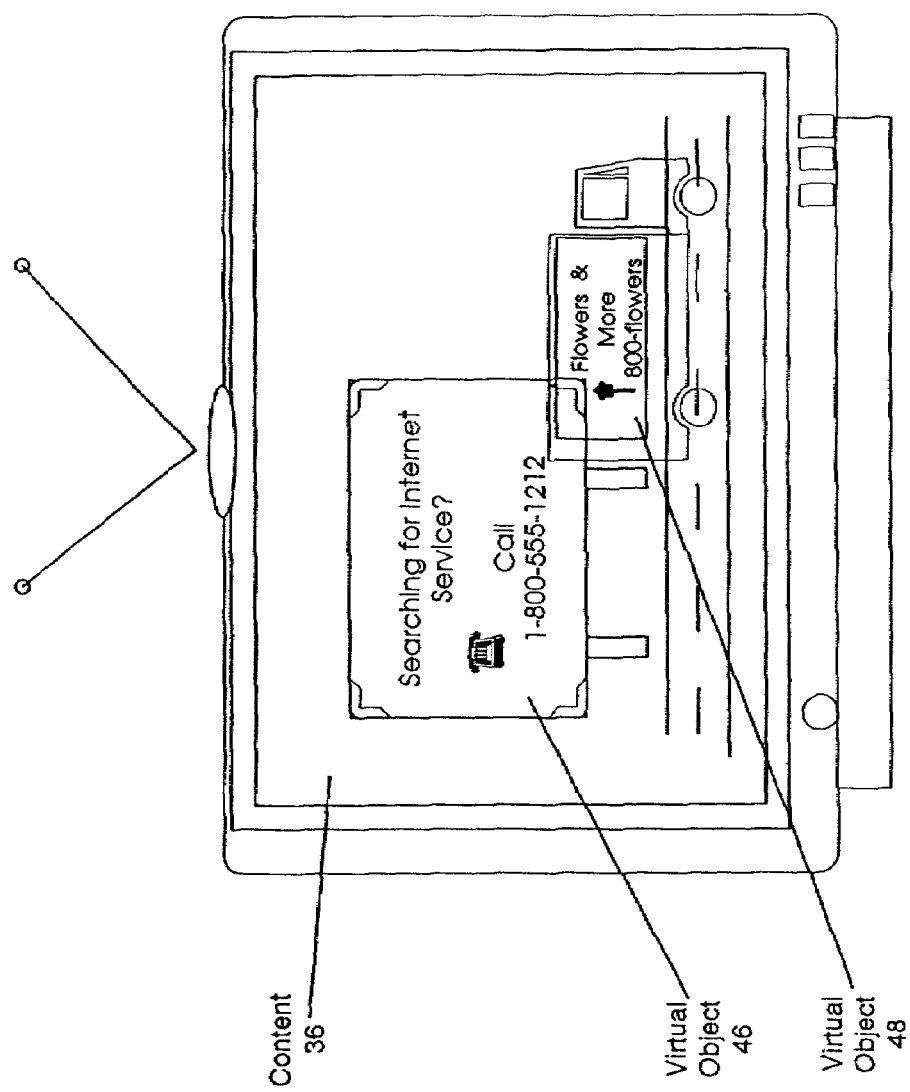
FIG. 4 is an example of an embedded virtual object.

Alternatively, as shown in FIG. 4, virtual objects may be added to and embedded within video. In this alternative, the synthetic virtual object 38 could be indistinguishable from the other video content 36 sharing the field of view as shown by virtual object 46 and virtual object 48. For instance, today's technology allows for the virtual placement of a billboard at televised sports events and the placement of a virtual first down marker in televised football games.

In an embodiment, virtual reality and animation technologies are combined with advanced digital video techniques to provide realistic interaction of virtual objects within video. Combining these technologies, a soda can may be synthetically placed in the video, and may then be made to change over time. This placement and subsequent modification can occur at the video's source, at an intermediate point within the distribution and delivery path, or at the reception site 30. Combining the placement of virtual objects with the ability to target specific virtual objects to specific viewers or groups of viewers allows one household to see a scene with the soda can for cola, while the next door neighbor sees a root beer soda can, for example.

Virtual objects may be interactive in nature, where a viewer can select a virtual object 35 and this selection will initiate a process whereby the reception site 30 initiates some action or the reception site 30 sends a command to the location designated by the interactive virtual object 38 to initiate some action. Actions may include linking to a Web site to display content related to the interactive virtual object 38, initiating a purchase transaction, or initiating a request for more information about the selected virtual object 38.

The operations center 10 shown in FIG. 1 may include a number of systems that act together in processing the content 36 for the inclusion of virtual objects, for the selection of appropriate virtual objects to be placed in the content 36, for the targeting of virtual objects to individual reception sites, and for the packaging and delivery of the content 36 and virtual objects to reception sites.

Placement of virtual objects can be explicitly selected by the operations center 10, resulting in the specific selection and placement of virtual objects into content 36. Alternatively, the placement may be generically defined by the operations center 10. In this alternative, the reception site 30 performs all the processing associated with selecting the appropriate virtual object 38 to be placed in the content 36 based on basic guidelines provided by the operations center 10 and algorithms operating at the reception site 30.

Figure 5:
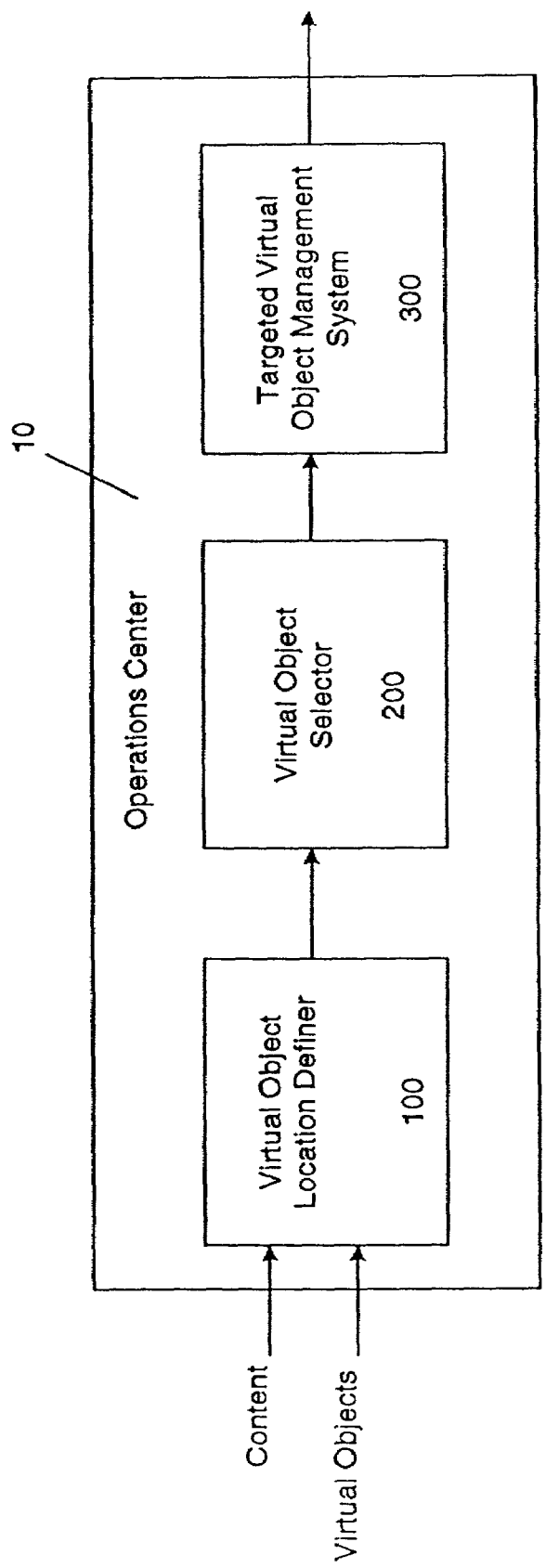
FIG. 5 depicts an operations center.

As shown in FIG. 5, the operations center 10 includes a virtual object location definer 100, a virtual object selector 200, and a targeted virtual object management system (TVOMS) 300.

Figure 6:
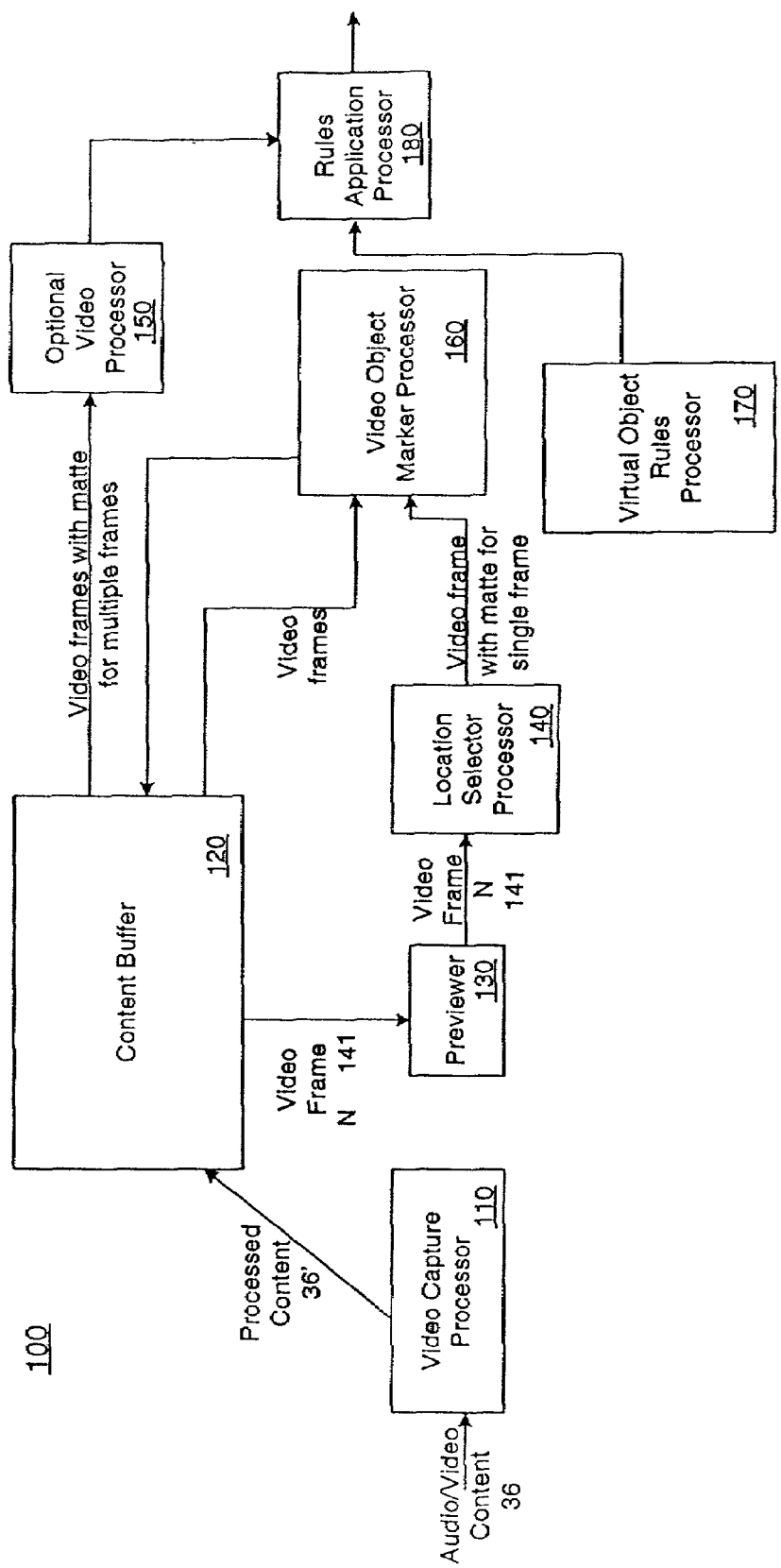
FIG. 6 depicts a virtual object definer.

FIG. 6 presents the virtual object location definer 100. A video capture processor 110 processes video and audio content 36 on a frame by frame basis, converting the original content 36 into a corresponding digitized representation. The processed content 36' is then stored in content buffer 120 for future access. A pre-viewer subsystem 130 allows for the viewing of a video frame of the processed content 36'. Frame N 141, for example, (shown in FIG. 7) associated with the processed content 36', may be retrieved from the content buffer 120, viewed, and passed to a location selector processor 140. The location selector processor 140 allows for the selection of where in the frame N 141 the virtual object 38 may be placed. When the frame N 141 is retrieved by the location selector processor 140, either a static area may be selected, or alternatively, a dynamic area, which is tied to an area within the frame of the processed content 36', may be selected. An overlay matte 16 (see FIG. 7) may be used in the virtual object insertion process to identify where and how a virtual object location 37 is to be placed in the processed content 36'.

Techniques for pattern recognition used by the location selector processor 140 to facilitate the creation of the matte 16 and the identification of the pixels within the frame that the matte 16 is to be associated with for that frame are described in detail in U.S. Pat. No. 5,808,695, to Rosser, Roy J.; Das, Subhodev; and Tan, Yi; entitled Method of Tracking Scene Motion for Live Video Insertion; U.S. Pat. No. 5,903,317, to Sharir, Avi; and Tamir, Michael; entitled Apparatus and method for Detecting, Identifying, and Incorporating Advertisements in a Video; U.S. Pat. No. 5,524,065, to Yagasaki, Toshiaki; entitled Method and Apparatus for Pattern Recognition; U.S. Pat. No. 5,627,915, to Rosser, Roy J.; Das, Subhodev; and Tan, Yi; von Kaenel, Peter; entitled Pattern Recognition System Employing Unlike Templates to Detect Objects Having Distinctive Features in a Video Field; and U.S. Pat. No. 4,817,171, to Stentiford, Frederick; entitled Pattern Recognition System, the disclosures of which are hereby incorporated by reference.

Figure 7:
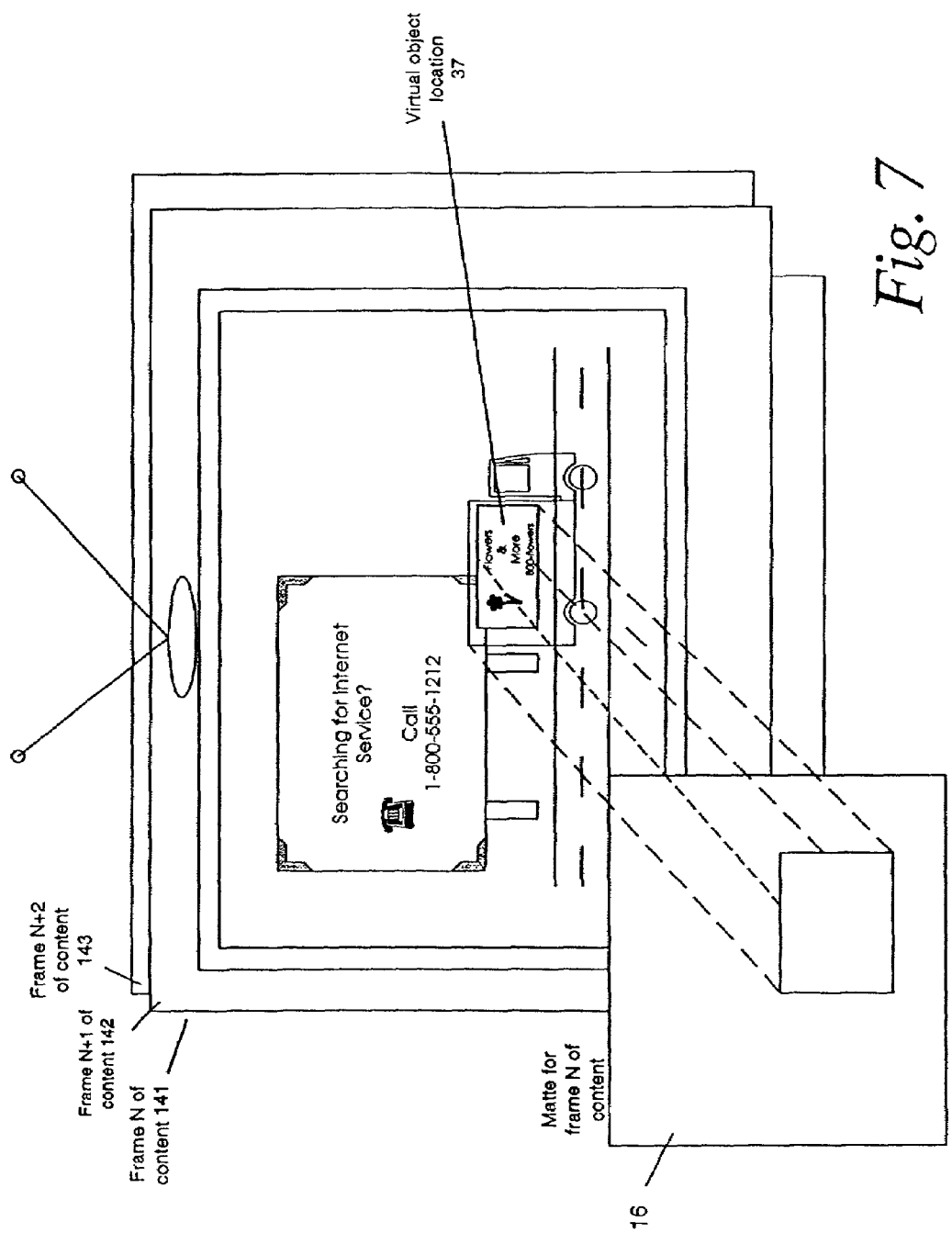
FIG. 7 is a pictorial representation of a virtual object location matte.

When the area is selected by the location selector processor 140 and the overlay matte 16 for the initial video frame N 141 is created, a video object marker processor 160 creates the transparent overlay matte 16 that is associated with the selected area for subsequent frames, for example frame N+1 142 and frame N+2 143 of the processed content 36', for the duration of frames designated, as shown in FIG. 7. This selected area defines the virtual object location 37. Pattern recognition technology may then be applied to each subsequent frame of the processed content 36' in the video object marker processor 160, creating a sequence of mattes to be applied to each frame of the processed content 36', moving and transforming as needed to match the temporal movement and transformations of the virtual object location 37 within the processed content 36' to which the virtual object 38 is to be tied. The pattern recognition technology handles transitions, cutaways, and cutbacks within the processed content 36', and any visual blocking or occlusions that may occur as other objects within the processed content 36' appear in front of the dynamic area selected for virtual object location 37.

Simultaneously with the selection of the virtual object location 37 and the creation of the mattes, a virtual object rules processor 170 allows for the entry of rules that govern the types of virtual objects and other relevant placement guidelines associated with the virtual object location 37. These rules allow for the selection of characteristics such as the duration of the virtual object location 37, and viewing overlay characteristics such as transparency of the overlay virtual object, and whether the virtual object location 37 is suitable for an interactive virtual object. The operations center 10 processes the stored, non-realtime processed content 36' and the real-time (live) processed content 36'. For real-time processed content 36' the content buffer 120 serves as a short buffer, and predefined rules are pre-loaded into the virtual object rules processor 170. Additionally, the video object marker processor 160 is pre-loaded with the directions as to which locations within the processed content 36' are to be treated as virtual object locations. The video object marker processor 160 then automatically searches the real-time processed content 36' using pattern recognition technologies presented above, or other technologies, and automatically creates the mattes required for each virtual object location. Once the video object marker processor 160 creates the mattes and the associated controls, the mattes are associated with the actual processed content 36' in the content buffer 120. The processed content 36', along with the mattes are then optionally processed using the optional video processor 150, which performs any necessary content encoding (e.g., MPEG4, or digitalization), and makes the content 36' available to a rules application processor 180. The rules application processor 180 creates metadata packets that carry the virtual object placement rules information and mattes and associates these packets with the processed content 36' for each virtual object location 37 selected in the virtual object location definer 100.

Figure 8:
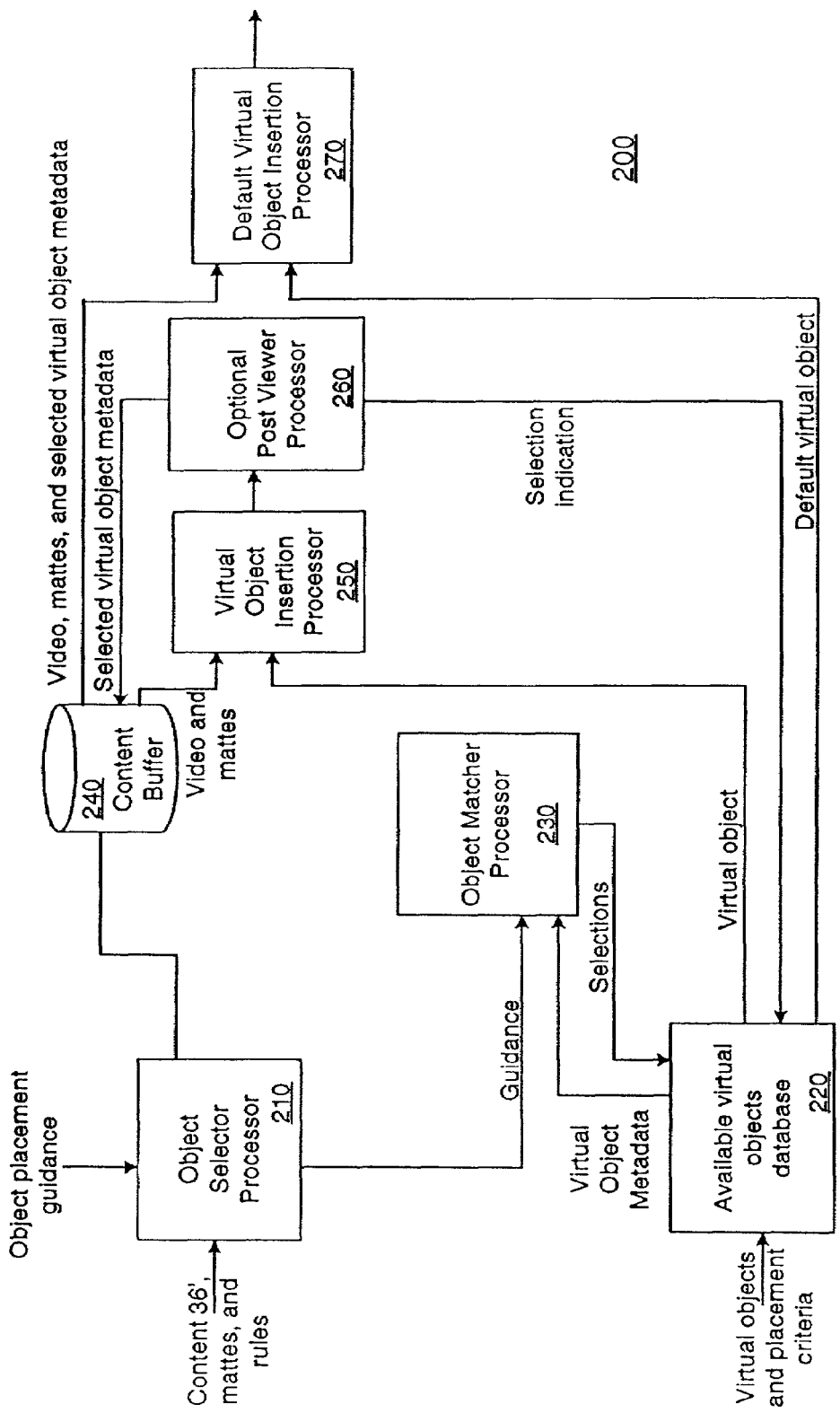
FIG. 8 depicts a virtual object selector.

FIG. 8 is a block diagram of the virtual object selector 200. Processed content 36, along with the metadata packets carrying the virtual object placement rules information associated with each virtual object location 37 and the mattes 16 are provided by the virtual object location definer 100 to the virtual object selector 200. An object selector processor 210 extracts the placement rules and stores the processed content 36' in a content buffer 240. Using the placement rules, along with any operator entered object placement guidance, the object selector processor 210 queries an object matcher processor 230 to initiate the selection of virtual objects that match the requisite rules. The object matcher processor 230 can be commanded by the object selector processor 210 to match a virtual object 38 in at least three manners: 1) automatically, 2) with manual placement, and 3) with pre-selected virtual objects. For automatic matching, the object matcher processor 230 searches an available virtual objects database 220 to find virtual objects that meet the placement rules provided by the object selector processor 210. The matching virtual objects are then marked in the available virtual objects database 220 as suitable for that virtual object location 37. For manual matching, the operator of the object matcher processor 230 manually selects the desired virtual objects to be associated with a virtual object location 37, and marks the selected virtual objects as suitable for the virtual object location 37 in the available virtual objects database 220. For pre-selected objects, the placement rules will indicate the pre-defined virtual objects to be associated with the processed content 36'. The object matcher processor 230 marks the predetermined virtual objects in the available virtual objects database 220 as being associated the particular processed content 36' and virtual object location 37.

Virtual objects may be processed and stored in the available virtual objects database 220 before they are used. Processing of the virtual objects includes digitizing the virtual object 38 and associating the virtual object with those virtual object 38 placement guidelines and rules that must be followed to place the virtual object 38 within virtual object locations. The rules and guidelines may include product categories with which the virtual object 38 should be associated, or in contrast, cannot be associated with, the type of virtual object 38, the duration that the virtual object 38 is valid to be used, the number of times the virtual object 38 may be used, and whether the virtual object 38 is interactive and any interactive virtual object trigger action 56 or optional virtual object software applet 152 associated with an interactive virtual object 38.

In a non-realtime environment, an optional post viewer processor 260, which is preceded by a virtual object insertion processor 250, is used to view the content 36 and insert each virtual object 38 that was matched to the content 36 by the object matcher processor 230 in the corresponding virtual object location 37. Techniques for insertion of overlaid virtual objects are described in detail in U.S. Pat. No. 4,319,266 to Bannister, Richard S.; entitled Chroma Keying System; U.S. Pat. No. 4,999,709 to Yamazaki, Hiroshi; and Okazaki, Sakae; entitled Apparatus for Inserting Title Pictures; U.S. Pat. No. 5,249,039, to Chaplin, Daniel J.; entitled Chroma Key Method and Apparatus; and U.S. Pat. No. 5,233,423 to Jernigan, Forest E.; and Bingham, Joseph; entitled Embedded Commercials within a Television Receiver using an Integrated Electronic Billboard, the disclosures of which are hereby incorporated by reference.

Techniques for the insertion of embedded virtual objects are described in detail in U.S. Pat. No. 5,953,076, to Astle, Brian; and Das, Subhodev; titled System and Method of Real Time Insertions into Video Using Adaptive Occlusion with a Synthetic Reference Image; U.S. Pat. No. 5,892,554, to DiCicco, Darrell; and Fant, Karl; entitled System and Method for Inserting Static and Dynamic Images into a Live Video Broadcast; U.S. Pat. No. 5,515,485, to Luquet, Andre; and Rebuffet, Michel; entitled Method and Device for Modifying a Zone in Successive Images; U.S. Pat. No. 5,903,317, to Sharir, Avi; and Tamir, Michael; entitled Apparatus and Method for Detecting, Identifying and Incorporation Advertisements in a Video; and the MPEG4 standard, the disclosure of which are hereby incorporated by reference.

In a realtime environment, the optional post viewer processor 260 is bypassed, and the default virtual object 38 is placed in the virtual object location 37 by a default virtual object insertion processor 270, which includes (not shown) a virtual object insertion processor 250.

Figure 9:
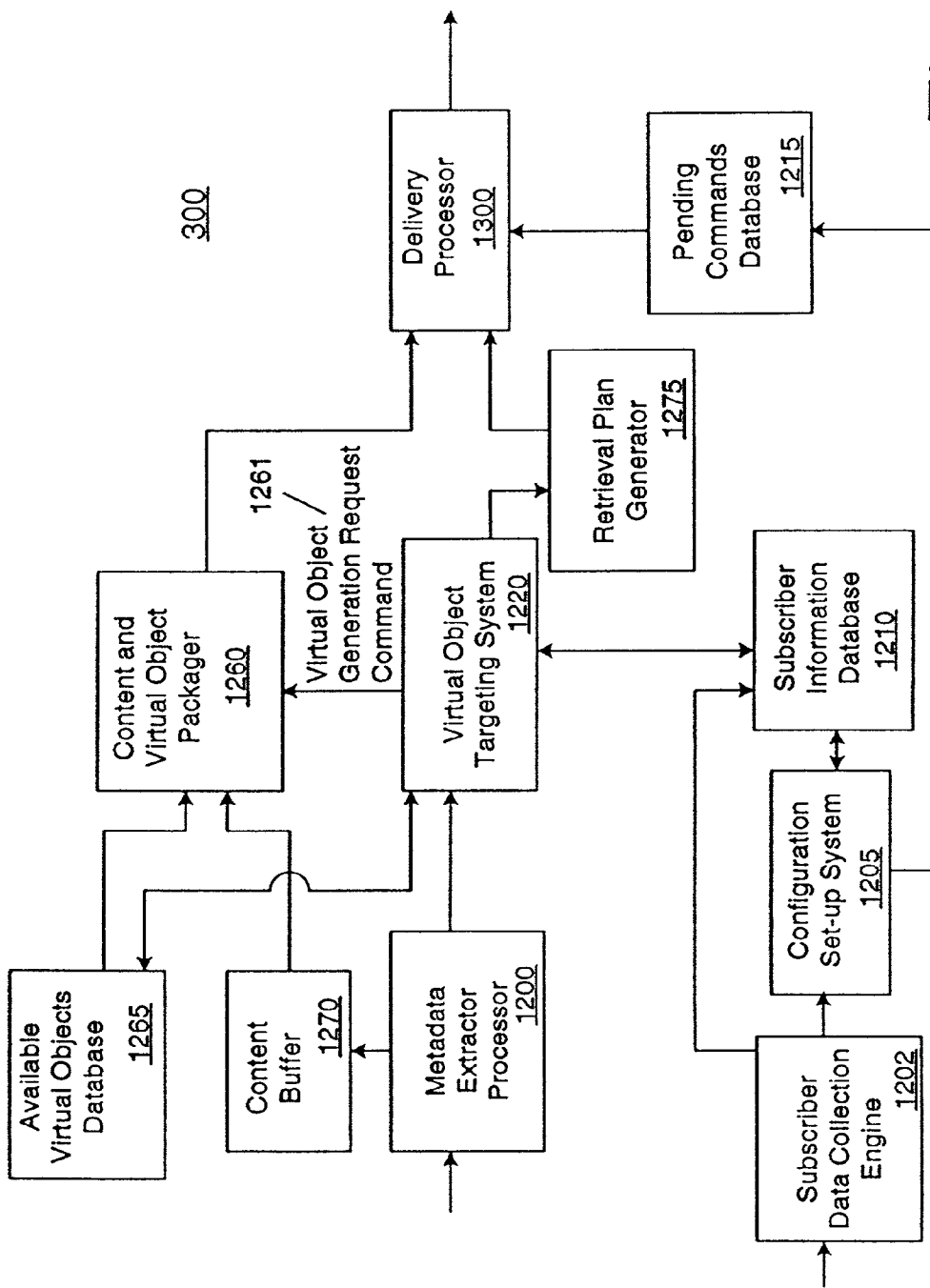
FIG. 9 depicts a targeted virtual object management system.

The targeted virtual object management system (TVOMS) 300 shown in FIG. 9 allows for virtual objects, including virtual object-based advertisements, to be directed to subscribers based on, for example, the use of subscriber data, programs watched data, past virtual objects viewing data, past interactive virtual objects selected data, and/or mood indicators entered by the subscriber. Alternatively, input from subscribers collected through form-based questionnaires (hard copy, electronic, and telephone, for example) may be used to further define a subscriber's potential likes, wants, and needs. Advertisers wanting to optimize their advertising expenditures may direct virtual objects to the appropriate viewing audiences to ensure that the desired audience views specific virtual objects. Specifically, advertisers can display specific virtual objects in content 36 that is being viewed by those subscribers most likely to be influenced to buy the advertised product, or otherwise respond in a desired fashion to the virtual objects.

Virtual objects may also be targeted to reception sites on various levels. At a highest level, virtual objects can be delivered to all reception sites viewing content 36, with no targeting of the virtual objects to the subscriber, but with the virtual objects displayed in the content 36 that are determined to be most relevant to the content 36. That is, the virtual objects are placed in the virtual object location 37 without the use of an individual or group targeting algorithm. Alternatively, some level of targeting may occur based on, for example, ADI, zip code+4, geographical data and other similar criteria known about a reception site 30. In this alternative embodiment, the virtual objects are sent to a reception site 30, and a local insertion routine in the reception site 30 controls placement of the virtual objects into the virtual object locations 37 in the content 36. The virtual objects may be stored at the reception site 30 and may be periodically refreshed. To account for reception sites that do not have virtual objects available for insertion, the content 36 may be provided with a default virtual object 38 embedded in the content 36. Upon receipt of the content 36 at a reception site 30, the reception site 30, using the local insertion routine, determines if the default virtual object 38 should be replaced with another virtual object 38 residing in the reception site's memory or being delivered concurrently with the content 36.

Alternatively, virtual objects may be targeted to groups of reception sites, with the groups of reception sites categorized based on some other common subscriber characteristics such as programs watched data or interactive virtual objects selected data, for example. Finally, virtual objects may also be targeted to specific subscribers that share the use of a reception site 30 based on their unique subscriber characteristics.

To target virtual objects, the TVOMS 300 may make use of information from numerous sources. These sources include collected programs watched data that are stored in the reception site 30, and periodically uploaded to the central data collection center 50 or the local data collection center 40, and from past virtual objects viewed information or past interactive virtual objects selected that is stored in the reception site 30 and periodically uploaded to the data collection centers. Additionally, these sources may include information from marketing databases and past television programs watched data, as described in U.S. Pat. No. 5,798,785, entitled TERMINAL FOR SUGGESTING PROGRAMS OFFERED ON A TELEVISION PROGRAM DELIVERY SYSTEM, filed Dec. 2, 1993, incorporated herein by reference.

The TVOMS 300 provides the management of information required to support each of the following: (1) delivery of targeted virtual objects along with content 36 being broadcast; (2) delivery of targeted virtual objects to subscribers independent of any content 36 being broadcast; and (3) delivery of TVOMS-related subscriber-specific information and commands.

FIG. 9 shows the TVOMS 300 supporting the targeting of virtual objects to subscribers. Broadcast information can be destined for the entire population of subscribers receiving the content 36, groups of subscribers, and individual subscribers. Broadcast information can include actual content 36, metadata packets with virtual object insertion control information, virtual objects for placement within the content 36, and command information required by the subscriber's reception site 30 to configure the reception site 30 and retrieval plans to guide the reception site 30 in placing the appropriate virtual object 38 within the content 36. Broadcasting may be supported over a variety of broadcast-capable communication systems, such as the Internet, cable television systems, terrestrial broadcast systems, satellite broadcast systems, and wireless communications systems, and other systems described below.

A subscriber information database 1210 contains subscriber information collected from numerous sources for each subscriber or reception site 30. The subscriber information may then be used by a virtual object targeting system 1220 to determine the best virtual objects to be distributed for inclusion in the content 36. Additionally, the information collected may be used to determine if the subscriber information has changed to the point that refreshed virtual objects should be delivered to a subscriber or, alternatively, whether a subscriber's group assignments should be updated. The virtual object targeting system 1220 determines the optimum subset of virtual objects to be associated with the content 36 based on the selected object metadata provided by the virtual object selector 200 (FIG. 5) and subscriber information from the subscriber information database 1210. A content and virtual object packager 1260 is directed to retrieve the appropriate virtual objects from an available virtual objects database 1265. The content and virtual object package 1260 then, along with the content 36, from a content buffer 1270, addresses the virtual objects with the appropriate group addressing information, and packages the virtual objects with the content 36. A delivery processor 1300 then delivers the combined package of virtual objects, content 36, and metadata to subscribers.

As an alternative to delivering virtual objects with associated content 36, virtual objects can be delivered independently to individual subscribers or groups of subscribers based on updated subscriber information, modified group assignments, or the need for refreshed virtual objects at the reception site 30. Initiation could be automatic based on a scheduled cycle or by TVOMS operator direction. Upon delivery initiation, the virtual object targeting system 1220 uses subscriber information from the subscriber information database 1210, information about available virtual objects from the available virtual objects database 1265, and information about previously delivered virtual objects from the subscriber information database 1210, to select the appropriate virtual objects to be packaged and delivered to a reception site 30. Once the virtual object targeting system 1220 determines the appropriate virtual objects, the content and virtual object packager 1260 retrieves the appropriate virtual objects, packages the virtual objects with reception site configuration information, addresses the information either to a single subscriber or group of subscribers, and delivers the information to the appropriate reception site 30 using a delivery processor 1300. This delivery can be done in broadcast fashion or by communicating to reception sites directly. Virtual objects may be broadcast to all reception sites, and a reception site 30 may store only the virtual objects that are associated with groups to which the reception site 30 belongs. Alternatively content 36, virtual objects, and other information destined to reception sites may be provided to the object delivery center 15 (FIG. 1) for delivery to reception sites.

The databases addressed in FIG. 9 may be configured to support a variety of information necessary for the TVOMS 300 to manage the targeting process. Below are tables that present typical data that may be tracked by these individual databases.

Subscriber Information Database 1210

Reception system identification information
Reception site type
Date of system set-up
Date of last communication with operations center
Household income
User data (for each registered subscriber), including:
  Name
  Sex
  Age
  Place of birth
  Education
  Profession
TV program preferences
Demographic information
Past advertising viewed data, which virtual objects, time spent viewing,
Past products ordered, along with time, date, and method of order
Past billing information
Imputed subscriber data from marketing databases
Past TV programs watched data, along with time and date
Past PPV programs ordered data, along with time and date
Mood indicators
Form based questionnaire results
Communication methods available (available options for both return and delivery)
Group assignments per subscriber for each category
Past virtual objects delivered to subscriber, date of delivery, method of delivery
Past selected interactive virtual objects
Zip+4 information Available Virtual Objects Database 1265

Virtual object identifier with actual digital version of virtual object Display options (e.g., text, audio, graphics, video, link, HTML, XML, interactive)
Static vs. dynamic virtual object indicator,
If an interactive virtual object, interactive virtual object trigger action information
If an interactive virtual object, optional interactive virtual object software applet
Pricing subsidy information
Run through completion status mode indication
Date of valid use
Virtual object placement controls, acceptable frequency
Category and group preferences (as virtual object ranking percentages)

Pending Commands Database 1215

For each pending command:
Destination address
Actual command
Date generated
Date of confirmed receipt Within the TVOMS 300, the virtual object targeting system 1220 is responsible for the intelligent and rapid selection of virtual objects for placement in content 36. Category and group targeting is managed in a manner similar to that described in co-pending U.S. application Ser. No. 09/597,893 entitled METHOD AND APPARATUS FOR TARGETING VIRTUAL OBJECTS, filed Jun. 19, 2000, and in co-pending U.S. application Ser. No. 09/054,419 entitled TARGETED ADVERTISEMENT USING TELEVISION DELIVERY SYSTEM, filed Apr. 3, 1998, and in co-pending U.S. application Ser. No. 09/328,672 entitled ELECTRONIC BOOK SELECTION AND DELIVERY SYSTEM WITH TARGETED ADVERTISING, filed on Jun. 9, 1999, each of which are incorporated herein by reference.

Careful management of the virtual objects within the content 36, based on information known about the demographics and viewing habits of subscribers, for example, can greatly increase both the advertisers' likelihood of reaching an interested subscriber, and the likelihood a subscriber will be interested in a specific virtual object 38. Each virtual object location 37 within the content 36 is assigned a series of virtual objects by the TVOMS 300, and when multiple virtual objects are delivered for a given virtual object location 37 in the content 36, a retrieval plan is developed that directs which virtual objects should be displayed for a given subscriber or reception site 30, a group of subscribers or reception sites, or the entire subscriber population.

Figure 10:
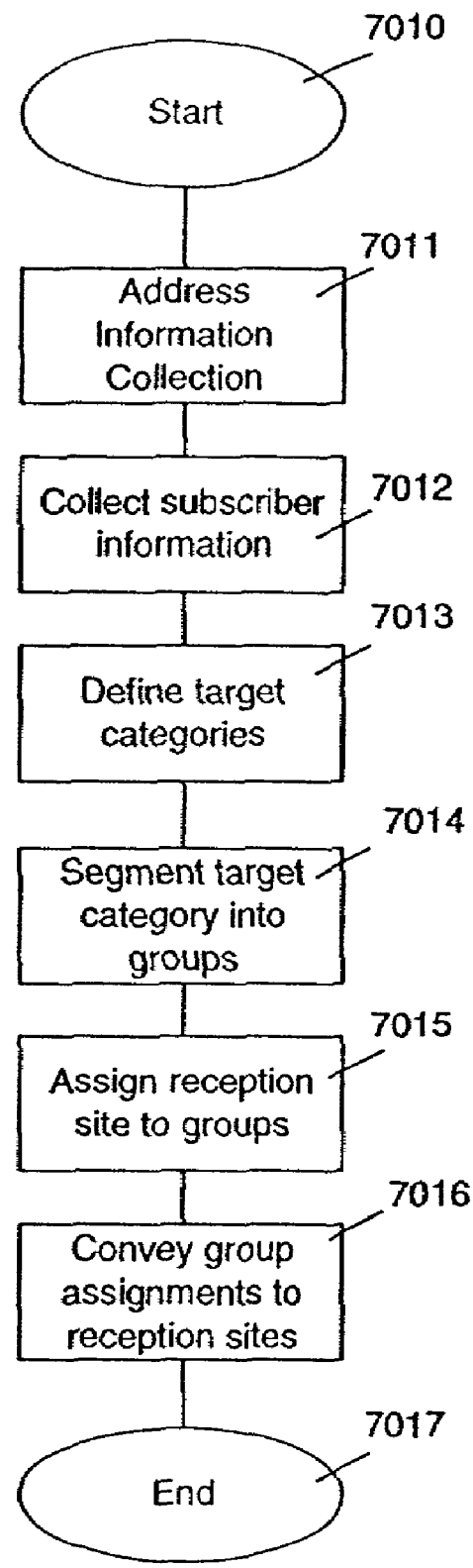
FIG. 10 shows configuration and set-up steps associated with targeting virtual objects.

The process of managing the targeted virtual objects may consist of a number of configuration and set-up steps shown in FIG. 10 that begins with the start step shown in block 7010 and ends with the end step shown in block 7017. First, individual reception site address information is collected by a subscriber data collection engine 1202 in the address information collection block 7011. This address information uniquely identifies each reception site 30 subscriber and associates necessary address information about each subscriber with the reception site identifier to aid in the virtual objects targeting process. This address information includes subscriber profile information, programs viewed information, past virtual objects delivered and viewed, and responses to menu-based questionnaires or other questionnaires completed by the subscriber. In block 7012, other subscriber information may be collected from various sources, including surveys and marketing databases correlated by address or zip code+4, for example.

Next, a number of target categories are defined as shown in block 7013. Examples of target categories include demographic targeting (age/sex/income) and location, such as Area of Dominant Influence (ADI). Next, as shown in block 7014, each target category is then segmented into appropriate groups. For example, the ADI may include Los Angeles, Calif. and Washington D.C. New target categories can be added and the groups comprising the target category redefined after their initial establishment.

Next, as shown in block 7015, for each target category, each reception site 30 is assigned to a group based on the information collected about the subscriber. Once each subscriber is assigned to a group, the group assignments are conveyed to the reception site 30 and stored therein, as shown in block 7016. As groups are modified or group assignments change, the reception sites are provided with the changes. Additionally, the group assignment information is periodically resent to the reception sites to ensure that newly added reception sites and those reception sites that have accidentally lost their information are up-to-date. Alternatively, the reception site 30 may perform the processing of information about the characteristics of the subscriber, and generation of the group assignment information internal to the reception site as presented in co-pending U.S. application Ser. No. 09/628,805 entitled METHOD AND APPARATUS FOR LOCALLY TARGETING VIRTUAL OBJECTS WITHIN A TERMINAL, filed Jul. 28, 2000, which is incorporated herein by reference.

Returning to FIG. 9, the virtual object targeting system 1220 determines the optimum types of virtual objects to be placed in the content 36 from the selected virtual objects provided by the virtual object selector 200 (FIG. 5). The virtual object targeting system 1220 takes into account subscribers who will likely view the content 36, the desirability of providing available virtual objects to those subscribers, target categories, the number of virtual objects locations available for the content 36, and the number of virtual objects available for assignment for a given virtual object location 37.

Once specific virtual objects are selected for one or more available virtual object locations 37, the groups that should view each virtual object 38 are determined, based on the target category of interest. The selected virtual object locations 37 may include all virtual object locations, or a subset of all the virtual object locations. A retrieval plan is generated by the retrieval plan generator 1275 that provides information concerning which target category and groups are assigned to each virtual object 38 associated with each virtual object location 37. The retrieval plan may provide information for one virtual object location 37 or multiple virtual object locations within content 36, where one or more virtual objects, target categories, and the groups to which each virtual object 38 is targeted within each virtual object location 37 is also provided. An example retrieval plan is provided in Table C below. Alternatively, the retrieval plan providing virtual object assignments to virtual object locations may be sent independently from the retrieval plan providing virtual objects, target categories, and the groups to which each virtual object 38 may be targeted. Retrieval plans may be distributed along with the virtual objects and the associated content 36 directly to the reception sites by the delivery processor 1300 or using the object delivery center 15. Alternatively, a retrieval plan may be distributed by the delivery processor 1300 or using the object delivery center 15 independent of the associated content 36 or virtual objects.

After the reception site 30 receives and stores the virtual objects and the retrieval plan, the reception site 30 inserts those virtual objects into the appropriate virtual object locations in the content 36 based on the retrieval plan. The reception site 30 may retrieve and store only those virtual objects associated with that reception site's group assignment for that virtual object location 37. Alternatively, the reception site 30 may retrieve and store all virtual objects but only insert those virtual objects into virtual object locations as dictated by the retrieval plan.

When the virtual objects are displayed within the content 36, the reception site 30 will store virtual objects viewed data indicating that a virtual object 38 was shown. In an embodiment, the reception site 30 will store this virtual object viewed data only if the virtual objects are displayed for a predetermined time, or only if the subscriber takes an action to indicate the virtual object 38 has been viewed, such as by selecting an interactive virtual object 38, for example. Accumulated virtual objects viewed data may be collected from a reception site 30 at a later time for review purposes. Unique reception site identification information also may be provided with the collected virtual objects viewed data. Upon collection of the virtual objects viewed data, the reception site 30 may return the used memory space to available pools for future use.

The virtual object targeting system 1220 receives requests from the metadata extractor processor 1200 to initiate the determination of virtual objects to be placed. The metadata extractor processor 1200 receives content 36 and associated virtual object information from the virtual object selector 200 (FIG. 5). The virtual object targeting system 1220 provides outputs to the content and virtual object packager 1260 and the retrieval plan generator 1275.

A part of the TVOMS 300 operation is the retrieval of subscriber data, and the assimilation of the subscriber data into the virtual objects selection method. This operation typically includes two steps. First, subscriber data is retrieved from the reception sites by the central data collection center 50 or the local data collection center 40 (FIG. 1). The subscriber data is compiled and sent to the data collection engine 1202 in the operations center 10. Once assembled at the TVOMS 300, the data is filtered for each application of the TVOMS 300. In an embodiment, the subscriber information database 1210 receives inputs from the subscriber data collection engine 1202 and a configuration set-up system 1205. The subscriber information database 1210 provides outputs to the configuration set-up system 1205, and the virtual object targeting system 1220.

The data gathered includes:
What products a subscriber purchased and when they were purchased,
What Pay Per View (PPV) TV programs a subscriber purchased and when they were purchased,
What television programming a subscriber has viewed,
What interactive virtual objects have been selected,
What virtual objects a subscriber viewed and for how long, and
Subscriber profile information.

Subscriber profile information may be collected and stored for one or more subscribers for the purposes of virtual objects targeting. The subscriber profile may include demographic information that may be gathered in a number of ways. The reception site 30 builds the subscriber profile for each subscriber and stores the information in a memory file by subscriber name. The file may be uploaded to the central data collection center 50 or the local data collection center 40 and provided to subscriber data collection engine 1202 periodically. Subscriber preference information may be collected using on screen menus at the reception site 30, including information such as name, sex, age, place of birth, place of lower school education, employment type, level of education, amount of television program viewing per week, and the number of television shows in particular categories that the subscriber watches in a given week such as, sports, movies, documentaries, sitcoms, amount of Internet use and favorite web sites, etc. Any demographic information that will assist the TVOMS 300 in targeting virtual objects may be used.

In addition to demographic information gathered at the reception site 30, the subscriber profile can be compiled using other methods. For instance, subscriber information can be gathered using questionnaires sent by mail and subsequently entered in the subscriber information database 1210.

As an alternative to gathering demographic data, a simulated subscriber profile can be generated using an algorithm that analyzes subscriber access history and subscriber habits. Using test information generated from a statistically significant number of subscribers, the simulated subscriber profile algorithm estimates the subscriber's age, education, sex and other relevant information. The analysis then compares information about the subscriber, for example the subscriber's programs watched information, with that of the test group. An example of the type of information maintained for a subscriber profile is presented below.

The subscriber profile data fields are an example of typical fields that can be used in the databases. Definitions of various fields are listed below. The primary purpose of profiling the subscriber is to acquire marketing information on the subscriber's likely response to available virtual objects. Ancillary information may be available including actual program selections or interactive virtual objects selections. Information tracked within the subscriber's profile includes:

| | |
|---|---|
| Subscriber ID | A unique identifier generated by the system, one for each subscriber using a specific reception site. |
| Reception site types | Boolean field that identifies the type of reception site used. |
| Reception site ID | ID of the reception site. |
| Hookup Date | Date physical hardware is connected. |

A demographic profile may be constructed for each subscriber from questionnaires or other sources. The following fields represent this demographic information:

| | |
|---|---|
| Subscribers Age 2-5 | Boolean field if the household has subscribers between 2 and 5 years of age. |
| Subscribers Age 6-11 | Boolean field if the household has subscribers between 6 and 11 years of age. |
| Subscribers Age 12-17 | Boolean field if the household has subscribers between 12 and 17 years of age. |
| Subscribers Age N1-N2 | Boolean field if household has subscribers between N1 and N2 years of age. |
| Income | Annual household income. |
| Zip Code + 4 | Self-explanatory. |
| Occupancy | Number of subscribers in household. |
| Highest Education | Highest level of education of any subscriber in the household. |
| Field of Use | Personal, professional, educational, other. |
| Profession | Self-explanatory. |
| Education Level | Self-explanatory. |

These subscriber profile inputs may assist in the assignment of reception sites to groups for each target category. There are numerous variations to the field definitions listed above, such as different age groupings, for example. Other subscriber profile data fields may also be specified.

Marketing information, such as the demographics of subscribers, may be received from a central data collection center 50, a local data collection center 40, other external sources, or directly from the reception sites using the subscriber data collection engine 1202. To effectively manage the virtual objects targeting operations, marketing information, such as the existence of markets for certain products, may be provided to the TVOMS 300. The following examples of information may be maintained in the subscriber information database 1210: subscriber demographic profile, subscriber buy information, and correlation of demographic information with buy information. The subscriber data collection engine 1202 gathers the marketing information from the various sources and indexes the information for inclusion in the subscriber information database 1210.

Figure 11:
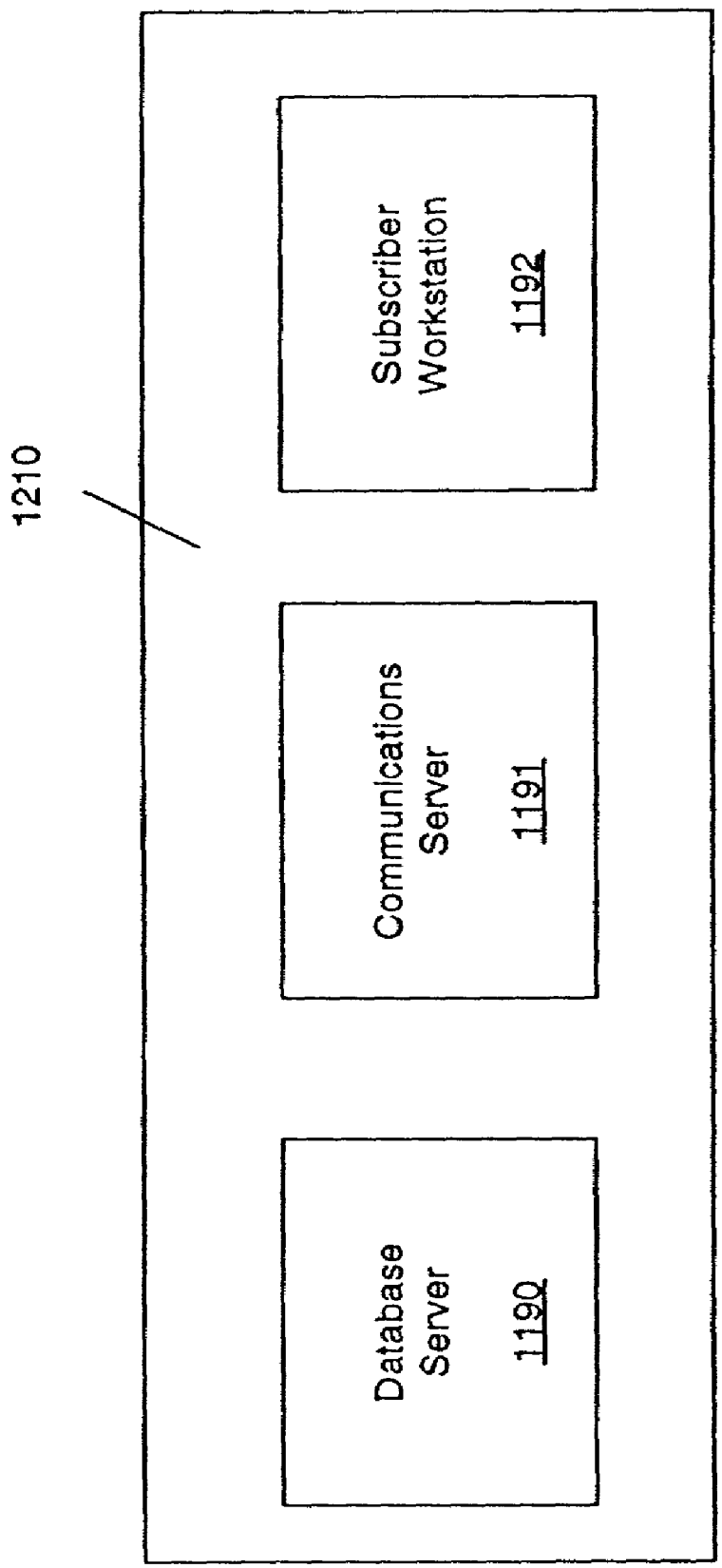
FIG. 11 shows a subscriber information database system.

To maintain the subscriber information database 1210 within the TVOMS 300, a database server 1190, communications server 1191, subscriber workstation 1192 or stations, or the suitable equivalents thereof, may be used, as depicted in FIG. 11. The database server 1190 supports saving database files, event logging, event scheduling, database server services, and database security access.

The communications server 1191 performs the following functions on database data: integrity check, filtering, processing, downloading to reception sites using the pending commands database 1215, and uploading subscriber data from reception sites using the subscriber data collection engine 1202. The subscriber workstation 1192 allows for operator viewing and entry of subscriber data into the subscriber information database 1210.

Figure 12:
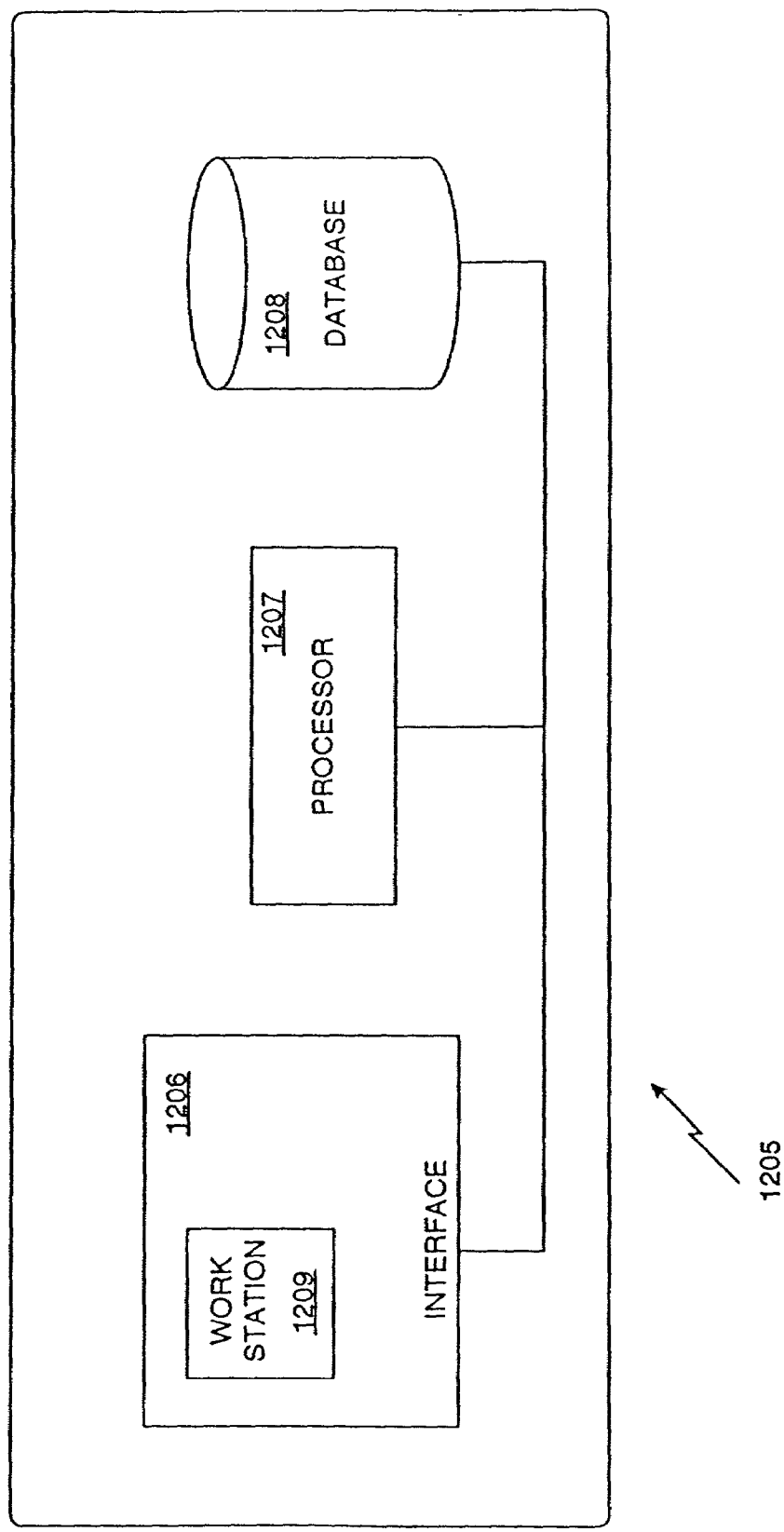
FIG. 12 shows a configuration set-up system.

FIG. 12 shows an example of the configuration set-up system 1205 in more detail. An interface 1206 receives individual addressing information unique to reception sites. The interface 1206 can include a workstation, such as the workstation 1209, for example, from which an operator manually enters reception site information. Alternately, reception site information can be automatically entered at the interface 1206 by downloading from an off-site database, the Internet, a storage medium, such as a CD-ROM or a floppy disk, or by collecting the information directly from the individual reception sites using the subscriber data collection engine 1202 or provided by a central data collection center 50 or local data collection center 40. A processor 1207 processes the received reception site information and organizes the information for use. For example, the processor 1207 may create a Category/Group Definition Matrix as presented in Table A and a Group Assignment Matrix as presented in Table B that can be used to target virtual objects to groups of reception sites or to an individual reception site 30. In an alternative embodiment, if subscriber information is available where multiple subscribers may share a reception site 30, a Group Assignment matrix may be created for each subscriber who shares the reception site 30. The Category/Group Definition Matrix and Group Assignment matrices will be described in more detail later. The Category/Group Definition and Group Assignment matrices and organized reception site information are then stored in a database 1208, and are periodically updated as reception site information, for example, changes.

The information used by the processor 1207 to create a database of the Category/Group Definition and Group Assignment matrices includes, for example, the reception site identifier, subscriber identifier, zip code+4 data, household income, and age and sex of the subscribers, for example. The information gathered by the configuration set-up system 1205 can come from a variety of sources including marketing databases, direct inputs from the subscribers, data collected by the subscriber data collection engine 1202, a central data collection center 50, a local data collection center 40, and other sources. The processor 1207 will assign category numbers to target categories. For example, the ADI could be assigned category 1 and household (HH) income could be assigned category 2. Next, the configuration set-up system 1205 creates a number of non-overlapping groups for each category. For example, ADI can be broken down into Seattle, Wash., Washington D.C., Denver Colo., Los Angles Calif., etc. Similarly, HH income can be broken down into a number of income groups such as no income, 20-40K, 40-60K, 60-120K, and over 120K. Then, the configuration set-up system 1205 assigns a "group mask representation" for each group within every category. The group mask representation may be simply a binary number that can be used to identify a particular group. Table A shows a completed Category/Group Definition matrix that could be used by the virtual object targeting system 1220 to assign targeted virtual objects to groups of reception sites or to individual reception sites.

TABLE A

Category/Group Definition Matrix

| Category Number | Category Name | Group Number | Group Definition | Group Mask Representation |
|---|---|---|---|---|
| 1 | ADI | 1 | Seattle, WA | 1000000000 |
|  |  | 2 | Washington, D.C. | 0100000000 |
|  |  | 3 | Denver, CO | 0010000000 |
|  |  | 4 | Los Angeles, CA | 0001000000 |

TABLE A-continued

Category/Group Definition Matrix

| Category Number | Category Name | Group Number | Group Definition | Group Mask Representation |
|---|---|---|---|---|
| 2 | HH income | 1 | No income | 1000000000 |
|  |  | 2 | 20-40K | 0100000000 |
|  |  | 3 | 40-60K | 0010000000 |
|  |  | 4 | 60-120K | 0001000000 |
| 3 | Category x | 1 | Group a | 1000000000 |
|  |  | 2 | Group b | 0100000000 |
|  |  | 3 | Group c | 0010000000 |
|  |  | 4 | Group d | 0001000000 |
|  |  | 5 | Group e | 0000100000 |
|  |  | 6 | Group f | 0000010000 |

The processor 1207 also creates the Group Assignment matrix. The Group Assignment matrix, shown in Table B, assigns to each reception site 30, for each category, its corresponding group number. Associated with each group number is the group definition and the group mask representation. For example, the reception site 30 identified by the address 12311 is assigned group number 2 (i.e., Washington D.C.) for ADI, and group number 3 (i.e., 40-60K) for household income. The Group Assignment matrix is updated periodically as categories and group definitions change, and as data related to individual reception sites or groups of reception sites change. Many other ways of organizing the information in a database for later use are possible.

The configuration set-up system 1205 also delivers the group configuration (i.e., information specific to an individual reception site 30, from the Group Assignment matrix) to

TABLE B

Group Assignment Matrix

| Address | Target Category | Group Number | Group Definition | Group Mask Representation |
|---|---|---|---|---|
| 12311 | ADI | 2 | Washington, D.C. | 01000000000 |
|  | HH income | 3 | 40-60K | 00100000000 |
|  | Category x | 5 | Group d | 00100000000 |
| 12312 | ADI | 4 | LA | 00100000000 |
|  | HH income | 3 | 60-120K | 00100000000 |
|  | Category x | 2 | Group a | 10000000000 |
| 12313 | ADI | 3 | Denver | 00100000000 |
|  | HH income | 4 | 60-80K | 00010000000 |
|  | Category x | 3 | Group b | 01000000000 | each reception site 30. For example, the reception site 30 assigned the address 12311 is sent for category 1, group mask representation 01000000000, indicating group 2 assignment.

The group configuration information can be stored in the pending commands database 1215 to be transmitted directly to each reception site 30 periodically or the next time the reception site 30 establishes communications operations center 10. Each time a group configuration message is generated, the message is stored in the pending commands database 1215.

Alternatively to the TVOMS 300 assigning the reception site 30 to individual groups for each category, the TVOMS 300 could deliver the group definitions and category definitions to the all reception sites. Each reception site 30 could then assign itself to the appropriate groups for each category based on internal processing algorithms.

Figure 13:
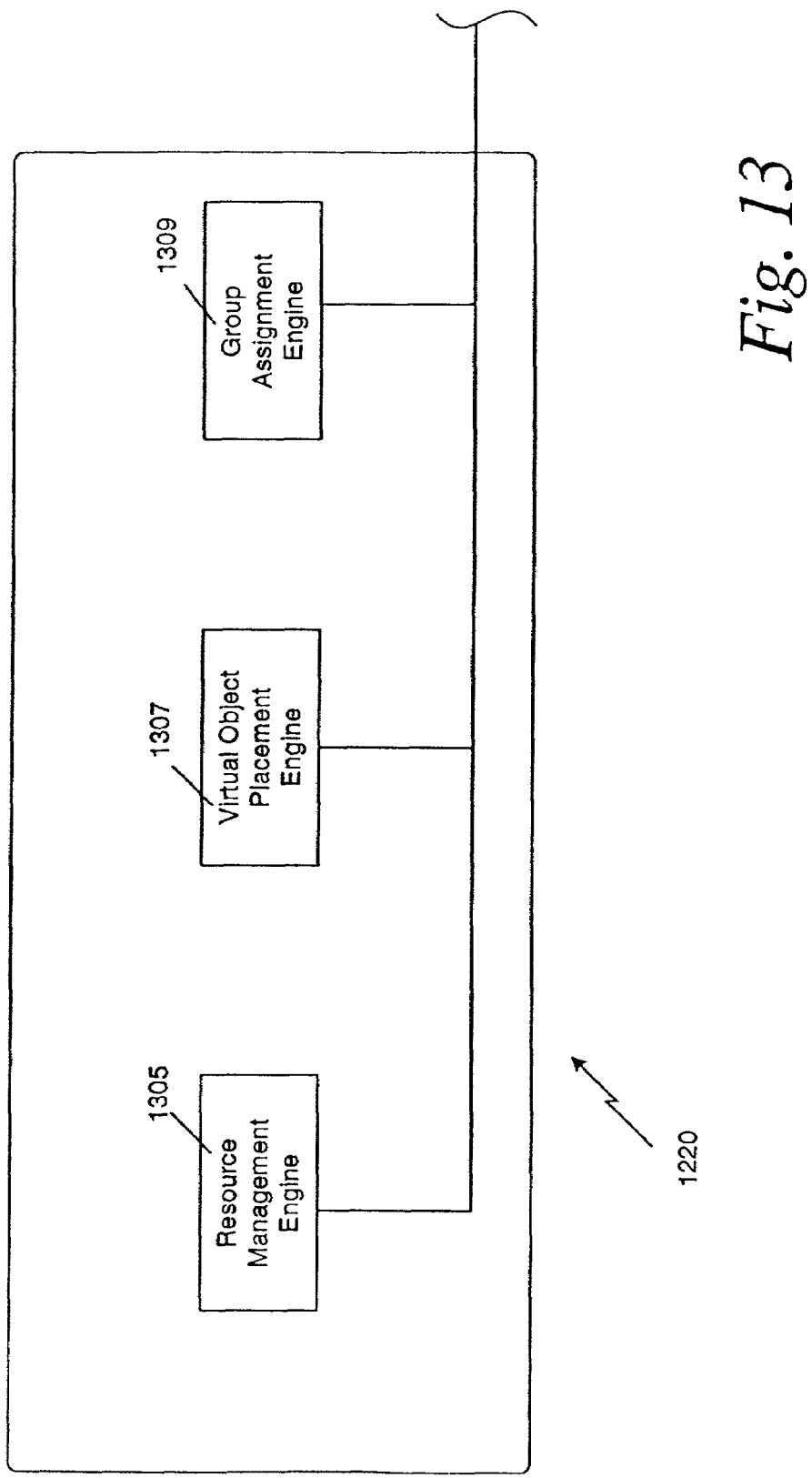
FIG. 13 shows a virtual object targeting system.

FIG. 13 shows an embodiment of the virtual object targeting system 1220 in more detail. A resource management engine 1305 uses information from a metadata extractor processor 1200 and an available virtual object database 1265 (see FIG. 9) to determine the number of virtual objects to be assigned to a given virtual object location 37. A virtual object placement engine 1307 decides which virtual objects to place in virtual object locations in the content 36. A group assignment engine 1309 determines which reception sites will view specific virtual objects. The virtual object placement engine 1307 receives information from the resource management engine 1305 related to the number of virtual objects available, how many virtual objects are to be provided for a given virtual object location 37, and the actual type of virtual objects available.

The resource management engine 1305 functions to divide available delivery bandwidth among multiple virtual objects for a given virtual object location 37 in the content 36. Because there may be a limited amount of resources on the delivery network 11 to deliver virtual objects with the content 36, the resource management engine 1305 may assign the available bandwidth optimally for the virtual objects associated with the individual virtual object locations within the content 36 being delivered over the communication channels. Some virtual object locations may be assigned multiple virtual objects, each targeted to a different group or groups, whereas other virtual object locations may be assigned only a single virtual object 38.

Referring to Table A, four group numbers (i.e., 1-4) are shown for the category of targeted virtual objects, ADI. For a particular virtual object location 37 in the content 36, the four groups can be divided into two, one for each available virtual object 38 of two total, with groups 1 and 2 receiving virtual object A and groups 3 and 4 receiving virtual object B, as shown for virtual object location 1. A retrieval plan for this later example is shown in Table C.

TABLE C

Retrieval Plan

| Virtual Object Location | Target Category | Virtual Object To Retrieve | Groups Assigned to Specific Virtual Object | Group Mask Assignment |
|---|---|---|---|---|
| Virtual Object Location 1 | ADI | Virtual Object A | 1, 2 | 11000000000 |
| | | Virtual Object B | 3, 4 | 00110000000 |
| Virtual Object Location 2 | HH Income | Virtual Object A | 1, 2, 3 | 11100000000 |
| | | Virtual Object B | 4 | 00010000000 |
| Virtual Object Location 3 | Category x | Virtual Object A | 1, 2 | 11000000000 |
| | | Virtual Object B | 3 | 00100000000 |
| | | Virtual Object C | 4 | 00010000000 |
| | | Virtual Object D | 5 | 00001000000 |
| | | Virtual Object E | 6 | 00000100000 |
| Virtual Object Location 4 | All | Virtual Object A | All | 11111111111 |

After determining how many virtual objects will be needed for each virtual object location 37 within the content 36, the resource management engine 1305 may also account for the type of available targeted virtual objects for display and the variety of subscribers (according to group assignment numbers) who may be viewing the content 36. An advertiser or content provider may provide this information when forwarding virtual objects for insertion.

In an embodiment, the virtual object placement engine 1307 determines which specific virtual objects are to be placed in each available virtual object location 37 within the content 36. The virtual object placement engine 1307 first receives the list of selected available virtual objects from the metadata extractor processor 1200 (FIG. 9). In cooperation with the resource management engine 1305, the virtual object placement engine 1307 then determines which of the available virtual objects should be placed in each virtual object location 37 within the content 36. For example, if the preferred target category for virtual object location 1 is ADI, the virtual object placement engine 1307 will select one or more targeted virtual objects determined by the metadata extractor processor 1200 to place in that virtual object location 37. If the demographic or other data assembled by the configuration set-up system 1205 indicates that more than one targeted virtual object 38 should be placed, depending on the ADI, then the virtual object placement engine 1307 will select the appropriate number of targeted virtual objects, and will assign each targeted virtual object 38 to the specific virtual object location 37. The operation of the virtual object placement engine 1307 to assign the targeted virtual objects will be described in more detail later.

In an embodiment, the group assignment engine 1309 receives inputs from the resource management engine 1305 and the virtual object placement engine 1307 and then determines which reception sites and target category groups will view specific targeted virtual objects. Thus, for each virtual object location 37, the group assignment engine 1309 assigns the reception sites to one of the virtual objects. The reception sites can be assigned based on their placement within a group (i.e., based on their group assignment number) or based on their individual reception site unit address. In tables B and C, the assignments are shown based on the group assignment numbers. As also shown in Table C, the group addressing for a virtual object location 37 may be based on a single category of targeting. This may avoid a conflict regarding which virtual object 38 a reception site 30 may retrieve.

The group assignment engine 1309 provides an output to the retrieval plan generator 1275. The output indicates which group assignment numbers (i.e., which groups of reception sites) are assigned to a virtual object 38 for a given virtual object location 37 in the content 36. The retrieval plan generator 1275 then generates a bit word, or group mask assignment, that is used to assign the groups to virtual objects. Once generated, the retrieval plan is provided to the delivery processor 1300 for distribution along with the content 36 and the actual virtual objects to reception sites by object delivery center 15.

In an embodiment, the virtual object targeting system 1220 provides a virtual object generation request command 1261 to the content and virtual object packager 1260. The virtual objects generation request command 1261 specifies which particular virtual objects are to be displayed in a particular virtual object location 37, and the actual location of the virtual objects. The virtual object 38 is then retrieved from the available virtual object database 1265. The virtual objects, along with the retrieval plan, and content 36 and associated metadata packets are provided to the delivery processor 1300 for delivery to the appropriate reception sites.

When a reception site 30 receives the content 36 that contains targeted virtual objects, software instructions operating on the reception site 30 analyze the contents of the retrieval plan. Then, based on the groups assigned for each virtual object 38, the reception site 30 retrieves those virtual objects that match its own group assignments for the target category being used for the virtual object location 37. The reception site 30 then associates those virtual objects retrieved with the appropriate virtual object location 37 where the virtual object 38 will be placed, so that when the content 36 is viewed, the virtual object 38 assigned to that virtual object location 37 is displayed.

Figure 14:
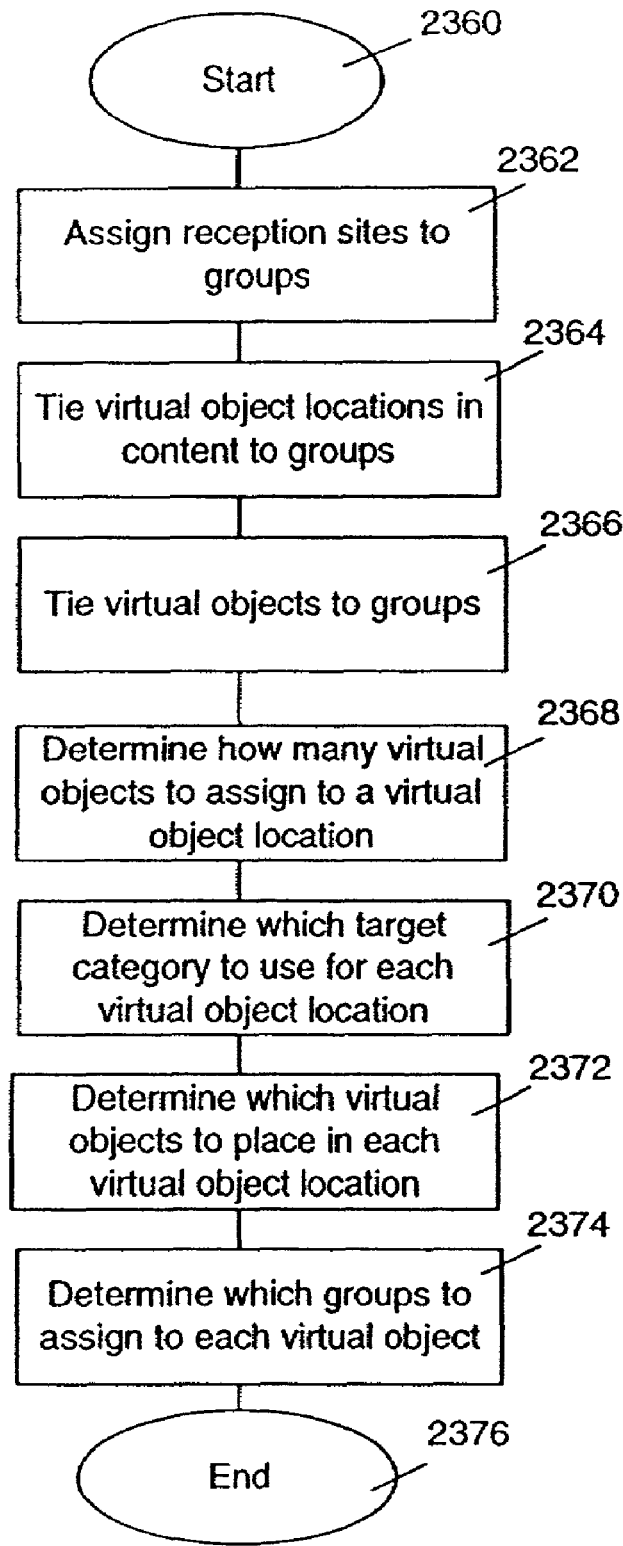
FIG. 14 presents an embodiment of the overall process for assigning targeted virtual objects.

An embodiment of the process for assigning targeted virtual objects using the virtual object placement engine 1307 is presented in FIG. 14. The process begins with block 2360. In block 2362, the virtual object placement engine 1307 assigns reception sites to groups. In block 2364, the virtual object placement engine 1307 ties or relates virtual object locations in content 36 to the groups. In block 2366, the virtual object placement engine 1307 ties or relates virtual objects to groups. In block 2368, the virtual object placement engine 1307 determines how many virtual objects to assign to a virtual object location 37. In block 2370, the virtual object placement engine 1307 determines which target category to use for one or more virtual object locations 37. In block 2372, the virtual object placement engine 1307 determines specific virtual objects to be placed in the virtual object locations 37. In block 2374, the virtual object placement engine 1307 determines which groups to assign to the virtual objects 38 for the selected virtual object locations 37. The process ends with block 2376.

As discussed above, virtual object targeting uses target categories and groups within each target category to tie or relate three entities together: 1) the reception site 30; 2) virtual objects; and 3) virtual object locations in content 36. In one embodiment of block 2362 in FIG. 14, the reception sites are assigned to groups for each target category by the configuration set-up system 1205 based on numerous factors as described below. One method to assign the reception sites to groups is to use the zip code+4 as an index into one of the available demographic marketing databases. From the zip code+4 data, a distinct demographic cluster can be determined. The demographic cluster can then be mapped directly to the specific group within each target category. Manual assignment of groups to reception sites would be a daunting task for a large population of reception sites (approaching several million). Therefore, the processor 1207 in the configuration set-up system 1205 may perform this function automatically, using its installed software routines. Alternative methods can also be devised to automatically map individual reception sites to groups within target categories. Once each reception site 30 is mapped to one group for each target category, the group assignments may be delivered to the reception site 30 for storage.

In one embodiment of block 2364 in FIG. 14, virtual object locations in content 36 are tied or related to groups as described below. For each virtual object location 37, a group breakdown percentage can be defined for each group that represents the likely compatibility of the content 36 surrounding that virtual object location 37 with each group. Breakdown percentages for each virtual object location 37 are defined within the virtual object selector 200 (see FIG. 8) and passed to the TVOMS 300. Table D shows a sample breakdown of these group breakdown percentages for five example virtual object locations for three example target categories.

The group breakdown percentage data may be derived from a number of sources including surveys, ratings services, and virtual objects viewed data collected by the reception sites, for example. In this example, the three target categories are the same as those presented in Table B, and the group assignment numbers are the same as those presented in Table A. Thus, target categories 1 and 2 each have four groups associated with them, and target category 3 has six groups associated with it. For virtual object location 1, the target category 1 refers to ADI and under group 1, a group breakdown percentage of 25 percent is assigned for group 1 from the target category ADI since 25 percent of the subscribers reside in the Seattle, Wash. ADI. The group breakdown percentages for each target category for each virtual object location 37 may sum to 100 percent.

In an embodiment of the subroutine represented by block 2366 of FIG. 14, virtual objects may be ranked according to their potential revenue generation for each group within one and up to all possible target categories, again using percentages. This information may be provided by an advertiser, programmer, or content provider responsible for the virtual objects and may reside in the available virtual objects database 1265. Table E shows a sample assignment of virtual object ranking percentages for eight sample virtual objects using the same target categories and group numbers as in Table D. Not all virtual objects may be assigned to groups for a target category if an advertiser or programmer does not wish its virtual objects to be targeted in the manner required by that target category. For example, an advertiser or programmer may want the same virtual object to be displayed at all reception sites 30, regardless of subscriber group information or characteristics.

TABLE D

Virtual Object Location Group Breakdown Percentages

| Virtual object location | Target Category | Group 1 | Group 2 | Group 3 | Group 4 | Group 5 | Group 6 |
|---|---|---|---|---|---|---|---|
| Virtual object location 1 | 1 | 25 | 25 | 25 | 25 | N/A | N/A |
| Virtual object location 1 | 2 | 30 | 10 | 20 | 40 | N/A | N/A |
| Virtual object location 1 | 3 | 10 | 20 | 30 | 40 | N/A | N/A |
| Virtual object location 2 | 1 | 10 | 20 | 30 | 40 | N/A | N/A |
| Virtual object location 2 | 2 | 25 | 25 | 25 | 25 | N/A | N/A |

TABLE D-continued

Virtual Object Location Group Breakdown Percentages

| Virtual object location | Target Category | Group 1 | Group 2 | Group 3 | Group 4 | Group 5 | Group 6 |
|---|---|---|---|---|---|---|---|
| Virtual object location 2 | 3 | 10 | 15 | 25 | 25 | 15 | 10 |
| Virtual object location 3 | 1 | 40 | 30 | 20 | 10 | N/A | N/A |
| Virtual object location 3 | 2 | 80 | 10 | 5 | 5 | N/A | N/A |
| Virtual object location 3 | 3 | 25 | 25 | 10 | 10 | 15 | 25 |
| Virtual object location 4 | 1 | 50 | 0 | 50 | 0 | N/A | N/A |
| Virtual object location 4 | 2 | 0 | 40 | 40 | 20 | N/A | N/A |
| Virtual object location 4 | 3 | 10 | 10 | 25 | 25 | 15 | 15 |
| Virtual object location 5 | 1 | 20 | 30 | 30 | 20 | N/A | N/A |
| Virtual object location 5 | 2 | 30 | 30 | 10 | 30 | 10 | 10 |
| Virtual object location 5 | 3 | 10 | 30 | 10 | 30 | 10 | 10 |

Referring to Table E, the data indicates that for virtual object 1, and target category 1 (ADI), the advertiser believes that virtual object 1 is appropriate for the subscribers in groups 1 and 2 and is not appropriate for the subscribers in groups 3 and 4. The advertiser also believes that virtual object 1 is equally appropriate for both the group 1 and the group 2 subscribers. However, if the group 1 subscribers are determined to be more likely to respond to virtual object 1 than the group 2 subscribers, then group 1 could be given a higher percentage than group 2. Table E also shows that virtual object 1 is not applicable to groups 5 and 6 because only four groups are defined for the target category ADI. Thus, all the reception sites will be grouped into one of groups 1 through 4.

TABLE E

Virtual Object Ranking Percentages

| Virtual Object | Target Category | Group 1 | Group 2 | Group 3 | Group 4 | Group 5 | Group 6 |
|---|---|---|---|---|---|---|---|
| Virtual object 1 | 1 | 50 | 50 | 0 | 0 | N/A | N/A |
| " | 2 | 30 | 10 | 20 | 40 | N/A | N/A |
| " | 3 | 0 | 0 | 0 | 0 | 0 | 0 |
| Virtual object 2 | 1 | 0 | 0 | 50 | 50 | N/A | N/A |
| " | 2 | 0 | 0 | 0 | 0 | N/A | N/A |
| " | 3 | 0 | 0 | 0 | 0 | 0 | 0 |
| Virtual object 3 | 1 | 0 | 0 | 0 | 0 | N/A | N/A |
| " | 2 | 25 | 25 | 25 | 25 | N/A | N/A |
| " | 3 | 0 | 0 | 0 | 0 | 0 | 0 |
| Virtual object 4 | 1 | 50 | 0 | 50 | 0 | N/A | N/A |
| " | 2 | 0 | 40 | 40 | 20 | N/A | N/A |
| " | 3 | 10 | 30 | 10 | 30 | 10 | 10 |
| Virtual object 5 | 1 | 40 | 20 | 20 | 40 | N/A | N/A |
| " | 2 | 10 | 30 | 30 | 30 | N/A | N/A |
| " | 3 | 30 | 30 | 30 | 5 | 5 | 0 |
| Virtual object 6 | 1 | 0 | 0 | 0 | 0 | N/A | N/A |
| " | 2 | 0 | 0 | 0 | 0 | N/A | N/A |
| " | 3 | 10 | 10 | 10 | 10 | 30 | 30 |

TABLE E-continued

Virtual Object Ranking Percentages

| Virtual Object | Target Category | Group 1 | Group 2 | Group 3 | Group 4 | Group 5 | Group 6 |
|---|---|---|---|---|---|---|---|
| Virtual object 7 | 1 | 20 | 40 | 40 | 20 | N/A | N/A |
| " | 2 | 25 | 25 | 25 | 25 | N/A | N/A |
| " | 3 | 0 | 30 | 20 | 30 | 0 | 20 |
| Virtual object 8 | 1 | 30 | 40 | 0 | 30 | N/A | N/A |
| " | 2 | 30 | 30 | 10 | 30 | N/A | N/A |
| " | 3 | 20 | 0 | 20 | 20 | 20 | 20 |

Using this paradigm, virtual objects can be targeted using at least two methods. The first is a designated multi-virtual object campaign where specific unique sets of groups are assigned for each virtual object 38 of the campaign. In the second method, each virtual object 38 provided by an advertiser is independently associated with groups. Virtual objects from several different advertisers are then used together to optimize use of virtual object locations.

As depicted in FIG. 14, blocks 2368, 2370, 2372, and 2374, the virtual object placement engine 1307 determines: 1) how many virtual objects are assigned to which virtual object location; 2) which target category is used for which virtual object location; 3) which virtual objects to place in each virtual objects location; and 4) which groups are assigned to which virtual objects, respectively. To limit the need for excessive distribution bandwidth to distribute virtual objects to reception sites, the algorithm in the virtual object placement engine 1307 that assigns targeted virtual objects to the virtual objects assumes that there is a total number of virtual objects available [TOTAL_VIRTUAL OBJECTS] for a segment of content 36 (across all virtual object locations), and assumes that no more than some maximum number of the virtual objects can be or are desired to be assigned to a given virtual object location 37. This amount is denoted as [MAX_VIRTUAL OBJECTS].

Figure 15:
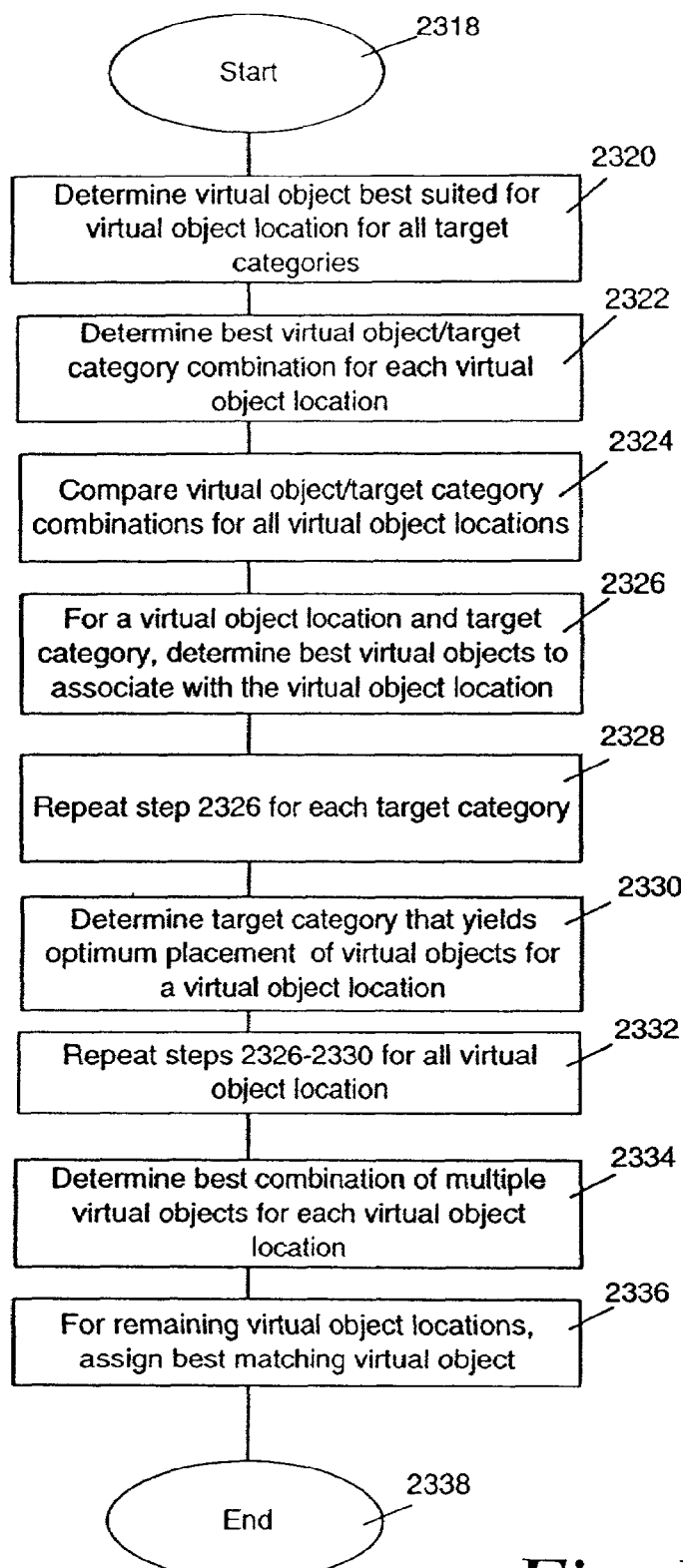
FIG. 15 presents an embodiment of a process used by the virtual object placement engine to assign virtual objects to virtual object locations.

FIG. 15 presents an embodiment of a process used by the virtual object placement engine 1307 to execute the functions listed in blocks 2368, 2370, 2372, and 2374 depicted in FIG. 14. The process begins with the start ellipse, 2318. In block 2320, the virtual object placement engine 1307 determines the virtual object 38 best suited for each virtual object location 37 for all target categories. In block 2322, the virtual object placement engine 1307 determines the best virtual object/target category combination for each virtual object location 37. In block 2324, the virtual object placement engine 1307 compares virtual object/target category combinations for all virtual object locations. In block 2326, the virtual object placement engine 1307, for a virtual object location 37 and target category, determines the best virtual objects to associate with the virtual object location 37. In block 2328, the virtual object placement engine 1307 repeats block 2326 for each target category. In block 2330, the virtual object placement engine 1307 determines the target category that yields the optimum placement of virtual objects for a virtual object location 37. In block 2332, the virtual object placement engine 1307 repeats blocks 2326, 2328, and 2330 for all virtual object locations. In block 2334, the virtual object placement engine 1307 determines the best combination of multiple virtual objects for each virtual object location 37. In block 2336, for the remaining virtual object locations, the virtual object placement engine 1307 assigns the best matching virtual object 38. The process ends with block 2338.

A further embodiment of a virtual objects targeting algorithm presented in FIG. 15 will be described with reference to the example values shown in Tables A-E. Various other prioritizing or ranking schemes may be used as described later.

Figure 16:
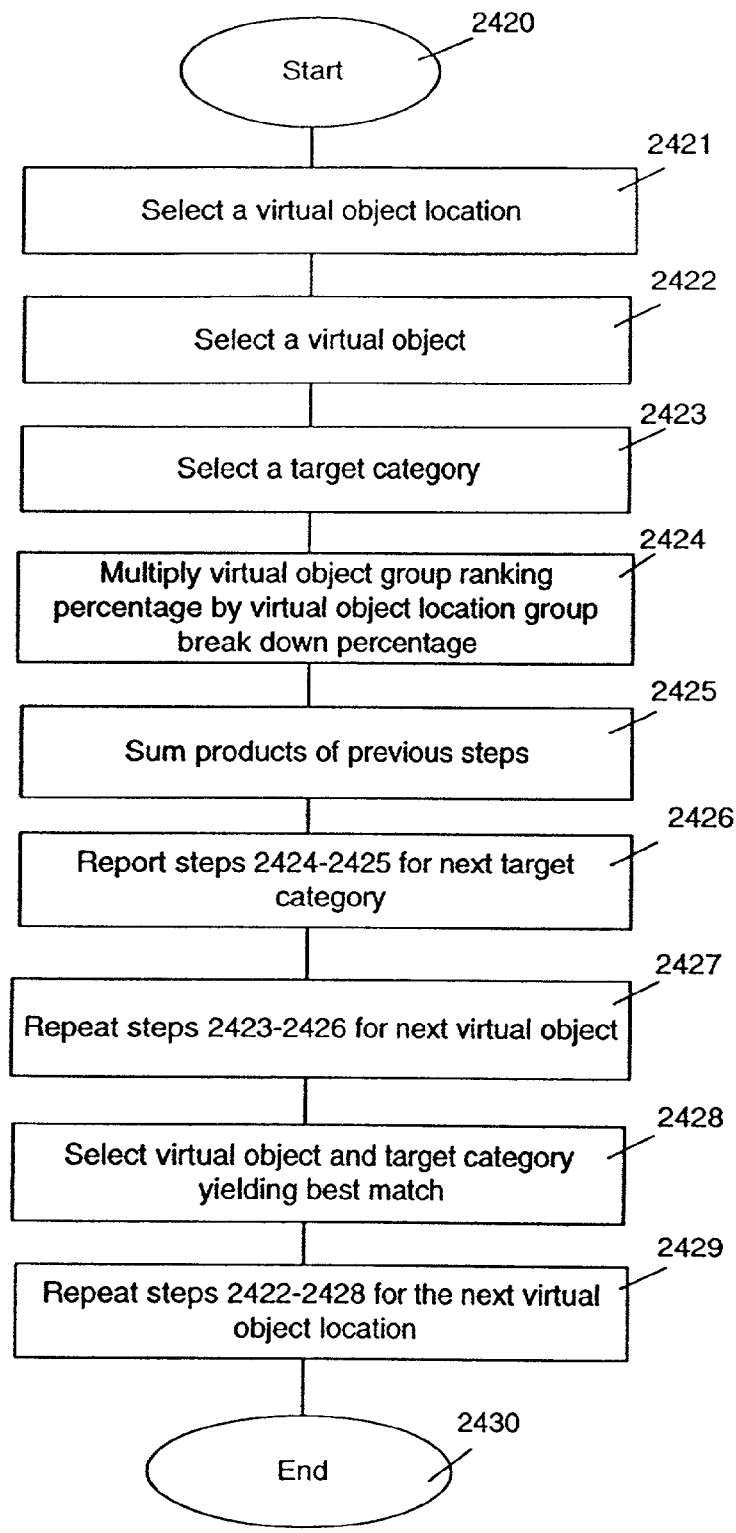
FIG. 16 presents an alternate embodiment used by the virtual object placement engine to assign virtual objects to virtual object locations.

Step 1: In block 2320 in FIG. 15, the virtual object placement engine 1307, for a virtual object location 37, determines the virtual objects with the highest overall ranking if that virtual object 38 were the only virtual object 38 to be placed in a virtual object location 37 in the content 36. This step compares the data in Tables D and E. FIG. 16 and the description that follows below present a more detailed embodiment of several of the blocks presented in FIG. 15. In step 1a, as an embodiment of block 2421 in FIG. 16, the virtual object placement engine 1307 selects the first virtual object location 37 and as an embodiment of block 2421 in FIG. 16, selects the first virtual object 38 to be analyzed. As Step 1b, for that virtual object selected in Step 1a, the virtual object placement engine 1307 selects the first category, as an embodiment of block 2423 in FIG. 16. Then, the virtual object placement engine 1307 multiplies the virtual object's Group Ranking Percentage by the virtual object location's Group Breakdown Percentage for each group as an embodiment of block 2424 in FIG. 16 and sums the result, as an embodiment of block 2425 in FIG. 16. As Step 1c, the virtual object placement engine 1307 repeats Step 1b for the next target category, as an embodiment of block 2426 in FIG. 16. As Step 1d, the virtual object placement engine 1307 repeats steps 1b and 1c for each virtual object 38, as an embodiment of block 2427 in FIG. 16. As Step 1e, for the virtual object location 37 under consideration, the virtual object placement engine 1307 selects the virtual object/target category that yields the highest summed value, as an embodiment of block 2428 in FIG. 16. Then, for Step 1f, the virtual object placement engine 1307 repeats Steps 1b-1e for all virtual object locations, as an embodiment of block 2429 in FIG. 16.

For example, using virtual object location 1, virtual object 1:

50*25+50*25+0*25+0*25=25%  target category 1

30*30+10*10+20*20+40*40=30%  target category 2

0*10+0*10+0*20+0*20 0*20+0*20=0%  target category 3

The cross-multiplied result then shows a measure of effectiveness for each virtual object 38 if displayed in the corresponding virtual object location 37. Table F below presents the results of Step 1 above for virtual object location 1

TABLE F

| Virtual object location/ Virtual object | Target Category | Group 1 | Group 2 | Group 3 | Group 4 | Group 5 | Group 6 | Summation |
|---|---|---|---|---|---|---|---|---|
| 1/1 | 1 | 12.5 | 12.5 | 0 | 0 | 0 | 0 | 25 |
|  | 2 | 9 | 1 | 4 | 16 | 0 | 0 | 30 |
|  | 3 | 0 | 0 | 0 | 0 | 0 | 0 | 0 |
| 1/2 | 1 | 0 | 0 | 12.5 | 12.5 | 0 | 0 | 25 |
|  | 2 | 0 | 0 | 0 | 0 | 0 | 0 | 0 |
|  | 3 | 0 | 0 | 0 | 0 | 0 | 0 | 0 |
| 1/3 | 1 | 0 | 0 | 0 | 0 | 0 | 0 | 0 |
|  | 2 | 7.5 | 2.5 | 5 | 10 | 0 | 0 | 25 |
|  | 3 | 0 | 0 | 0 | 0 | 0 | 0 | 0 |
| 1/4 | 1 | 12.5 | 0 | 12.5 | 0 | 0 | 0 | 25 |
|  | 2 | 0 | 4 | 8 | 8 | 0 | 0 | 20 |
|  | 3 | 1 | 3 | 2 | 6 | 2 | 2 | 16 |
| 1/5 | 1 | 10 | 5 | 5 | 5 | 0 | 0 | 25 |
|  | 2 | 3 | 3 | 6 | 12 | 0 | 0 | 24 |
|  | 3 | 3 | 3 | 6 | 1 | 1 | 0 | 14 |
| 1/6 | 1 | 0 | 0 | 0 | 0 | 0 | 0 | 0 |
|  | 2 | 0 | 0 | 0 | 0 | 0 | 0 | 0 |
|  | 3 | 1 | 1 | 2 | 2 | 6 | 6 | 18 |
| 1/7 | 1 | 5 | 5 | 10 | 5 | 0 | 0 | 25 |
|  | 2 | 7.5 | 2.5 | 5 | 10 | 0 | 0 | 25 |
|  | 3 | 0 | 3 | 4 | 6 | 0 | 4 | 17 |
| 1/8 | 1 | 7.5 | 10 | 0 | 7.5 | 0 | 0 | 25 |
|  | 2 | 9 | 3 | 2 | 12 | 0 | 0 | 26 |
|  | 3 | 2 | 0 | 4 | 4 | 4 | 4 | 18 |

Step 2: Returning to FIG. 15, for each virtual object location 37, the virtual object placement engine 1307, in block 2322, determines the virtual object/target category combination that results in the highest overall ranking. In one embodiment the virtual object placement engine 1307, lists the virtual object locations, the overall ranking, the corresponding virtual object 38, and the corresponding target category. In case of a tie, the virtual object placement engine 1307 selects any virtual object 38 with the overall highest ranking. Table G shows the results. Thus, from Table G, virtual object 4, a virtual object 38 displayed within virtual object location 4 yields a measure of effectiveness of 50 (highest) and virtual object 8 along within virtual object location 5 yields a measure of effectiveness of 28.

TABLE G

| Virtual Object Location | Highest Overall Ranking | Corresponding Virtual Object | Corresponding Target Category |
|---|---|---|---|
| Virtual object location 1 | 30 | Virtual Object 1 | 2 |
| Virtual object location 2 | 35 | Virtual Object 2 | 1 |
| Virtual object location 3 | 35 | Virtual Object 1 | 1 |
| Virtual object location 4 | 50 | Virtual Object 4 | 1 |
| Virtual object location 5 | 28 | Virtual Object 8 | 2 |

Step 3: In one embodiment of block 2324 in FIG. 15, the virtual object placement engine 1307 orders the resulting list of virtual object locations from Step 2 from lowest overall ranking to highest overall ranking to compare virtual object/target category combinations for virtual object locations. Table H shows the results.

TABLE H

| Virtual Object Location | Overall Ranking | Corresponding Virtual Object | Corresponding Target Category |
|---|---|---|---|
| Virtual object location 5 | 28 | Virtual Object 8 | 2 |
| Virtual object location 1 | 30 | Virtual Object 1 | 2 |
| Virtual object location 2 | 35 | Virtual Object 2 | 1 |
| Virtual object location 3 | 35 | Virtual Object 1 | 1 |
| Virtual object location 4 | 50 | Virtual Object 4 | 1 |

Step 4: In one embodiment of block 2326 in FIG. 15, the virtual object placement engine 1307 uses the process shown in FIG. 17 to determine the best virtual objects to associate with a virtual object location 37. The block begins with ellipse 2440. In block 2441 in FIG. 17, the virtual object placement engine 1307 selects the virtual object location 37 from Step 3 resulting in the lowest overall ranking. As Step 4a, for the selected virtual object location 37, the virtual object placement engine 1307 selects the first target category, as an embodiment of block 2442 in FIG. 17. As Step 4b, the virtual object placement engine 1307 assembles a table showing the product of each virtual object Group Ranking Percentage and virtual object location Group Breakdown Percentage combination. Table I below provides an example for virtual object location 5 and target category 1.

TABLE I

| Virtual Object Location/Virtual Object | Target Category | Group 1 | Group 2 | Group 3 | Group 4 | Summation |
|---|---|---|---|---|---|---|
| 5/1 | 1 | 10 | 15 | 0 | 0 | 25 |
| 5/2 | 1 | 0 | 0 | 15 | 10 | 25 |
| 5/3 | 1 | 0 | 0 | 0 | 0 | 0 |
| 5/4 | 1 | 10 | 0 | 15 | 0 | 25 |
| 5/5 | 1 | 8 | 6 | 6 | 4 | 24 |
| 5/6 | 1 | 0 | 0 | 0 | 0 | 0 |
| 5/7 | 1 | 4 | 6 | 12 | 4 | 26 |
| 5/8 | 1 | 6 | 12 | 0 | 6 | 24 |

Figure 17:
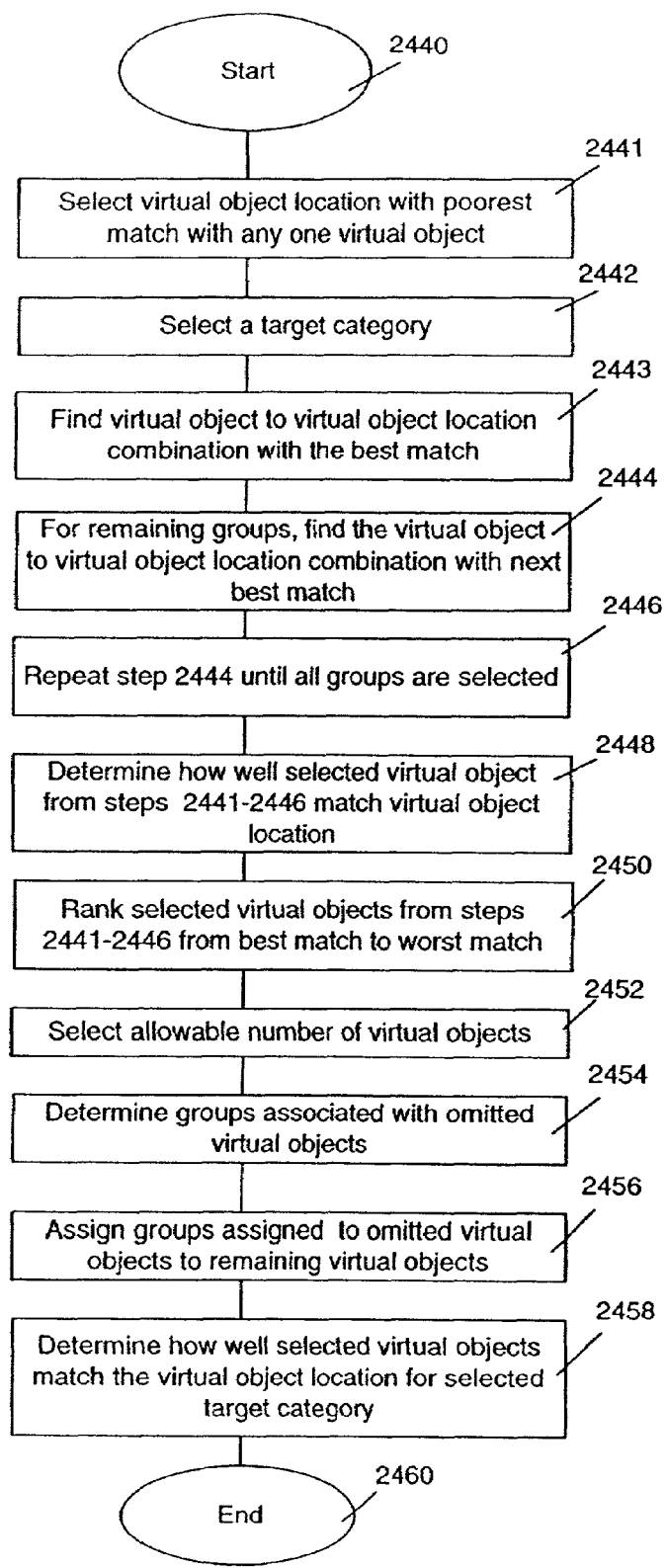
FIG. 17 presents yet another embodiment used by the virtual object placement engine to assign virtual objects to virtual object locations.

As Step 4c, as an embodiment of block 2443 in FIG. 17, the virtual object placement engine 1307 finds the product that is the highest. In case of a tie, the virtual object placement engine 1307 selects the product that corresponds to the highest summation value for that virtual object location/virtual object combination. In case a tie still persists, the virtual object placement engine 1307 selects any of the cells with an equivalent value. Table J below shows the previous example continued where group 2 for virtual object location/virtual object combination 5/1 is selected.

TABLE J

| Virtual Object Location/Virtual Object | Target Category | Group 1 | Group 2 | Group 3 | Group 4 | Summation |
|---|---|---|---|---|---|---|
| 5/1 | 1 | 10 | *15* | 0 | 0 | 25 |
| 5/2 | 1 | 0 | 0 | 15 | 10 | 25 |
| 5/3 | 1 | 0 | 0 | 0 | 0 | 0 |
| 5/4 | 1 | 10 | 0 | 15 | 0 | 25 |
| 5/5 | 1 | 8 | 6 | 6 | 4 | 24 |
| 5/6 | 1 | 0 | 0 | 0 | 0 | 0 |
| 5/7 | 1 | 4 | 6 | 12 | 4 | 26 |
| 5/8 | 1 | 6 | 12 | 0 | 6 | 24 |

Step 5: As an embodiment of block 2444 in FIG. 17, the virtual object placement engine 1307 finds the product that is next highest (or the same value as in Step 4), but that is associated with a group not yet selected. Again, in case of a tie, the virtual object placement engine 1307 selects the product that corresponds to the highest summation value for that virtual object location/virtual object combination. In case a tie still persists, the virtual object placement engine 1307 selects any of the cells with an equivalent value. Table K below shows the previous example continued.

TABLE K

| Virtual Object Location/Virtual Object | Target Category | Group 1 | Group 2 | Group 3 | Group 4 |
|---|---|---|---|---|---|
| 5/1 | 1 | *10* | *15* | 0 | 0 |
| 5/2 | 1 | 0 | 0 | *15* | *10* |
| 5/3 | 1 | 0 | 0 | 0 | 0 |
| 5/4 | 1 | 10 | 0 | 15 | 0 |
| 5/5 | 1 | 8 | 6 | 6 | 4 |
| 5/6 | 1 | 0 | 0 | 0 | 0 |
| 5/7 | 1 | 4 | 6 | 12 | 4 |
| 5/8 | 1 | 6 | 12 | 0 | 6 |

Step 6: As an embodiment of block 2446 in FIG. 17, the virtual object placement engine 1307 repeats Step 5 until a product has been selected for all groups. Table L below continues the example.

TABLE L

| Virtual Object Location/Virtual Object | Target Category | Group 1 | Group 2 | Group 3 | Group 4 |
|---|---|---|---|---|---|
| 5/1 | 1 | *10* | *15* | 0 | 0 |
| 5/2 | 1 | 0 | 0 | *15* | *10* |
| 5/3 | 1 | 0 | 0 | 0 | 0 |
| 5/4 | 1 | 10 | 0 | 15 | 0 |
| 5/5 | 1 | 8 | 6 | 6 | 4 |
| 5/6 | 1 | 0 | 0 | 0 | 0 |
| 5/7 | 1 | 4 | 6 | 12 | 4 |
| 5/8 | 1 | 6 | 12 | 0 | 6 |

Step 7: As an embodiment of block 2448 in FIG. 17, for all virtual objects with products cells selected in Step 6, the virtual object placement engine 1307 calculates the summed products of those selected cells for each virtual object 38. Table M below shows the results.

TABLE M

| Virtual Object Location/ Virtual Object | Target Category | Group 1 | Group 2 | Group 3 | Group 4 | Summation |
|---|---|---|---|---|---|---|
| 5/1 | 1 | *10* | *15* | 0 | 0 | 25 |
| 5/2 | 1 | 0 | 0 | *15* | *10* | 25 |
| 5/3 | 1 | 0 | 0 | 0 | 0 | 0 |
| 5/4 | 1 | 10 | 0 | 15 | 0 | 0 |
| 5/5 | 1 | 8 | 6 | 6 | 4 | 0 |
| 5/6 | 1 | 0 | 0 | 0 | 0 | 0 |
| 5/7 | 1 | 4 | 6 | 12 | 4 | 0 |
| 5/8 | 1 | 6 | 12 | 0 | 6 | 0 |

Step 8: As an embodiment of block 2450 in FIG. 17, the virtual object placement engine 1307 orders the virtual objects in Step 7 from highest summed value to lowest. In case of equal summed values, the virtual object placement engine 1307 arbitrarily orders those virtual objects with the same summed value. Table N presents the example results.

TABLE N

| Virtual Object Location/ Virtual Object | Target Category | Group 1 | Group 2 | Group 3 | Group 4 | Summation |
|---|---|---|---|---|---|---|
| 5/1 | 1 | 10 | 15 | 0 | 0 | 25 |
| 5/2 | 1 | 1 | 0 | 15 | 10 | 25 |

Step 9: As Step 9a, if the number of virtual objects selected in Step 8 exceeds [MAX_VIRTUAL OBJECTS], the virtual object placement engine 1307 selects the first [MAX_VIRTUAL OBJECTS] virtual objects with the summed value as an embodiment of block 2452 in FIG. 17. For example, if it is desired to assign at most two virtual objects to a virtual object location 37, the virtual object placement engine 1307 selects the two virtual objects with the highest virtual object Group Ranking Percentage and virtual object location Group Breakdown Percentage products. Next, as Step 9b, for the unselected virtual objects, the virtual object placement engine 1307 determines those groups that were associated with these omitted virtual objects, as an embodiment of block 2454 in FIG. 17.

Step 10: As an embodiment of block 2456 in FIG. 17, for the virtual objects associated with the groups determined in Step 9b, the virtual object placement engine 1307 selects the product within that group that is the highest for the [MAX_VIRTUAL OBJECT] selected virtual objects from Step 9a. The virtual object placement engine 1307 recalculates the summed products of those selected groups cells for each of the virtual objects. Table O below provides a new example, assuming [MAX_VIRTUAL OBJECTS]=2; therefore, groups 5 and 6, which are associated with virtual object 6, may be reallocated to virtual objects 7 & 5, respectively.

TABLE O

| Virtual object location/ Virtual object | Target Category | Group 1 | Group 2 | Group 3 | Group 4 | Group 5 | Group 6 | Summation |
|---|---|---|---|---|---|---|---|---|
| Result before Step 10 is shown below: | | | | | | | | |
| 5/7 | 3 | 0 | *9* | 2 | *9* | 0 | 2 | 18 |
| 5/5 | 3 | *3* | 9 | *3* | 1.5 | 0.5 | 0 | 6 |
| 5/6 | 3 | 1 | 3 | 1 | 3 | *3* | *3* | 6 |
| Result after Step 10 is shown below: | | | | | | | | |
| 5/7 | 3 | 0 | *9* | 2 | *9* | 0 | *2* | 20 |
| 5/5 | 3 | *3* | 9 | *3* | 1.5 | *0.5* | 0 | 6.5 |
| 5/6 | 3 | 1 | 3 | 1 | 3 | 3 | 3 | 0 |

Step 11: As an embodiment of block 2458 in FIG. 17, the virtual object placement engine 1307 calculates the total summed product value for all virtual objects selected in Step 10. From Table P, this value is 26.5. The resultant groups selected for each virtual object 38 will serve as the group assignments if this virtual object location/target category ultimately results in the best match, as determined in the remaining steps of the algorithm.

TABLE P

| Virtual object location/ Virtual object | Target Category | Group 1 | Group 2 | Group 3 | Group 4 | Group 5 | Group 6 | Summation |
|---|---|---|---|---|---|---|---|---|
| 5/7 | 3 | 0 | *9* | 2 | *9* | 0 | *2* | 20 |
| 5/5 | 3 | *3* | 9 | *3* | 1.5 | 0.5 | 0 | 6.5 |
| Total summed product values | | | | | | | | 26.5 |

Step 12: The virtual object placement engine 1307 repeats steps 4-11 above for the same selected virtual object location 37 of Step 4 using the remaining target categories, as an embodiment of block 2328 in FIG. 15. The Table Q example below provides the output results for each of the three example target categories.

TABLE Q

| Virtual object location/ Virtual object | Target Category | Group 1 | Group 2 | Group 3 | Group 4 | Summation |
|---|---|---|---|---|---|---|
| 5/1 | 1 | *10* | *15* | 0 | 0 | 25 |
| 5/2 | 1 | 0 | 0 | *15* | *10* | 25 |
| Total summed product values | | | | | | 50 |

| Virtual object location/ Virtual object | Target Category | Group 1 | Group 2 | Group 3 | Group 4 | Group 5 | Group 6 | Summation |
|---|---|---|---|---|---|---|---|---|
| 5/1 | 2 | *9* | 3 | 2 | *12* | 0 | 0 | 21 |
| 5/4 | 2 | 0 | *12* | *4* | 6 | 0 | 0 | 16 |
| Total summed product values | | | | | | | | 37 |
| 5/7 | 3 | 0 | *9* | 2 | *9* | 0 | *2* | 20 |
| 5/5 | 3 | *3* | 9 | *3* | 1.5 | *0.5* | 0 | 6.5 |
| Total summed product values | | | | | | | | 26.5 |

Step 13: As an embodiment of block 2330 in FIG. 15, the virtual object placement engine 1307 selects the target category that yields the highest total summed product amount. The virtual object placement engine 1307 assigns this as the Maximum Rank for that virtual object location 37. In the case above, the virtual object placement engine 1307 would assign target category 1, with a value of 50 that is selected.

Step 14: As an embodiment of block 2332 in FIG. 15, the virtual object placement engine 1307 repeats Steps 4-13 for the virtual object location 37 selected in Step 4 with the next lowest overall ranking, computing the Maximum Rank for each virtual object location 37.

Step 15: As an embodiment of block 2334 in FIG. 15, the virtual object placement engine 1307 uses the available [MAX_VIRTUAL OBJECTS] virtual objects for the virtual object locations up to the maximum number of [TOTAL_VIRTUAL OBJECTS] that yield the largest Maximum Rank. The virtual object placement engine 1307 makes use of the relevant target category determined in Step 13, with virtual objects as determined in Step 10, with group assignments as determined in Step 11.

Step 16: As an embodiment of block 2336 in FIG. 15, for all other virtual object locations, the virtual object placement engine 1307 assigns the single virtual objects that yielded the highest Overall Ranking as determined in Step 2.

The above algorithm performed by the virtual object placement engine 1307 is meant to be illustrative and not limiting. Other algorithms are possible for assigning targeted virtual objects to groups of reception sites or to individual reception sites. Other targeted virtual object routines can also be used by the virtual object placement engine 1307.

The above algorithm can be simplified in the case where virtual objects are being selected to be delivered with the content 36 to be received by a single subscriber or reception site 30. In this case, prior to initiating the steps in the algorithm, the virtual object location Group Breakdown Percentages table may be modified to display a group breakdown percentage of 0 for all groups that the subscriber does not belong to for each target category.

An alternate virtual object targeting routine 1374 is described in U.S. Pat. No. 5,600,364, to Hendricks, John S, entitled NETWORK CONTROLLER FOR CABLE TELEVISION DELIVERY SYSTEM, which is hereby incorporated by reference. In this alternative, software in the virtual object targeting system 1220 generates packages of virtual objects geared towards particular subscribers and makes use of a subscriber's demographic information and viewing habits to determine those virtual objects that are of most interest to that particular subscriber. The routine 1374 then outputs packages of virtual objects targeted towards each subscriber or group of subscribers.

Figure 18:
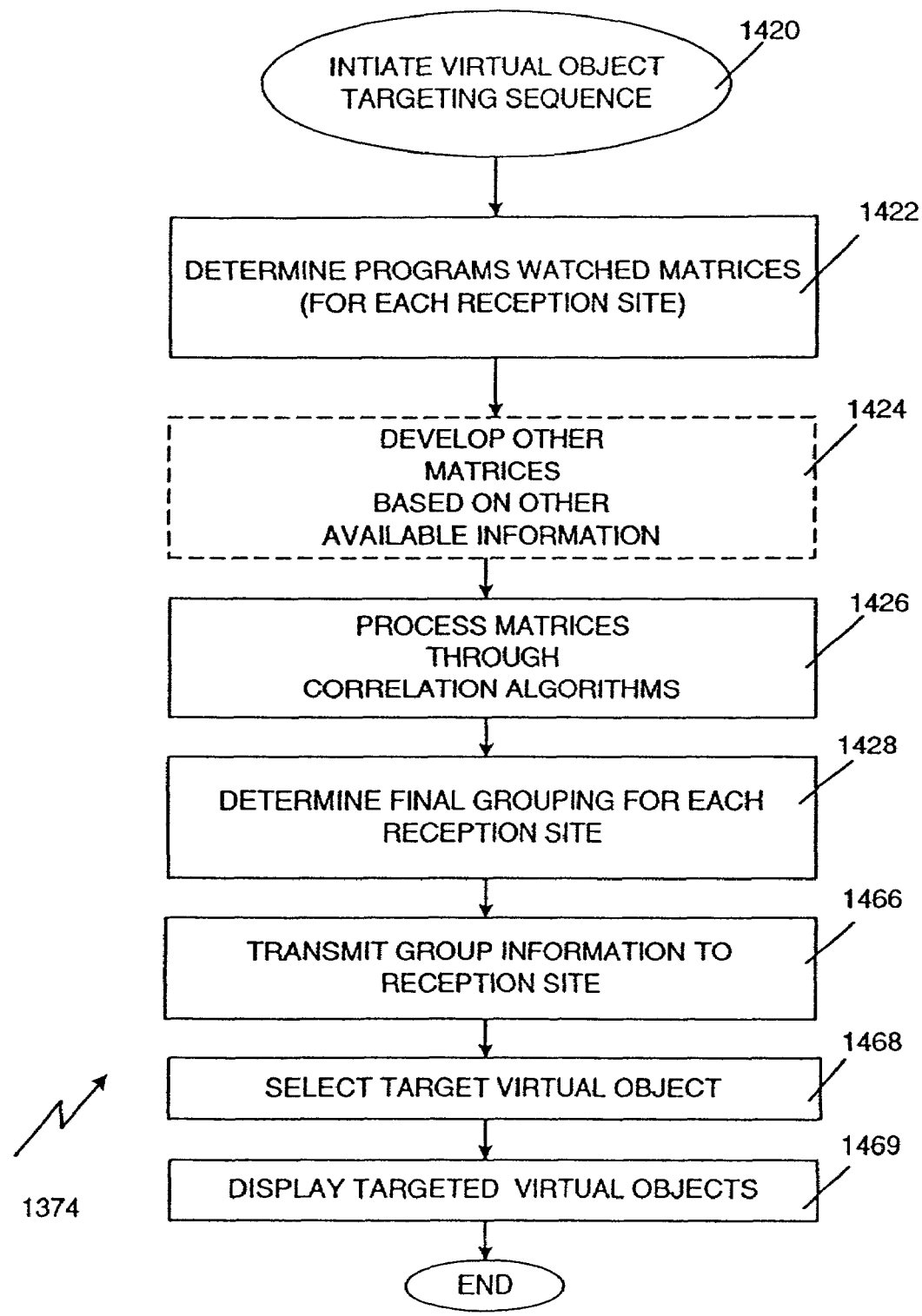
FIG. 18 shows functions of an alternate virtual object targeting routine.

FIG. 18 shows the seven primary functions of an alternate virtual object targeting routine 1374. The function of the routine 1374 is to target virtual objects for reception sites based on historical programs watched data and other data that is available at the TVOMS 300. In the discussion that follows, the alternate virtual object targeting routine 1374 is described as executed at the TVOMS 300.

The process may be initiated as shown at initiation ellipse 1420. In the first subroutine, identified at block 1422, the virtual object targeting system 1220 determines the programs watched matrices stored in the subscriber information database 1210. The determine programs watched matrices subroutine 1422 uses a unique reception site ID to access a specific matrix for one reception site. These matrices are maintained and updated by periodic collections by the operations center 10 of accumulated information from the reception sites. In the second subroutine, shown at block 1424, the virtual object targeting system 1220 develops other matrices based on other available information. To develop other matrices based on other available information subroutine 1424 is an optional subroutine not required for the functioning of the system. For groups of reception sites or for each individual reception site, matrices may be developed based on the demographic information, billing information, pricing information, age information and other information that may be stored in the subscriber information database 1210.

In the process matrices through correlation algorithms subroutine, block 1426, the virtual object targeting system 1220 processes all matrices through a set of correlation algorithms. In particular, the virtual object targeting system 1220 takes matrices developed in the first two subroutines 1422 and 1424 and processes the matrices until reaching a final matrix.

Figure 19:
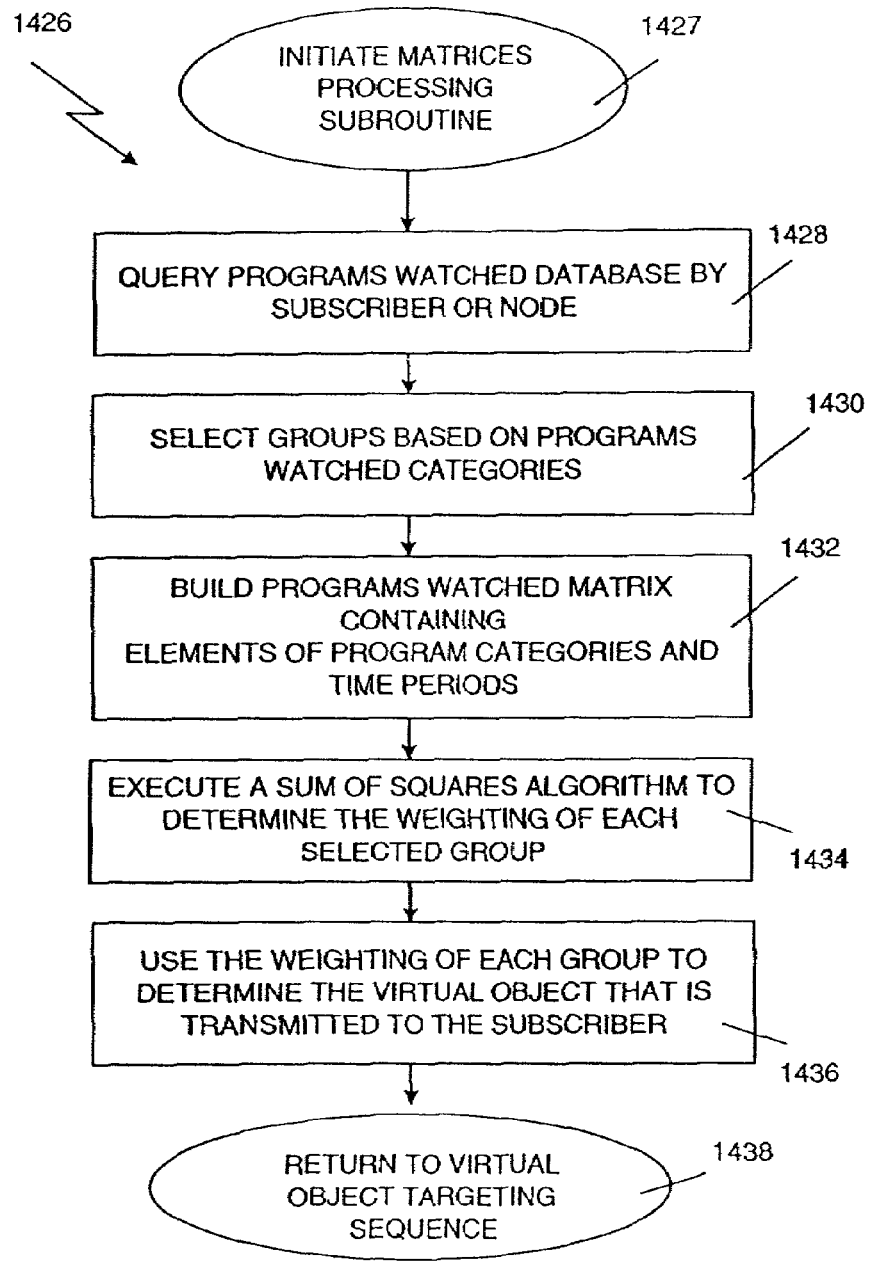
FIG. 19 shows an embodiment of a matrices processing subroutine that is called by the virtual objects targeting sequence.

FIG. 19 shows an embodiment of the matrices processing subroutine 1426 that is called by the virtual objects targeting sequence 1374 shown in FIG. 18. As shown in FIG. 19, the virtual object targeting system 1220 initiates the matrices processing subroutine 1426 at initiation ellipse 1427 and then accesses or queries, at block 1420, the programs watched file and gathers information regarding either an individual subscriber or a group of subscribers. The virtual object targeting system 1220 can gather the programs watched information in this way for individual subscribers or a group of subscribers.

Once the programs watched information has been gathered in the database, the virtual object targeting system 1220 selects and groups, at block 1430, programs watched categories and time periods. The software initially takes each program category (e.g., sports, news, mysteries, etc.) and determines the number of programs watched for a given time. The periods may be set to any length of time, including, for example, one, two, three or four weeks. The virtual object targeting system 1220 will loop through such a counting process for each group and period and then proceed to build a programs watched matrix, at block 1432, based on the program categories and periods. Essentially, all programs watched in a particular category and time period will be entered into the programs watched matrix. Once the matrix has been built, the virtual object targeting system 1220, using matrices processing subroutine 1426, will process the matrix for a given subscriber or group of subscribers through the correlation algorithms.

A number of correlation algorithms may be used to weight each selected program category. For example, as shown at block 1434, the virtual object targeting system 1220 may use a sum of squares algorithm to determine the weighting. Once weighted, the weighted categories will be correlated by the virtual object targeting system 1220 at block 1436, with various virtual objects stored in the available virtual objects database 1265. The virtual object targeting system 1220 then selects a set of the most heavily weighted virtual objects for inclusion within the content 36 to be delivered to individual subscribers or groups of subscribers. Having determined the weightings of each group and prioritizing the groups accordingly, the virtual object targeting system 1220 returns, block 1438, to the virtual objects targeting sequence 1374 of FIG. 18.

Referring back to FIG. 18, in the fourth subroutine, as represented at block 1428, the virtual object targeting system 1220 uses the final matrix developed by the correlation and weighing algorithm described above, to select a grouping (or selective filter) for each reception site 30. The final groupings of virtual objects that may be sent to the reception sites or group of reception sites may use a subroutine as diagramed in FIG. 20.

Figure 20:
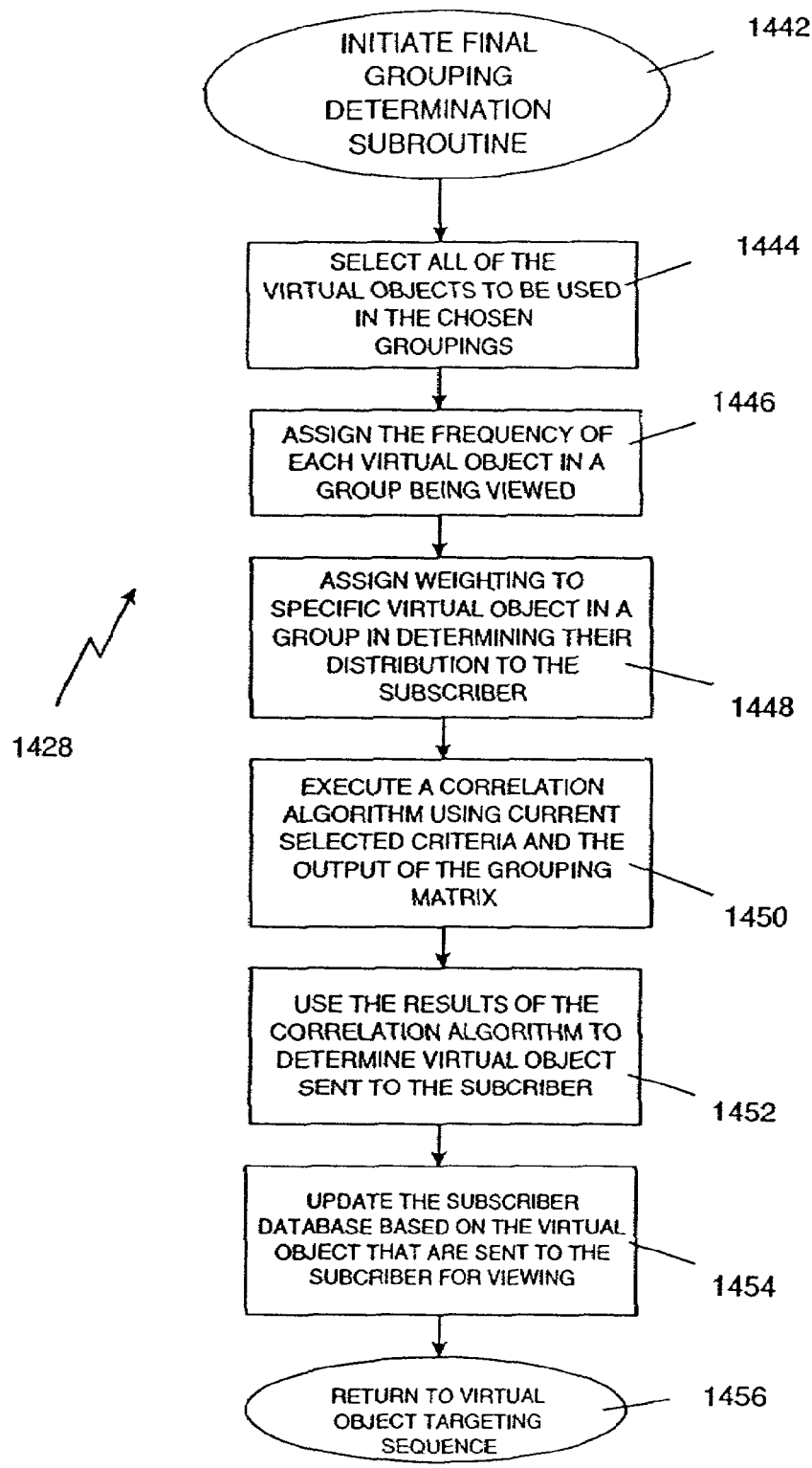
FIG. 20 shows a subroutine used to select the final groupings of virtual objects to be sent to the reception sites or group of reception sites.

The fourth subroutine 1428, depicted in FIG. 20, is called or initiated by the virtual objects targeting sequence 1374 of FIG. 18 in order to determine the final groupings. In the subroutine shown at block 1444, the virtual object targeting system 1220 selects a set of virtual objects that will be used in the chosen groupings. This selection process may involve virtual objects from various virtual objects categories. Each virtual object 38 may subsequently be assigned a number of times that it will be shown in a given segment of content 36. The frequency of display may be based on various factors, including the number of requests and cost paid by the respective advertisers to have the virtual objects displayed, as shown in block 1446. Such factors may be used by the virtual object targeting system 1220 in the next step of the subroutine, at block 1448, at which the virtual object targeting system 1220 assigns a weighting to specific virtual objects in each virtual objects category. These weightings are used to prioritize the virtual objects that will be sent to individual reception sites or group of reception sites.

Once the virtual objects have been weighted, the virtual object targeting system 1220 executes a correlation algorithm, at block 1450, using selected criteria (i.e., the various factors used to weight the virtual objects) as well as the output of each programs watched matrix. Any number of correlation algorithms and weighting algorithms may be used, including the sum of squares weighting algorithm described above.

The results from the correlation algorithm subsequently determine the virtual objects and program content 36 that is sent to the virtual object targeting system 1220 for distribution. Once the virtual object targeting system 1220 at the fourth subroutine 1428 completes these steps, the subscriber information database 1210 updates the subscriber record based on the virtual objects that are sent, as shown at block 1454. The database update allows the advertisers to track the costs and frequency of the virtual objects targeted to specific reception sites or groups of reception sites. Following the updates, the virtual object targeting system 1220 returns to the virtual objects targeting sequence shown in FIG. 18, block 1456.

Referring to FIG. 21, reception site groupings (1 through 5) 1460 are shown. The number of reception site groupings available may be determined by the bandwidth available to transmit virtual objects along with content 36. The available bandwidth or resources provided by the delivery network 11 may limit the number of virtual objects that are available to distribute to the reception site 30.

Referring back to FIG. 18, the virtual object targeting system 1220 at the fifth subroutine, represented at block

1466, prepares reception site group information for transmission to the reception sites along with the requested content 36.

In the sixth subroutine, block 1468, the virtual object targeting system 1220 selects the targeted virtual objects. The sixth subroutine 1468 is the last decision making process in displaying a targeted virtual objects for a subscriber. As shown in block 1469, the reception site 30 then displays the targeted virtual objects with the content 36.

As noted above, targeted advertising can be based on viewing a specific program or a category of programming content 36. In an embodiment, the reception site 30 performs this last step by correlating (or matching) the program being watched by the subscriber with the reception site group information that has been previously transmitted by the TVOMS 300. FIG. 21 shows an exemplary table matching reception site groups 1460 and program categories 1470 with specific virtual objects. The virtual objects are shown in FIG. 22 at 1474 and are assigned Roman numerals I through X, for example. The number of reception site groupings and virtual objects can vary. FIG. 22 shows a division of available bandwidth to carry ten virtual objects. In this example, the virtual objects 1474 are numbered 1101-1110.

The TVOMS 300 will transmit group information to a reception site 30 shown as row names 1460 on FIG. 21. The TVOMS 300 will also transmit data that informs the reception site 30 which of the multiple virtual objects 1474 is assigned to a program category shown as columns 1470 on FIG. 21. Each reception site 30 only requires the data related to that reception site's assigned group (or row). For example, in FIG. 21, the reception site 30 in group 1 (row 1) is provided with data on the virtual objects which are assigned for sports program as I, children's program as IV and mystery category program as III. In this manner, each reception site 30 is only required to store information related to its own grouping. Therefore, a reception site 30 that is in group 1 only needs to store the information related to group 1 that is found in row 1 of FIG. 21.

Figure 23:
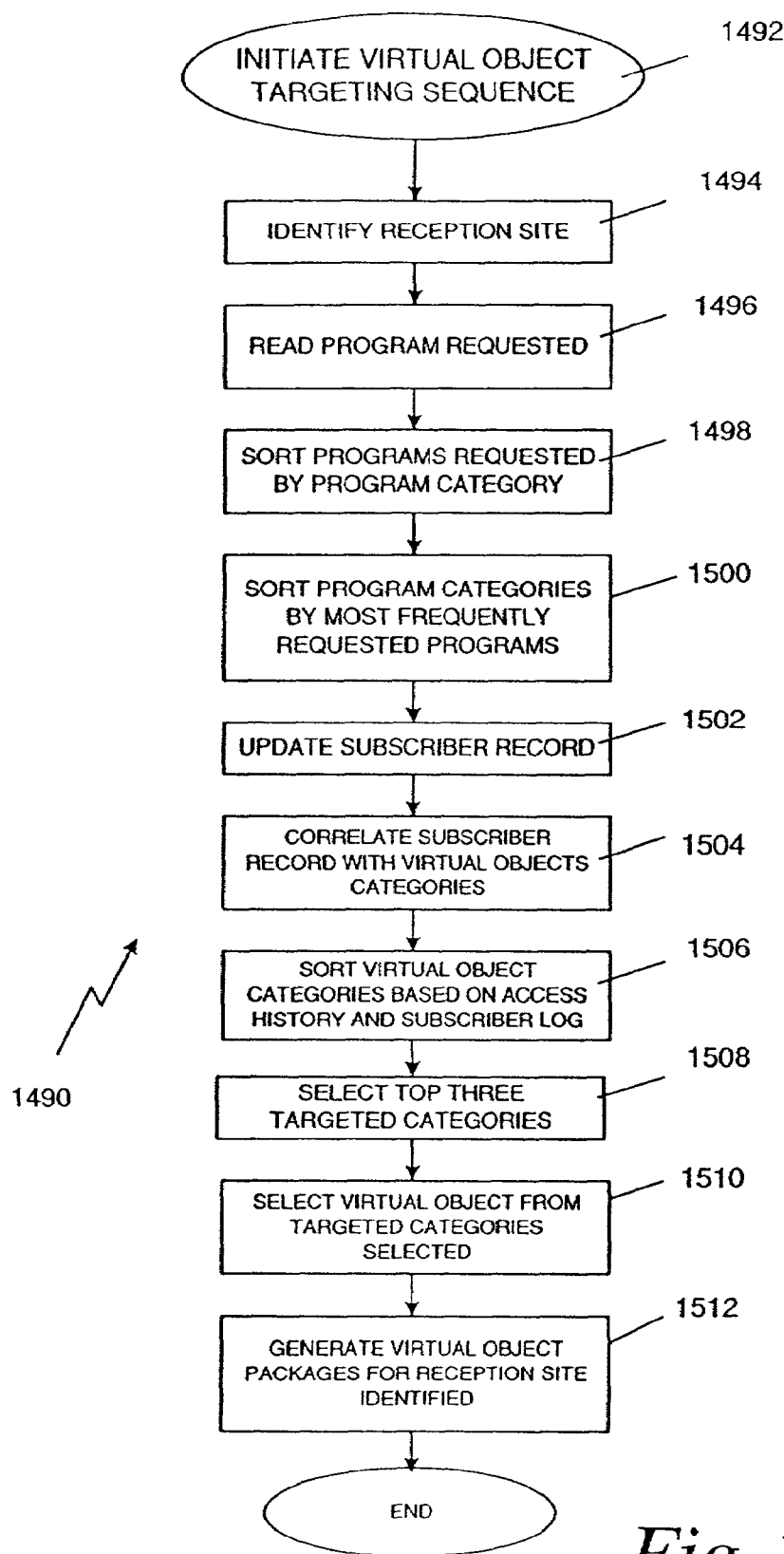
FIG. 23 shows an alternative software program flow for an object targeting routine.

FIG. 23 shows a software program flow 1490 that is an alternative to the virtual object targeting system 1220 targeting routine 1374, depicted in FIG. 18. The alternative routine 1490 allows each reception site 30 to be individually targeted with specific virtual objects. Preferably, it is initiated automatically, as shown at block 1492, by the TVOMS 300 upon receipt of a program request from a reception site, for example, for a pay per view program. Thus, once the TVOMS 300 receives program request information from a reception site, the TVOMS 300 begins the process of selecting a package of virtual objects that may be based on, among other things, that subscriber's demographic information and viewing history.

Upon receipt of a program request from a reception site, the virtual object targeting system 1220 reads the reception site identifier, as shown at block 1494, and the program requested. The subscriber data collection engine 1202 writes information on the program requested to the subscriber information database 1210, updating the subscriber record that contains listings of all programs requested within the past week, month or year.

With continued reference to FIG. 23, the virtual object targeting system 1220 then calls a subroutine that sorts the programs requested by program category, block 1498. In turn, the program categories are sorted, as shown at block 1500, based on the number of times that program appearing in each particular category is requested. In so doing, virtual object targeting system 1220, using the sorting subroutine as shown at block 1500, determines and ranks those programs and program categories that are most frequently viewed at that reception site.

All rankings of programs and program categories for that reception site 30 are written to the subscriber information database 1210, as shown at block 1502.

Next, the virtual object targeting system 1220 calls a subroutine, shown at block 1504, that correlates the updated subscriber record with the available virtual objects database 1265. By correlating these two with one another, the subroutine assigns or correlates various categories of virtual objects to each ranking of programs and program categories. The categories of virtual objects that may be so assigned are found in the available virtual objects database 1265 and may include: (1) Household Goods/Products, (2) Home Improvement and Maintenance, (3) Personal Hygiene, (4) Entertainment Items and Events, (5) Sporting Goods and Events, (6) Motor Vehicles and Related Products, (7) Foodstuffs and Beverages, and (8) Miscellaneous, for example. Where, for example, the subscriber has watched a sporting program, the Sporting Goods and Events, Home Improvement and Maintenance categories may be assigned to that particular sporting event/program and Sports program category, for example.

Once the programs and program categories are correlated with the virtual objects categories in the available virtual objects database 1265, the virtual object targeting system 1220 calls a sorting subroutine 1506 that ranks the correlated virtual objects categories based on other information in the database files. In one embodiment, this ranking is primarily based on data in the updated subscriber information database 1210, as shown at block 1506. By using data on the subscriber's past program selections and demographic information, the virtual object targeting system 1220 ranks the correlated categories of virtual objects according to those likely to be of most interest to that subscriber.

After the virtual object categories have been sorted and ranked, the virtual object targeting system 1220 selects the top three virtual objects categories as the targeted categories for a given program and subscriber, block 1508. Individual virtual objects are then chosen from the available virtual objects database 1265, with all selections made from the targeted categories, at block 1510. The virtual objects that are selected are written to the subscriber information database 1210 and to the content and virtual object packager 30, from where packages can be generated, at block 1512, for ultimate delivery to the reception site.

Figure 24:
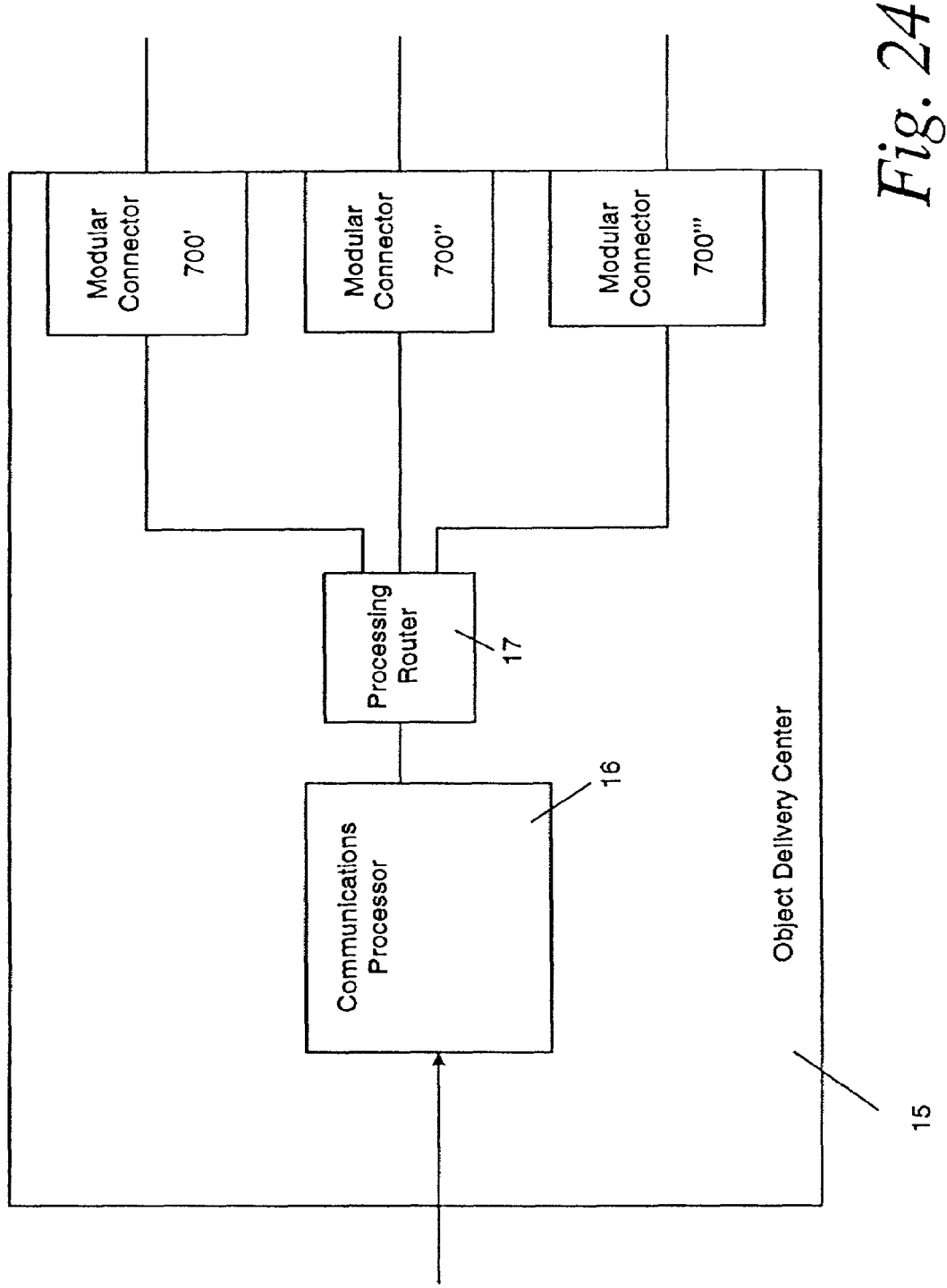
FIG. 24 depicts an object delivery center.

FIG. 24 depicts the object delivery center 15. The object delivery center 15 receives content 36, virtual objects, retrieval plans, and other information from the operations center 10 that is to be transmitted to reception sites. The communication processor 16 in the object delivery center 15 may determine the delivery network and communications methods appropriate for each item to be delivered, may combine items to be delivered to common destinations, may format the items for delivery, and provide the formatted items to the processing router 17. The processing router 17 may then route each item to the appropriate modular connector 700, for example modular connector 700', modular connector 700", or modular connector 700', depending on the required delivery network 11 and communication method.

A number of embodiments of delivery networks 11, 12, and 14 are presented below. The embodiments presented below may use the object delivery center 15, which inserts the virtual objects into the signal for delivery over the delivery network 11 or 12. The embodiments presented below use a modular connector 700 in the reception site 30, that receives the delivered signal with virtual objects, extracts the virtual objects, and provides the virtual objects to the storage management processor 710. The modular connector 700 supports the receive functionality for each unique delivery network communication method embodiment.

Figure 25:
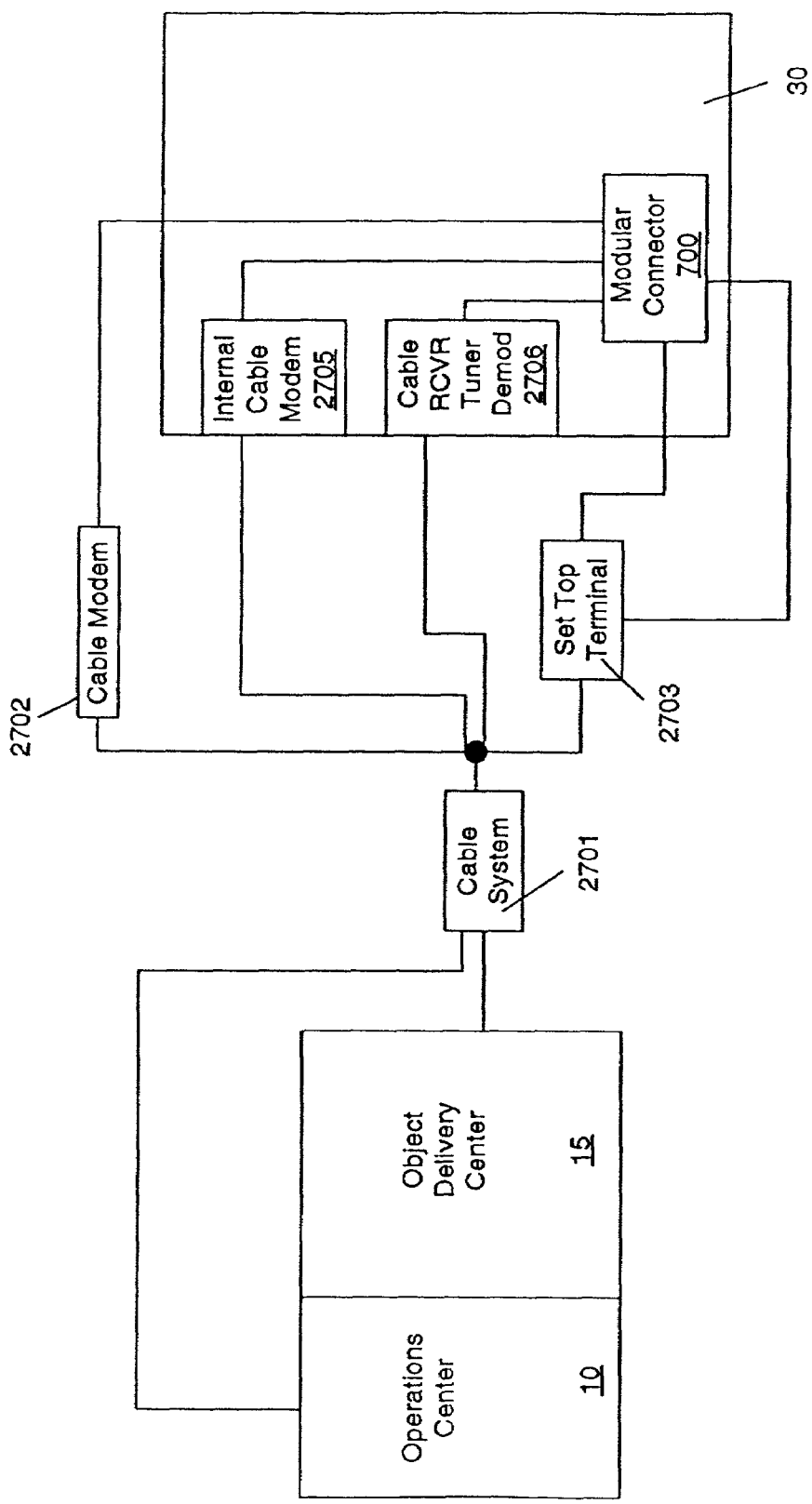
FIG. 25 presents embodiments associated with the delivery of virtual objects over a coaxial or fiber cable system to a reception site.

FIG. 25 presents embodiments associated with the delivery of virtual objects over a coaxial or fiber cable system 2701 to a reception site 30. Virtual objects are provided to the delivery network 11 by the object delivery center 15 or directly by the operations center 10. Alternatively, content 36 and virtual objects may be provided to the reception site 30 from the object delivery center 15 or from the local insertion center 20 using delivery network 12. The signal is delivered over the cable system 2701 delivery network. The signal may provide for the delivery of virtual objects, content 36 containing virtual object locations, and reception site configuration and control information. The signal may also provide for virtual object viewing data and interactive virtual object requests from the reception site 30 to the local data collection center 40, to the central data collection center 50, or to the interactive object service center 60 using delivery network 14 or the signal may be a means to provide access to the Internet or other public network through which virtual objects or content 36 are delivered (not shown). The cable system 2701 may be a coaxial cable network, totally fiber network, hybrid fiber coax network, fiber to the curb network, or any other cable distribution technology. The signal over the cable system may be generated by a cable modem, in which an external cable modem 2702 is used to receive the signal and provide the embedded virtual objects to the modular connector 700 in the reception site 30 for processing. Alternatively, the reception site 30 may contain an internal cable modem 2705, which receives the signal and provides the virtual objects to the modular connector 700 for processing.

In another embodiment, the signal delivered over the cable system is a video signal. In one embodiment, the video signal is an analog video signal. In another embodiment, the video signal is a digital video signal. The reception site 30 may contain an internal cable receiver/tuner/demodulator 2706 to process the signal, and provide the embedded virtual objects to the modular connector 700. A set top terminal 2703, or other device capable of receiving a cable video signal, such as a cable ready TV, or PC with cable tuner (not shown), may process the video signal and deliver the video signal to the connector 700 in the reception site 30, which extracts the embedded virtual objects. Alternately, the set top terminal 2703, or other such device, may extract the embedded virtual objects from the video signal and provide the virtual objects to the modular connector 700 in the reception site 30.

In another embodiment, virtual objects may be embedded within the audio signal, requiring an appropriate audio-capable modular connector 700 in the reception site 30 to extract the virtual objects from the audio signal. In one embodiment, the audio signal is an analog audio signal. In another embodiment, the audio signal is a digital audio signal.

In yet another embodiment, the signal is a spread spectrum signal containing a digital data stream, requiring an appropriate spread spectrum receiver and modular connector 700 in the reception site 30 to extract the virtual objects. In this embodiment, the spread spectrum signal is transmitted in the same bandwidth as the video or audio signal, but below the noise level.

Figure 26:
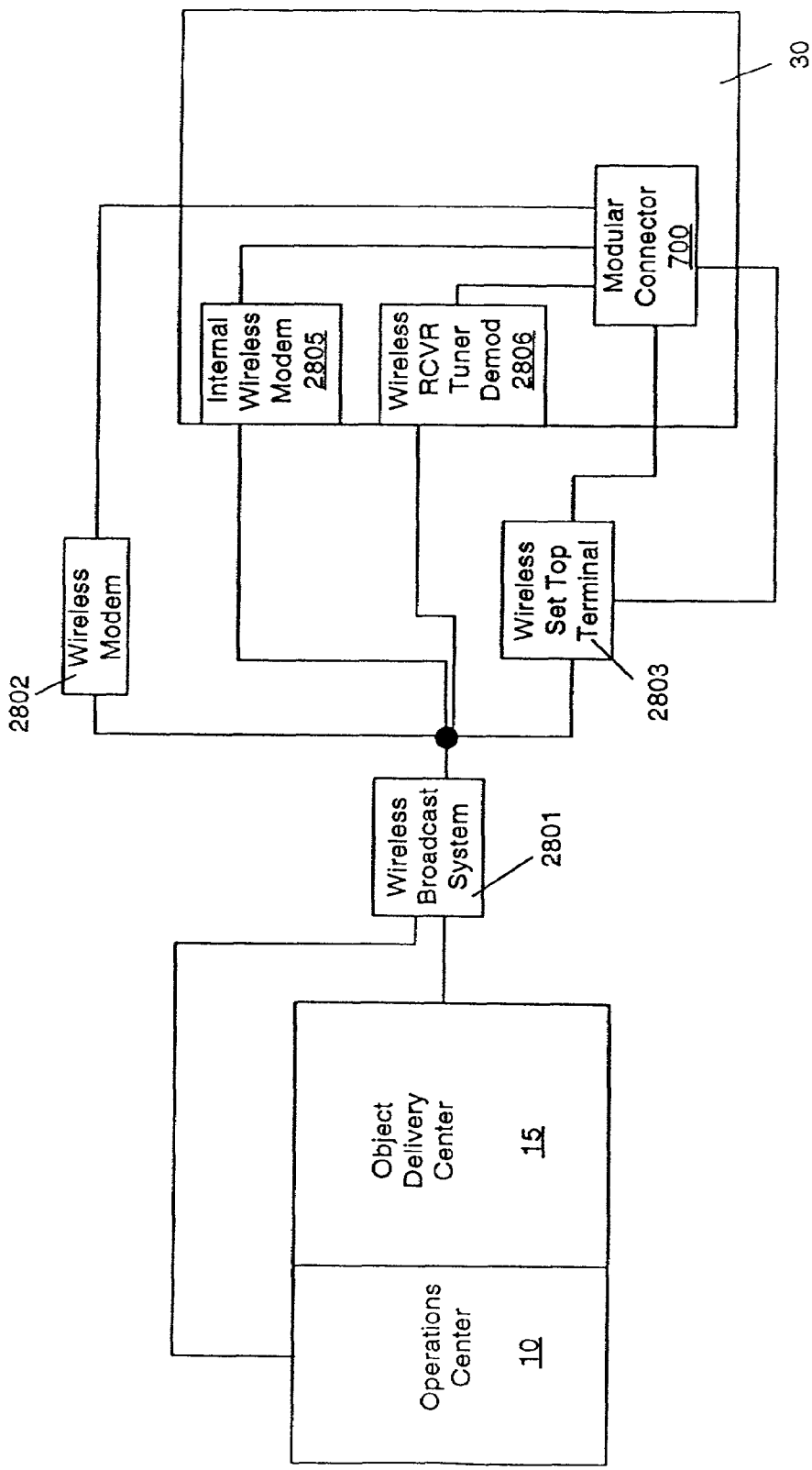
FIG. 26 presents embodiments associated with the delivery of virtual objects over a wireless broadcast system to a reception site.

FIG. 26 presents embodiments associated with the delivery of virtual objects over a wireless broadcast system 2801 to a reception site 30. Virtual objects are provided to the delivery network 11 by the object delivery center 15 or directly by the operations center 10. Alternatively, content 36 and virtual objects may be provided to the reception site 30 from the object delivery center 15 or from the local insertion center 20 using delivery network 12. The signal is delivered over the wireless broadcast system 2801 delivery network. The signal may provide for the delivery of virtual objects, content 36 containing virtual object locations, and reception site configuration and control information. The signal may also provide for virtual object viewing data and interactive virtual object requests from the reception site 30 to the local data collection center 40, to the central data collection center 50, or to the interactive object service center 60 using delivery network 14 or the signal may be a means to provide access to the Internet or other public network through which virtual objects or content 36 are delivered. The wireless broadcast system may be a microwave multipoint delivery system (MMDS), local multipoint distribution system (LMDS), Instructional Television Fixed Service (ITFS) system, or any other wireless data, video, or telephony broadcast system, including point-to-point and point-to-multipoint microwave broadcast systems like those provided by Teligent, Winstar digital wireless network, and ATT's wireless system. The signal over the wireless broadcast system may be generated by a wireless modem, in which an external wireless modem 2802 is used to receive the signal and provide the embedded virtual objects to the modular connector 700 in the reception site 30 for processing. Alternatively, the reception site 30 may contain an internal wireless modem 2805, which receives the signal and provides the virtual objects to the modular connector 700 in the reception site 30 for processing.

In another embodiment, the signal delivered over the wireless broadcast system is a video signal. In one embodiment, the video signal is an analog video signal. In another embodiment, the video signal is a digital video signal. The reception site 30 may contain an internal wireless receiver/tuner/demodulator 2806 to process the signal, and provide the embedded virtual objects to the modular connector 700. A wireless set-top terminal 2803, or other device capable of receiving a wireless video signal, such as a TV, or PC with a wireless receiver and tuner, may process the video signal and deliver the video signal to the modular connector 700 in the reception site 30, which extracts the embedded virtual objects. Alternately, the set top terminal 2803, or other such device, may extract the embedded virtual objects from the video signal and provide the data to the modular connector 700 in the reception site 30.

In another embodiment, virtual objects may be embedded within the audio signal, requiring an appropriate audio-capable modular connector 700 in the reception site 30 to extract the virtual objects from the audio signal. In one embodiment, the audio signal is an analog audio signal. In another embodiment, the audio signal is a digital audio signal.

In yet another embodiment, the signal is a spread spectrum signal containing a digital data stream, requiring an appropriate spread spectrum receiver modular connector 700 in the reception site 30 to extract the virtual objects. In this embodiment, the spread spectrum signal is transmitted in the same bandwidth as the video or audio signal, but below the noise level.

Figure 27:
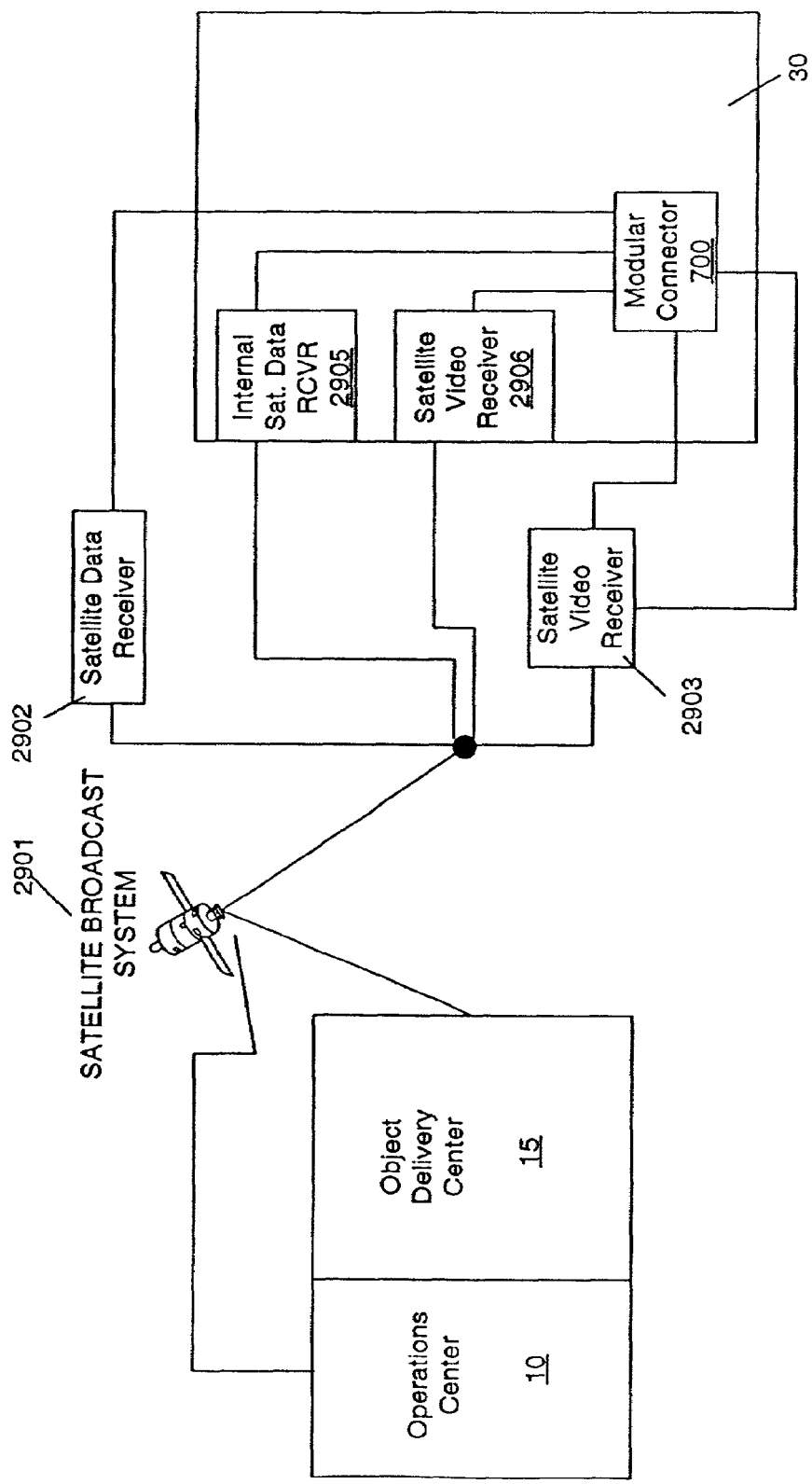
FIG. 27 presents embodiments associated with the delivery of virtual objects over a satellite broadcast system to a reception site.

FIG. 27 presents embodiments associated with the delivery of virtual objects over a satellite broadcast system 2901 to a reception site 30. Virtual objects are provided to the delivery network 11 by the object delivery center 15 or directly by the operations center 10. Alternatively, content 36 and virtual objects may be provided to the reception site 30 from the object delivery center 15 or from the local insertion center 20 using delivery network 12. The signal is delivered over the satellite broadcast system 2901 delivery network. The signal may provide for the delivery of virtual objects, content 36 containing virtual object locations, and reception site configuration and control information. The signal may also provide for virtual object viewing data and interactive virtual object requests from the reception site 30 to the local data collection center 40, to the central data collection center 50, or to the interactive object service center 60 using delivery network 14 or the signal may be a means to provide access to the Internet or other public network through which virtual objects or content 36 are delivered. The satellite broadcast system 2901 can be a direct broadcast system like DirecTV and EchoStar, a direct to home satellite broadcast system, video network distribution broadcast system, a point-to-point or point-to-multipoint data VSAT system, a digital audio broadcast system like WorldSpace, Sirius—formerly CD Radio, or XM, or a mobile data and telephony satellite broadcast system like Iridium, Teledesic, or Globalstar. Alternatively, the satellite broadcast system can be regionalized broadcast services or store and forward communication services hosted on high flying balloons or on airplanes that provide communication repeater services to an small geographic region. The signal over the satellite broadcast system may be generated by a satellite data modem, in which an external satellite data receiver 2902 is used to receive the signal and provide the embedded virtual objects to the reception site 30 modular connector 700 for processing. Alternatively, the reception site 30 may contain an internal satellite receiver 2905, which receives the signal and provides the virtual objects to the modular connector 700 in the reception site 30 for processing.

In another embodiment, the signal delivered over the satellite broadcast system is a video signal. In one embodiment, the video signal is an analog video signal. In another embodiment, the video signal is a digital video signal. The reception site 30 may contain an internal satellite video receiver 2906 to process the signal, and provide the embedded virtual objects to the modular connector 700. A satellite receiver 2903, or other device capable of receiving a satellite video signal, such as a TV, or PC with satellite receiver, may process the video signal and deliver the video signal to the modular connector 700 in the reception site 30, which extracts the embedded virtual objects. Alternately, the satellite receiver 2903, or other such device, may extract the embedded virtual objects from the video signal and provide the data to the modular connector in the reception site 258.

In another embodiment, virtual objects may be embedded within the audio signal, requiring an appropriate audio-capable modular connector 700 in the reception site 30 to extract the virtual objects from the audio signal. In one embodiment, the audio signal is an analog audio signal. In another embodiment, the audio signal is a digital audio signal.

In yet another embodiment, the signal is a spread spectrum signal containing a digital data stream, requiring an appropriate spread spectrum receiver modular connector 700 in the reception site 30 to extract the virtual objects. In this embodiment, the spread spectrum signal is transmitted in the same bandwidth as the video or audio signal, but below the noise level.

Figure 28:
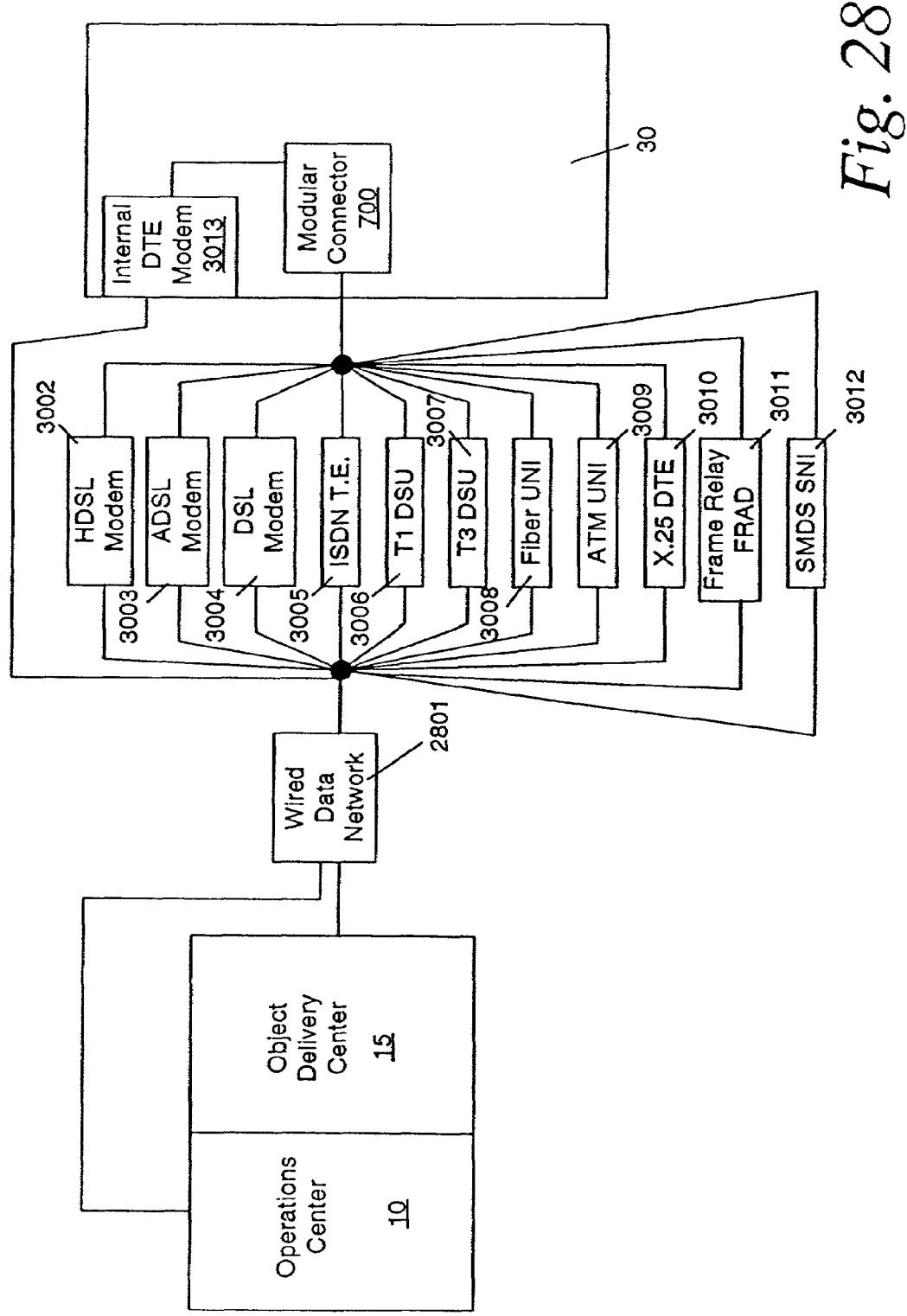
FIG. 28 presents embodiments associated with the delivery of virtual objects over a wired data network to a reception site.

FIG. 28 presents embodiments associated with the delivery of virtual objects over a wired data network 3001 to a reception site 30. Virtual objects are provided to the delivery network 11 by the object delivery center 15 or directly by the operations center 10. Alternatively, content 36 and virtual objects may be provided to the reception site 30 from the object delivery center 15 or from the local insertion center 20 using delivery network 12. The signal is delivered over the wired data network 3001 delivery network. The signal may provide for the delivery of virtual objects, content 36 containing virtual object locations, and reception site configuration and control information. The signal may also provide for virtual object viewing data and interactive virtual object requests from the reception site 30 to the local data collection center 40, to the central data collection center 50, or to the interactive object service center 60 using delivery network 14 or the signal may be a means to provide access to the Internet or other public network through which virtual objects or content 36 are delivered. The wired data network 3001 can be metallic wire or fiber, supporting any of a number of communication standards including HDSL, ADSL, DSL, ISDN, T1, T3, SONET, ATM, X.25, frame relay, Switched MultiMegabit Data Service (SMDS), or others. The signal sent over the wired data network may be generated by a data modem or transmission device, in which the appropriate modem, interface device, or Data Terminating Equipment (DTE) device is used to receive the signal and provide the embedded virtual objects to the reception site 30 modular connector 700 for processing. Embodiments of such receiving devices are shown in FIG. 28 as HDSL modem 3002, ADSL modem 3003, DSL modem 3003, ISDN Terminal equipment (TE) device 3005, T1 Digital service unit (DSU) 3006, T3 DSU 3007, Fiber user network interface device (UNI) 3008, ATM UNI 3009, X.25 DTE 3010, Frame relay assembler/disassembler (FRAD) 3011, and SMDS subscriber network interface device (SNI) 3012. Alternatively, the reception site 30 may contain an internal modem or DTE 3013, which receives one or more signal types and provides the received signal with embedded virtual objects to the modular connector 700 in the reception site 30 for processing. Finally, the reception site 30 may be attached to a wired LAN using a transceiver. In this embodiment, virtual objects may be delivered over the LAN at any time.

Figure 29:
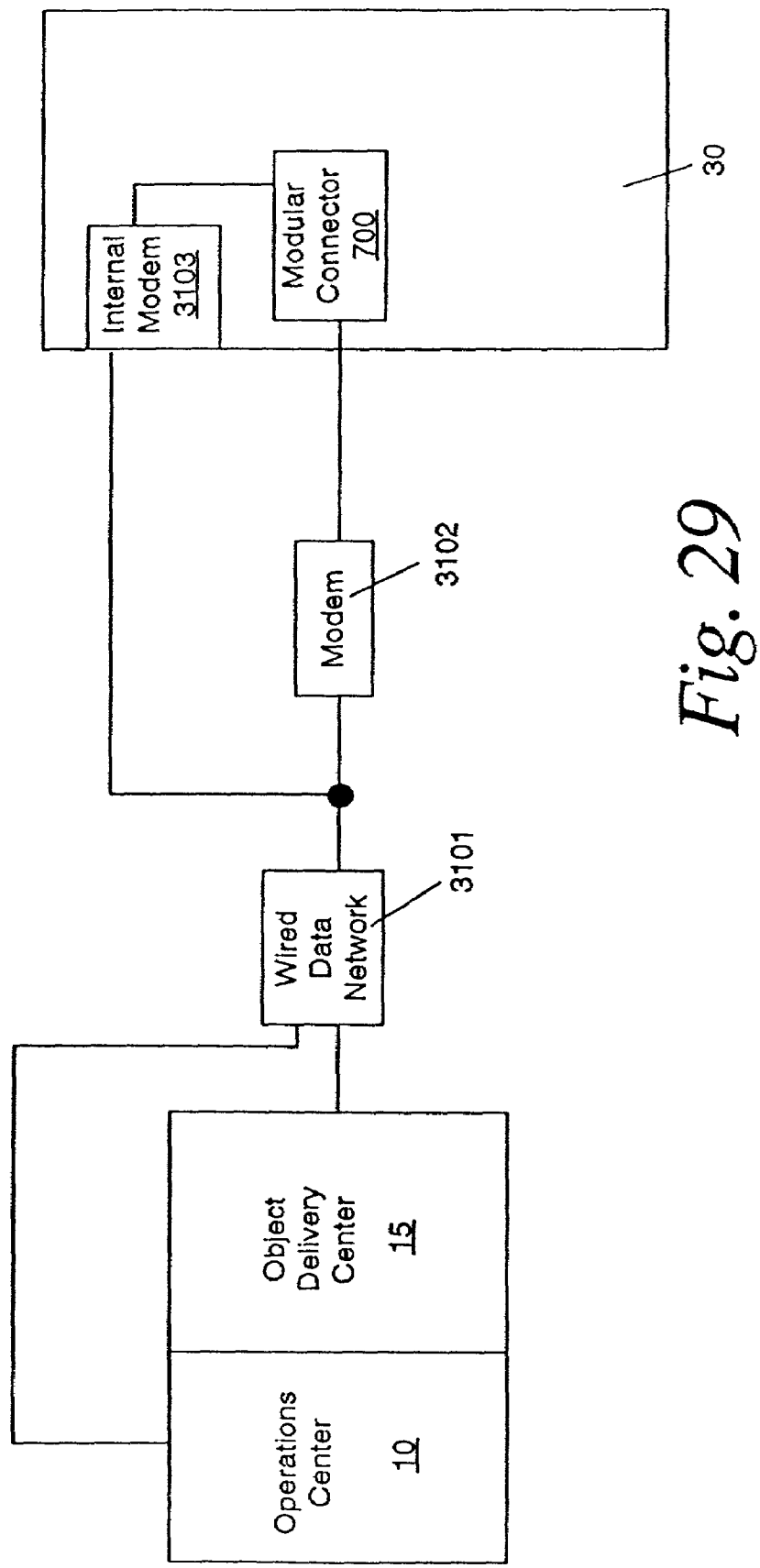
FIG. 29 presents embodiments associated with the delivery of virtual objects using the public switched telephony network (PSTN) to a reception site.

FIG. 29 presents embodiments associated with the delivery of virtual objects using the public switched telephony network (PSTN) 3101 to a reception site 30. Virtual objects are provided to the delivery network 11 by the object delivery center 15 or directly by the operations center 10. Alternatively, content 36 and virtual objects may be provided to the reception site 30 from the object delivery center 15 or from the local insertion center 20 using delivery network 12. The signal is delivered over the PSTN 3101 delivery network. The signal may provide for the delivery of virtual objects, content 36 containing virtual object locations, and reception site configuration and control information. The signal may also provide for virtual object viewing data and interactive virtual object requests from the reception site 30 to the local data collection center 40, to the central data collection center 50, or to the interactive object service center 60 using delivery network 14 or the signal may be a means to provide access to the Internet or other public network through which virtual objects or content 36 are delivered. The signal sent over the PSTN may be generated by a data modem or transmission device, in which the appropriate modem 3102 is used to receive the signal and provide the embedded virtual objects to the modular connector 700 in the reception site 30 for processing. Alternatively, the reception site 30 may contain an internal modem 3103, which receives the signal and provides the received signal with embedded virtual objects to the modular connector 700 in the reception site 30 for processing.

Figure 30:
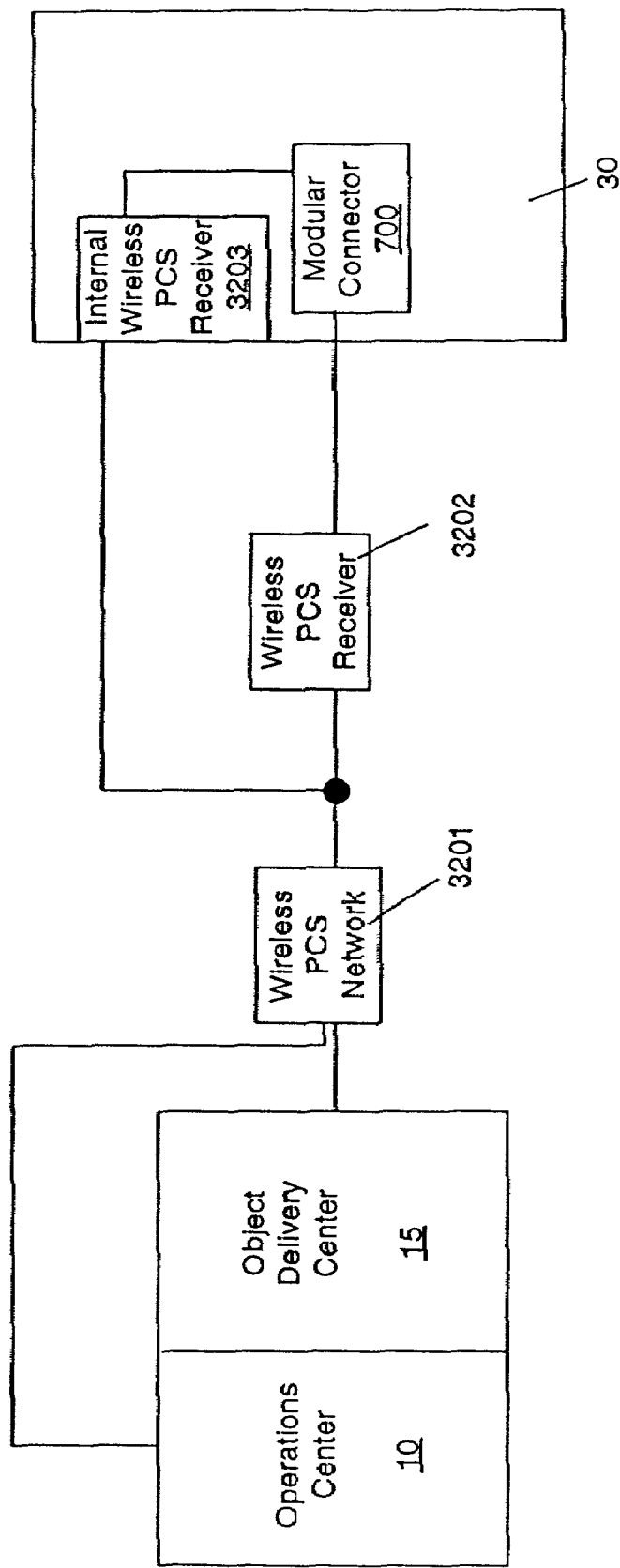
FIG. 30 presents embodiments associated with the delivery of virtual objects using wireless personal communications system (PCS) to a reception site.

FIG. 30 presents embodiments associated with the delivery of virtual objects using wireless personal communications system (PCS) 3201 to a reception site 30. Virtual objects are provided to the delivery network 11 by the object delivery center 15 or directly by the operations center 10. Alternatively, content 36 and virtual objects may be provided to the reception site 30 from the object delivery center 15 or from the local insertion center 20 using delivery network 12. The signal is then delivered over the PCS network 3201 delivery network. The wireless PCS system may be, for example a wireless LAN, digital cellular telephony network, analog cellular telephony network, digital cellular radio system, analog cellular radio system, digital pager network, analog pager network, or Personal Communication Network (PCN). The signal may provide for the delivery of virtual objects, content 36 containing virtual object locations, and reception site configuration and control information. The signal may also provide for virtual object viewing data and interactive virtual object requests from the reception site 30 to the local data collection center 40, to the central data collection center 50, or to the interactive object service center 60 using delivery network 14 or the signal may be a means to provide access to the Internet or other public network through which virtual objects or content 36 are delivered. A wireless PCS receiver 3202 is used to receive the signal and provide the embedded virtual objects to the modular connector 700 in the reception site 30 for processing. Alternatively, the reception site 258 may contain an internal wireless PCS receiver 3203, which receives the signal and provides the received signal with embedded virtual objects to the modular connector 700 in the reception site 30 for processing.

Figure 31:
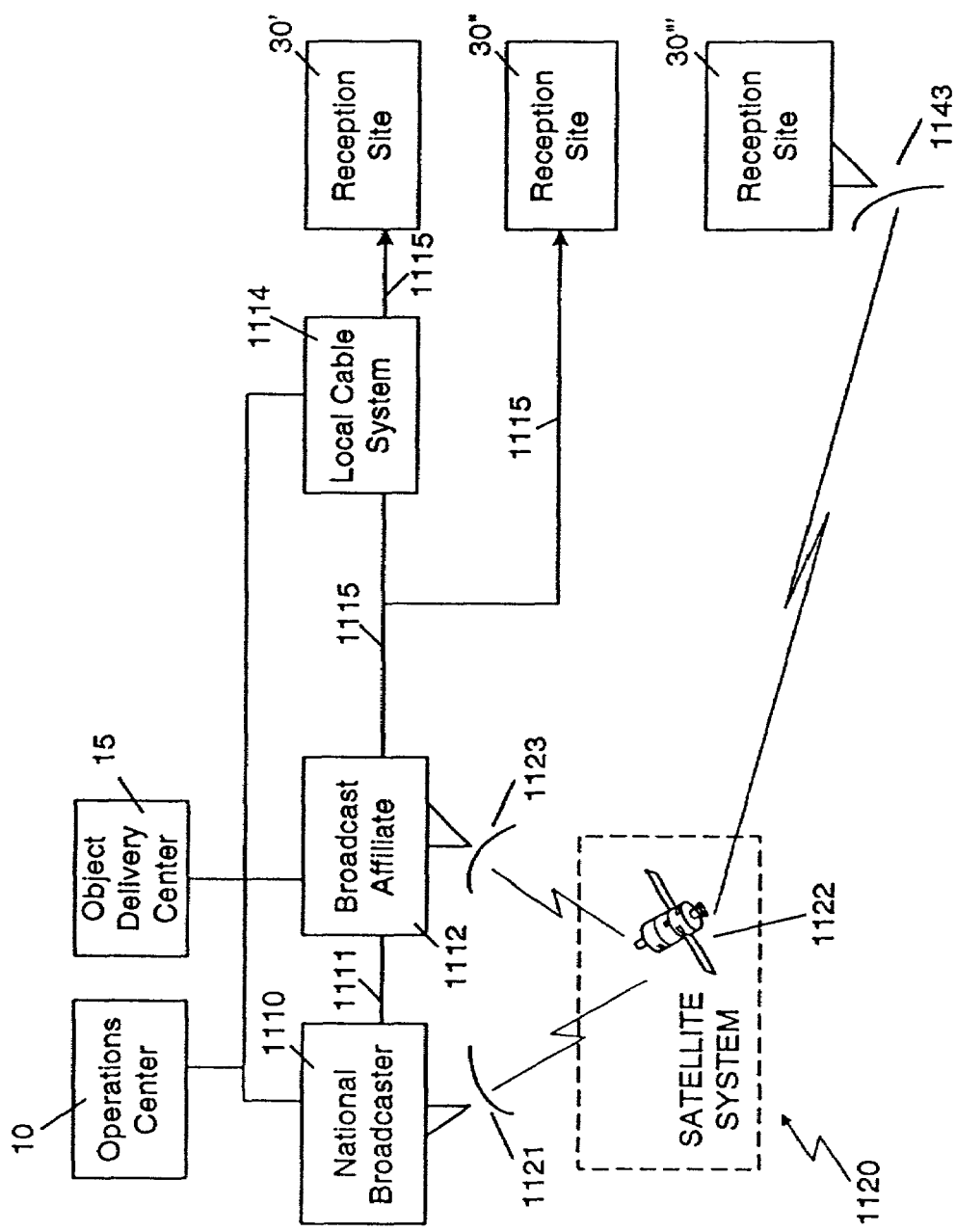
FIG. 31 depicts several embodiments associated with the delivery of virtual objects using a national or local television broadcaster's signal.

FIG. 31 depicts several embodiments associated with the delivery of virtual objects using a national or local television broadcaster's signal. Virtual objects are provided to the either the national broadcaster 1110, the broadcast affiliate 1112, or the local cable system 1114 by the object delivery center 15 or directly by the operations center 10. The signal from the national broadcaster 1110 can be delivered to reception site 30', 30" or 30''' using a satellite system 1122, using a broadcast affiliate 1112 terrestrially, or using a local cable system 1114. Alternatively, the local television broadcast affiliate 1112 can originate the signal which can be delivered to the reception site 30', 30" or 30''' terrestrially, or using a local cable system 1114. The signal may provide for the delivery of virtual objects, content 36 containing virtual object locations, and reception site configuration and control information. The signal may also provide for virtual object viewing data and interactive virtual object requests from the reception sites 30', 30", and 30''' to the local data collection center 40, to the central data collection center 50, or to the interactive object service center 60 using delivery network 14 or the signal may be a means to provide access to the Internet or other public network through which virtual objects or content 36 are delivered. In one embodiment, the video signal is an analog video signal and the virtual objects is embedded in the video signal. In another embodiment, the video signal is a digital video signal and the virtual objects are carried as an independent data stream. In another embodiment, virtual objects may be embedded within the audio signal. In one embodiment, the audio signal is an analog audio signal. In another embodiment, the audio signal is a digital audio signal.

Figure 33:
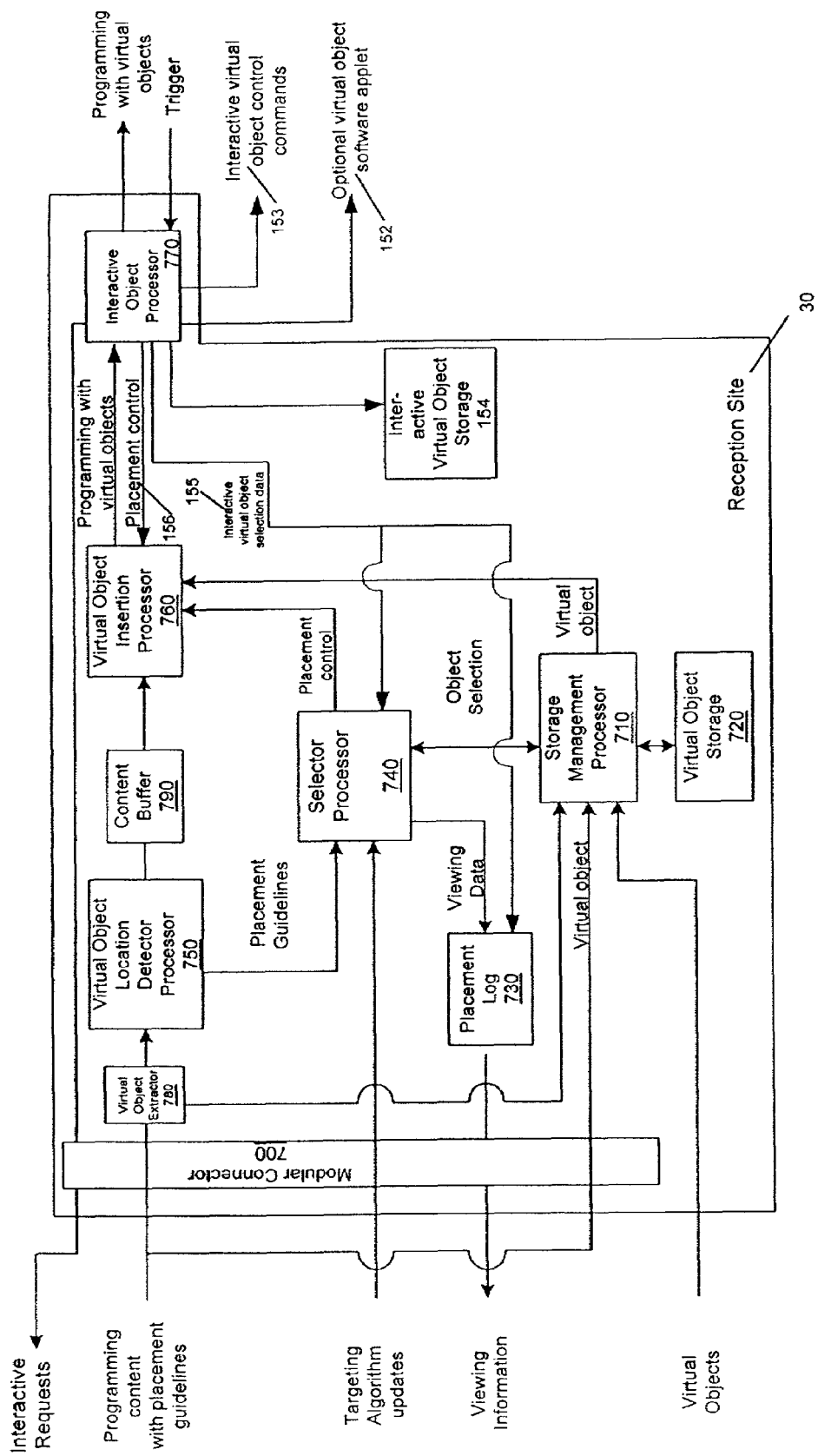
FIG. 33 depicts an example of a reception site.

In yet another embodiment, the signal is a spread spectrum signal containing a digital data stream, requiring an appropriate spread spectrum receiver modular connector, such as the connector 700 of FIG. 33, in the reception site 30', 30" or 30''' to extract the virtual objects. In this embodiment, the spread spectrum signal is transmitted in the same bandwidth as the video or audio signal, but below the noise level.

Alternatively, several embodiments are associated with the delivery of virtual objects using a national or local radio broadcaster's signal. The signal from the national radio broadcaster can be delivered to the reception site 30', 30" or 30''' using the satellite system 1122, or using a broadcast affiliate 1122. Alternatively, the radio broadcast affiliate 1122 can originate the signal, which can be delivered to the reception site 30', 30" or 30''', terrestrially. In one embodiment, the audio signal is an analog audio signal and the virtual objects is embedded in the audio signal. In another embodiment, the audio signal is a digital audio signal and the virtual objects are carried as an independent data stream. In yet another embodiment, the virtual objects are embedded in a sub-carrier of the analog audio broadcast. In another embodiment, the signal is a spread spectrum signal containing a digital data stream, requiring an appropriate spread spectrum receiver modular connector 700 in the reception site 30', 30" or 30''' to extract the virtual objects. In this embodiment, the spread spectrum signal is transmitted in the same bandwidth as the audio signal, but below the noise level.

Figure 32:
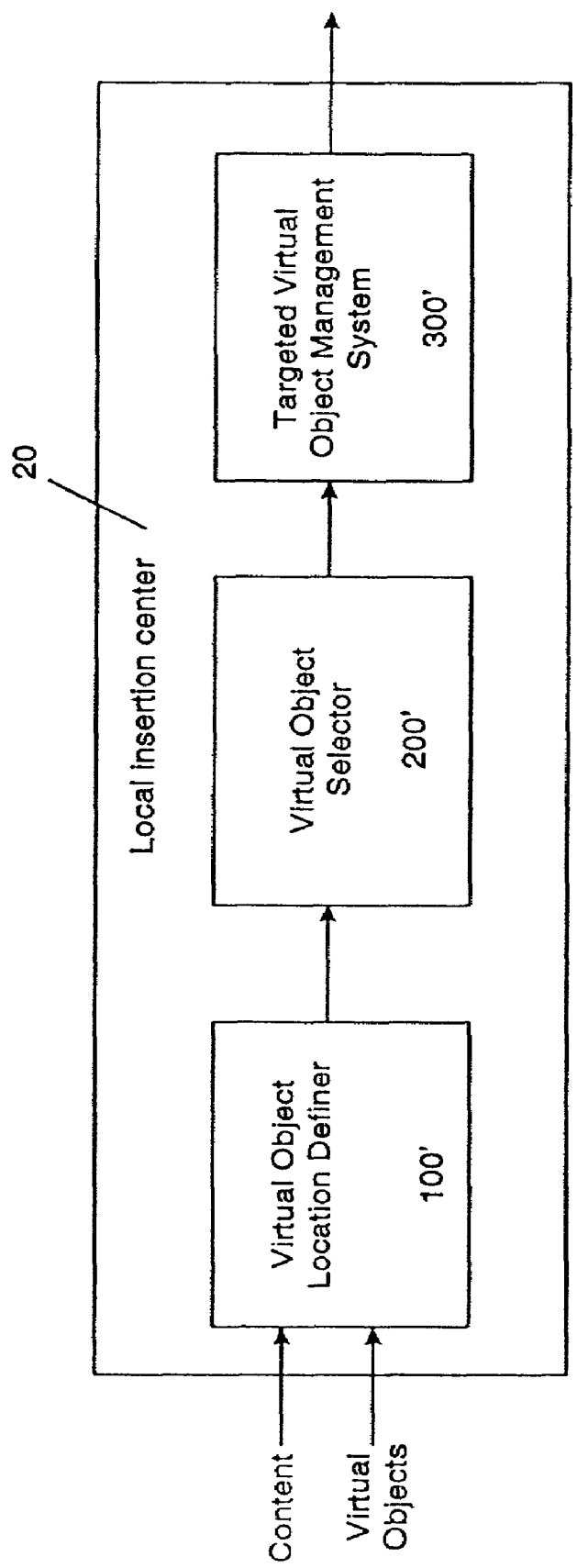
FIG. 32 depicts a local insertion center.

A local insertion center 20 or multiple local insertion centers may optionally be used to insert virtual objects into content 36 provided by an operations center 10 or another local insertion center 20, and any other content source. A local insertion center 20 may perform the same functions as an operations center 10. FIG. 32 depicts a local insertion center 20. As shown in FIG. 32, the local insertion center 20 includes a virtual object location definer 100', a virtual object selector 200', and a targeted virtual object management system 300' (TVOMS) which are identical to the virtual object location definer 100, a virtual object selector 200, and a targeted virtual object management system 300 (TVOMS) of an operations center 10. A local insertion center 20 may detect existing virtual object locations in content 36 and replace existing virtual objects with new virtual objects, delete existing virtual objects, or add new virtual objects in existing virtual object locations and target the virtual objects to reception sites or groups of reception sites. Alternatively, a local insertion center 20 may create new virtual object locations and insert and target virtual objects within these new virtual object locations using the processes defined for the operations center 10. The local insertion center 20 may modify an existing or generate a new retrieval plan or generate a new or modify an existing group assignment matrix for distribution to reception sites.

FIG. 33 depicts an example of a reception site 30 in more detail. The modular connector 700 may handle all interactions with a reception site 30. Programming content 36 with virtual object locations and metadata packets containing placement guidelines, mattes, and retrieval plans are received by the reception site modular connector 700 and passed to the virtual object extractor processor 780. The virtual object extractor processor 780 removes any virtual objects from the received signal and the retrieval plan information and routes the virtual objects and retrieval plan to the storage management processor 710. The storage management processor 710 uses the retrieval plan to determine which virtual objects are destined to the reception site 30 and saves the required virtual objects in virtual object storage 720. In an alternative embodiment, virtual objects may be received by the reception site 30 independent of the programming content 36.

The programming content 36 with virtual object locations is then passed to the virtual object location detector processor 750. Information received about virtual object locations is extracted from the programming content 36 and passed to the selector processor 740 which coordinates with the storage management processor 710 to determine the appropriate virtual object 38 to place into each virtual object location 37 based on placement guidelines and available virtual objects stored in the virtual object storage 720. The storage management processor 710 retrieves the appropriate virtual object 38 for one or more virtual object locations contained in the content 36 from the virtual object storage 720. Virtual objects are passed from the storage management processor 710 to the virtual object insertion processor 760.

Programming content 36 with virtual object locations is passed from the virtual object location detector processor 750 to the content buffer 790 where the programming content 36 is stored for a fixed period of time and then played out of the content buffer 790 to the virtual object insertion processor 760. If a virtual object 38 is available for placement in a virtual object location 37, the virtual object 38 is inserted into the appropriate virtual object location 37 by the virtual object insertion processor 760.

In one embodiment, the virtual object location 37 may require that an embedded virtual object 38 be placed within the content 36. The virtual object insertion processor 760 may use techniques for the insertion of embedded virtual objects which are described in detail in U.S. Pat. No. 5,953,076, to Astle, Brian; and Das, Subhodev; titled System and Method of Real Time Insertions into Video Using Adaptive Occlusion with a Synthetic Reference Image; U.S. Pat. No. 5,892,554, to DiCicco, Darrell; and Fant, Karl; entitled System and Method for Inserting Static and Dynamic Images into a Live Video Broadcast; U.S. Pat. No. 5,515,485, to Luquet, Andre; and Rebuffet, Michel; entitled Method and Device for Modifying a Zone in Successive Images; U.S. Pat. No. 5,903,317, to Sharir, Avi; and Tamir, Michael; entitled Apparatus and Method for Detecting, Identifying and Incorporation Advertisements in a Video; and the MPEG4 standard, the disclosure of which are hereby incorporated by reference.

In another embodiment, when the virtual object location 37 may require that an overlaid virtual object 38 be placed within the content 36. The virtual object insertion processor 760 may use techniques for the overlaying of virtual objects which are described in detail in U.S. Pat. No. 4,319,266 to Bannister, Richard S.; entitled Chroma Keying System; U.S. Pat. No. 4,999,709 to Yamazaki, Hiroshi; and Okazaki, Sakae; entitled Apparatus for Inserting Title Pictures; U.S. Pat. No. 5,249,039, to Chaplin, Daniel J.; entitled Chroma Key Method and Apparatus; and U.S. Pat. No. 5,233,423 to Jernigan, Forest E.; and Bingham, Joseph; entitled Embedded Commercials within a Television Receiver using an Integrated Electronic Billboard, the disclosure of which are hereby incorporated by reference. Programming content 36 with embedded and overlaid virtual objects is passed to an optional interactive object processor 770.

Preferably, when a virtual object 38 is placed into a virtual object location 37, the selector processor 740 records the event in the placement log 730. The placement log 730 provides viewing data to the local data collection center 40 or the central data collection center 50, where the information can be used for future virtual object targeting or billing of virtual object providers, for example, advertisers. The selector processor 740 can be provided targeting algorithm updates from external sources.

Figure 34:
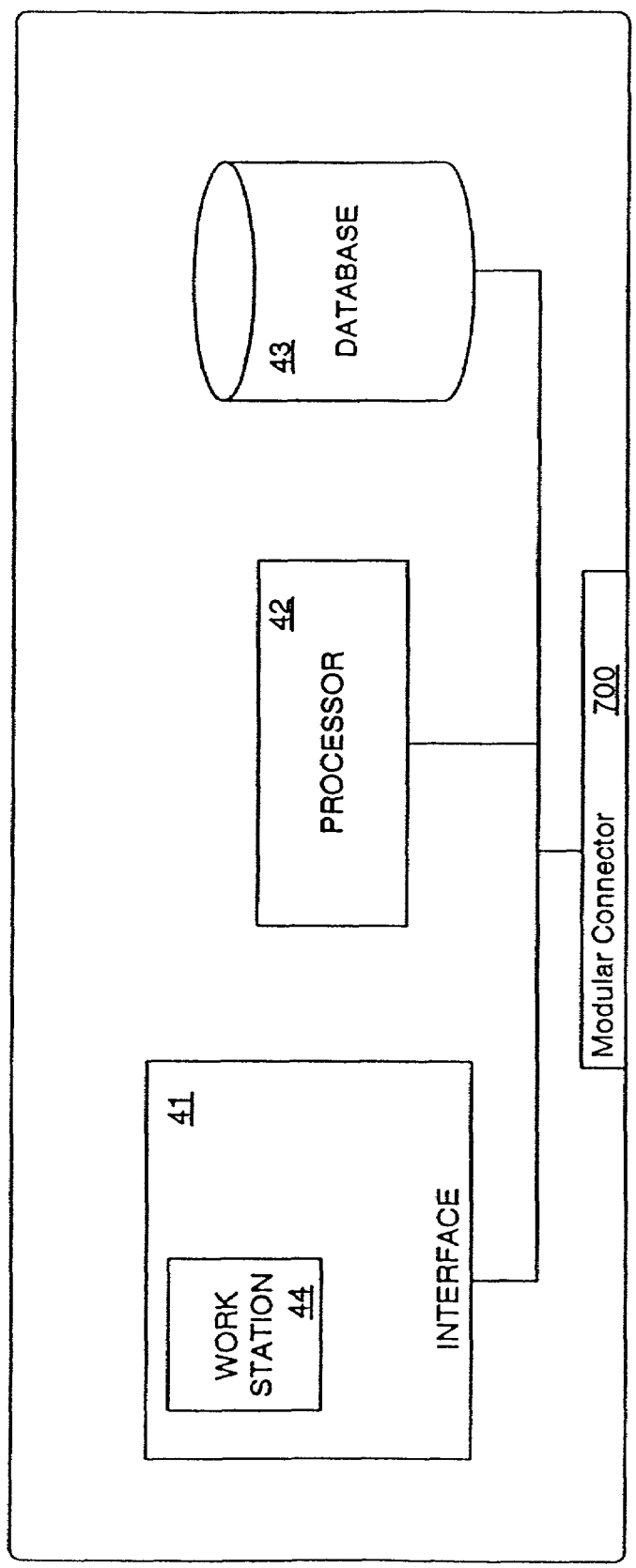
FIG. 34 depicts a local data collection center.

A local data collection center 40 is depicted in FIG. 34. The local data collection center 40 collects, processes, and stores data from reception sites, from a central data collection center 50, or other sources. The data collected about reception sites may be provided to a local insertion center 20 to be used in targeting virtual objects in content 36. Alternatively, the data collected from receptions site may be provided to a central data collection center 50 to be used in targeting virtual objects in content 36 by an operations center 10. As shown in FIG. 34, communications to and from the local data collection center 40 over a delivery network may be done using modular connector 700. An interface 41 receives information from reception sites. The interface 41 can include a workstation, such as the workstation 44, for example, from which an operator manually enters reception site information. Alternately, reception site information can be automatically entered at the interface 41 by downloading from an off-site database, the Internet, a storage medium, such as a CD-ROM or a floppy disk, and by collecting the information directly from the individual reception sites using modular connector 700. A processor 42 processes the received reception site information and organizes the information for use and stores information in database 43.

Figure 35:
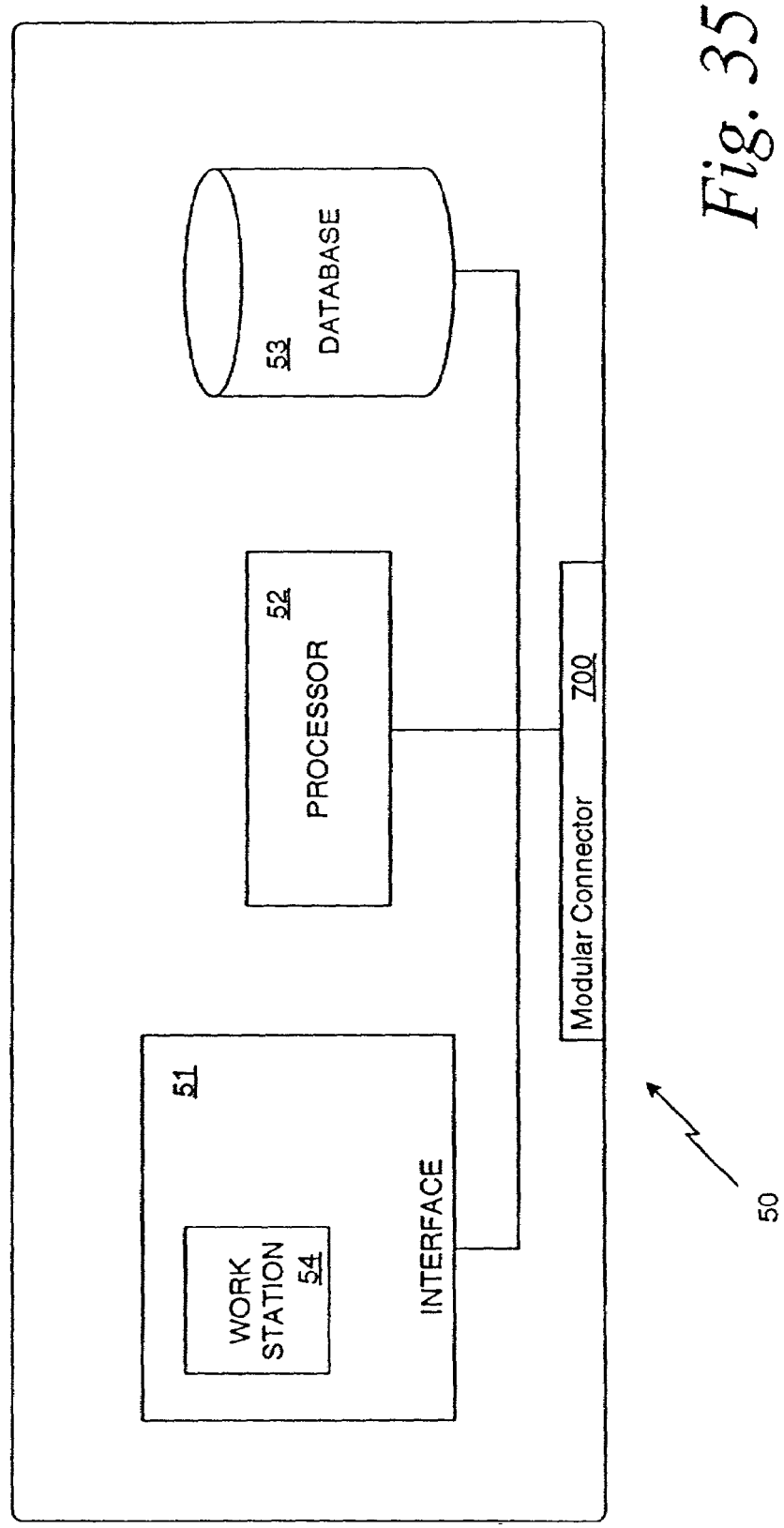
FIG. 35 depicts a central data collection center.

A central data collection center 50 is depicted in FIG. 35. The central data collection center 50 collects, processes, and stores data from reception sites, from local data collection centers, or other sources. The data collected about reception sites may be provided to a local insertion center 20 or local data collection center 40 to be used in targeting virtual objects in content 36. Alternatively, the data collected from reception site may be provided to an operations center 10 to be used in targeting virtual objects in content 36. As shown in FIG. 34, communications to and from the central data collection center 50 over a delivery network may be done using modular connector 700. An interface 51 receives information about reception sites. The interface 51 can include a workstation, such as the workstation 54, for example, from which an operator manually enters reception site information. Alternately, reception site information can be automatically entered at the interface 51 by downloading from an off-site database, the Internet, a storage medium, such as a CD-ROM or a floppy disk, and by collecting the information directly from the individual reception sites using modular connector 700. A processor 52 processes the received reception site information and organizes the information for use and stores information in database 53.

Figure 36:
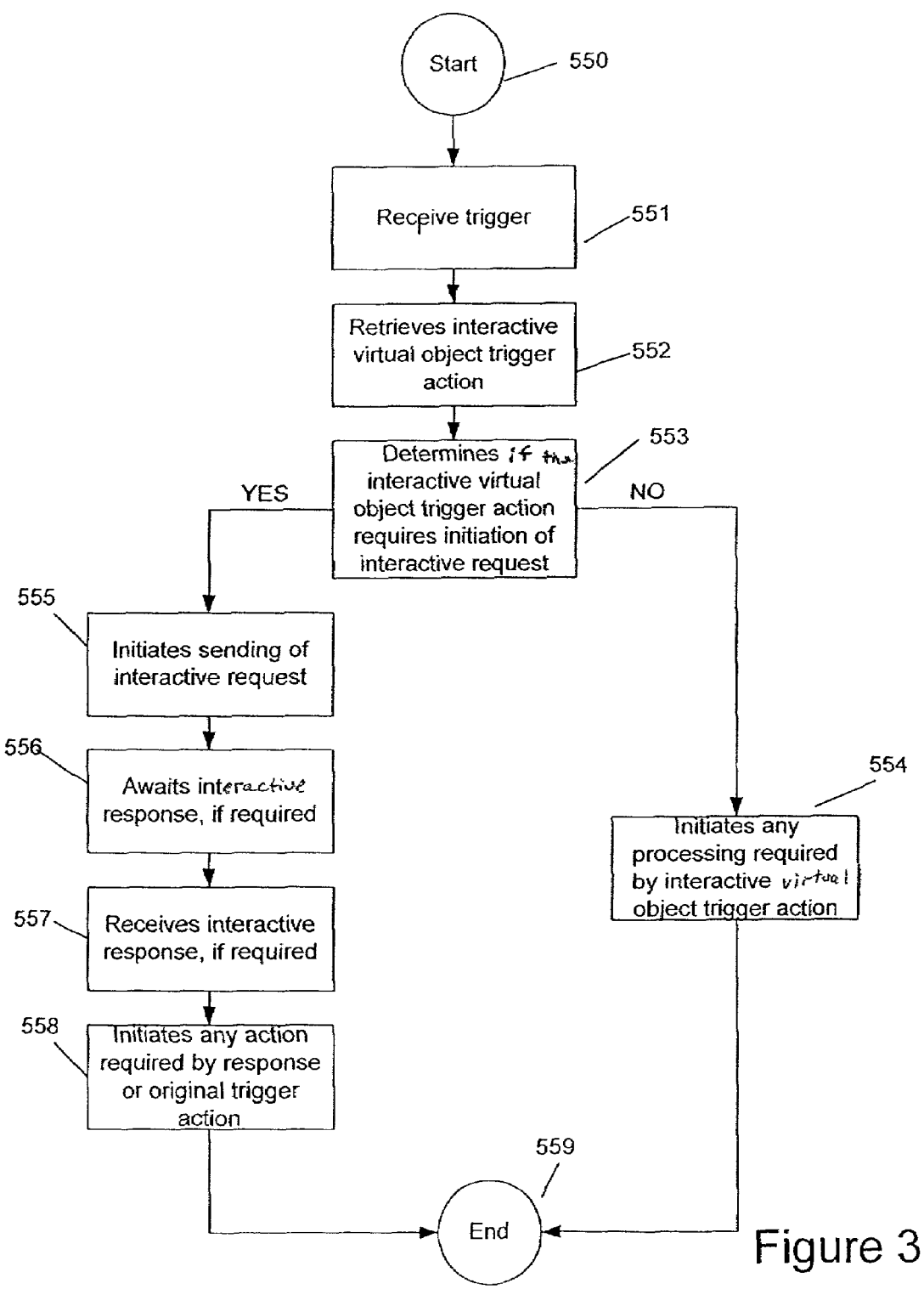
FIG. 36 depicts an embodiment of the process performed by the interactive object process upon receipt of a trigger.

Returning to FIG. 33, an external trigger may be received by the interactive object processor 770 indicating the subscriber has selected an interactive virtual object 38. Alternatively, the interactive object processor 770 may be capable of being configured to automatically process all interactive virtual objects received. FIG. 36 depicts the steps the interactive object processor 770 performs upon receipt of an external trigger related to an interactive virtual object 38. The process begins with the start ellipse 550. The interactive object processor 770 receives the trigger as shown in block 551. The interactive object processor 770 then retrieves the interactive virtual object trigger action 56 from the interactive virtual object 38, as shown in block 552. The interactive object processor 770 determines if the interactive virtual object trigger action 56 requires initiation of an interactive request to a remote site, as shown in block 553. As shown in block 554, if only local action at the reception site 30 is required, the interactive object processor 770 initiates any local processing required by the interactive virtual object trigger action 56 associated with the interactive virtual object 38. After initiation of any actions required by the interactive virtual object trigger action 56, the process ends with ellipse 559. If, in block 553, the interactive object processor 770 determines that the interactive virtual object trigger action 56 requires initiation of an interactive request to a remote site, the interactive object processor 770 initiates the sending of the interactive request with the virtual object identifier 58, as shown in block 555. The interactive object processor 770 passes the interactive request to the modular connector 700. The modular connector 700, in turn, passes the interactive request to the interactive object servicing center 60. The interactive object processor 770 awaits for any interactive response, as shown in block 556. The interactive object servicing center 60 may process the interactive request and may respond back to the reception site 30 with an interactive response. The interactive object processor 770 receives and processes any interactive response received from the interactive object servicing center 60, as shown in block 557. The interactive object processor 770 then initiates any further actions required by the interactive response or the initial interactive virtual object trigger action 56 received, as shown in block 558. The process ends with ellipse 559.

Figure 37:
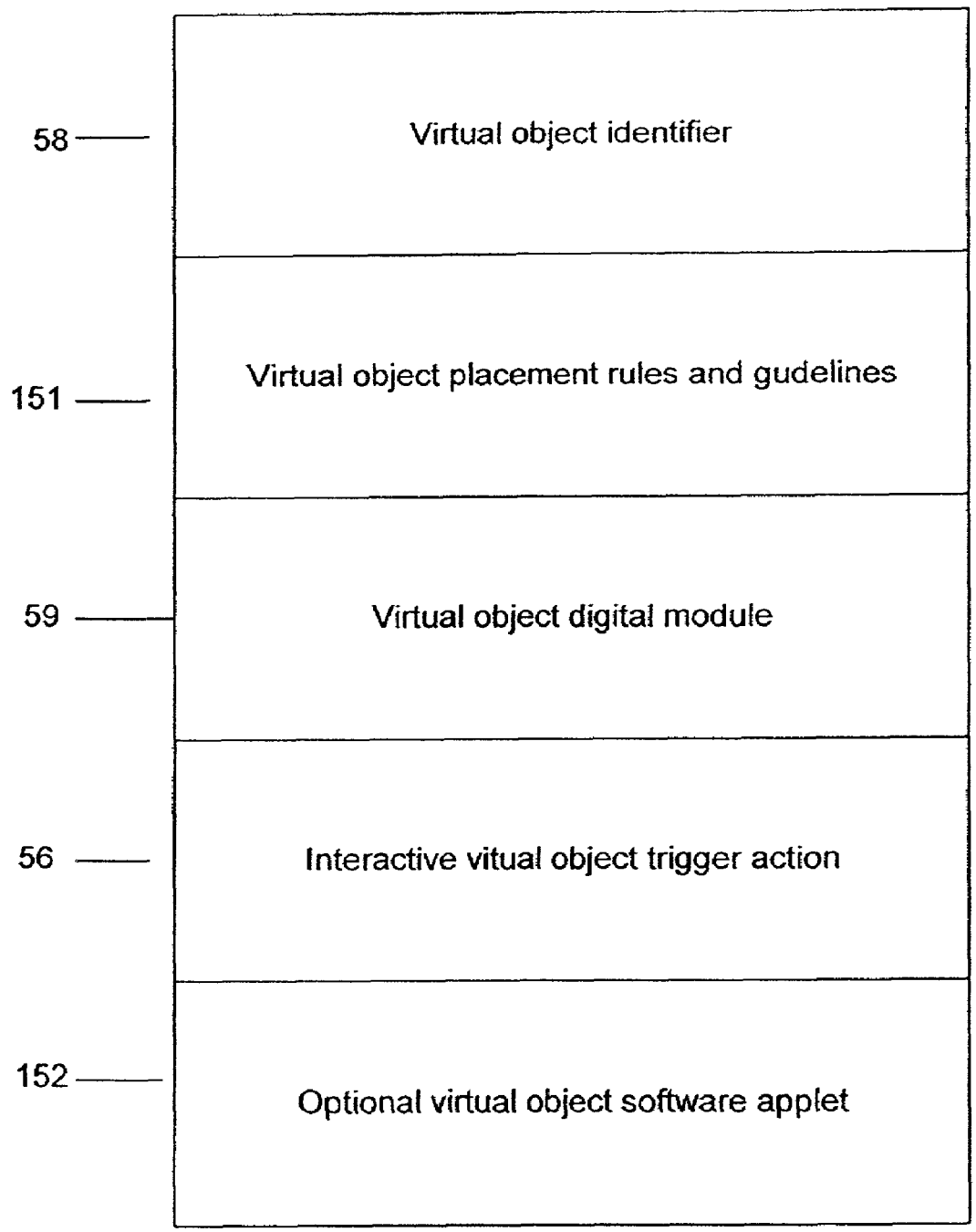
FIG. 37 presents an interactive object example.

A diagrammatic representation of an interactive virtual object 38 is presented in FIG. 37. Each interactive virtual object 38 is identified by a unique virtual object identifier 58. This virtual object identifier 58 may be assigned by the virtual object management center 55, and provided to the interactive object servicing center 60, with the interactive virtual object response management guidelines 57 associated with the interactive virtual object 38. Virtual object placement rules and guidelines 151 may be delivered with the virtual object 38 to provide guidance to the reception site 30 in managing the insertion of virtual objects into content 36. The virtual object digital module 59 is the actual digital representation of the virtual object 38 that is created and stored at the operations center 10 and stored by the storage management processor 710 at the reception site 30 for use by the virtual object insertion processor 760 in recreating a visual representation of the virtual object 38. The interactive virtual object trigger action 56 associated with an interactive virtual object 38 provides a definition of the action required to be taken by the interactive object processor 770 upon subscriber selection of an interactive virtual object 38. The interactive virtual object trigger action 56 may result in the initiation of processing by the interactive object processor 770. Alternatively, or in addition, the interactive virtual object trigger action 56 may result in the initiation of an interactive request to an interactive virtual object servicing center 60. Alternatively, or in addition, the interactive virtual object trigger action 56 may result in the interactive object processor 770 providing interactive virtual object control 153 commands or providing an optional virtual object software applet 125 to an device external to the reception site 30 for additional processing therein. The external device may consist of a television set-top terminal, computer with Internet access, digital television receiver, or other device capable of processing the interactive virtual object control 153 commands or optional virtual object software applet 152. The optional virtual object software applet 152 provides software that may be initiated by the interactive object processor 770 or provided to an external device to be initiated. A difference between an interactive virtual object 38 and a virtual object 38 that is not interactive is the placement of information in the interactive virtual object trigger action 56 field of a virtual object 38 and the placement of information in the optional virtual object software applet 152 field of a virtual object 38.

Figure 38:
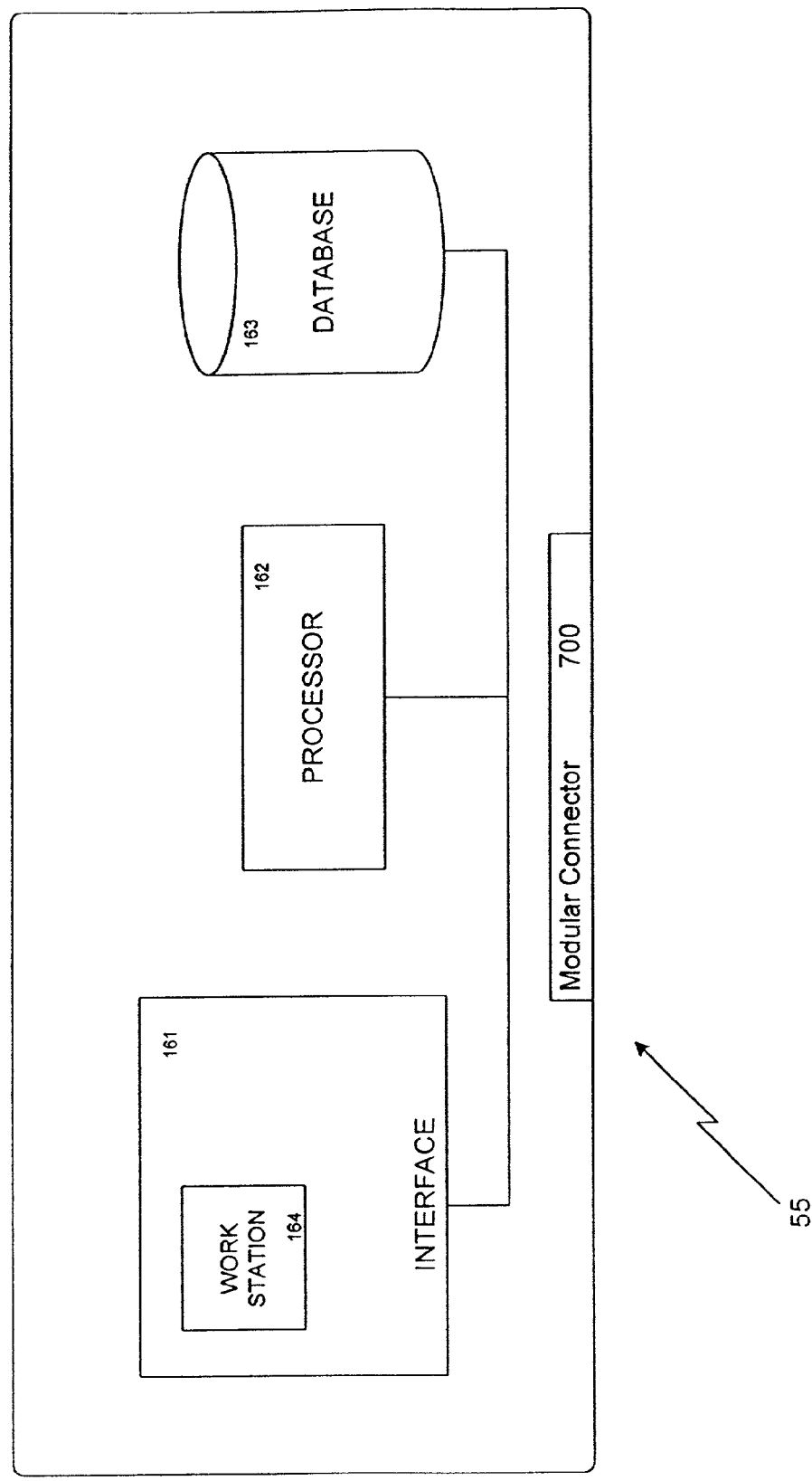
FIG. 38 depicts an interactive virtual object management center.

An interactive virtual object management center 55 is depicted in FIG. 38. The interactive virtual object management center 55 generates interactive virtual objects and provides them to the operations center 10 or any other location where interactive object insertion or delivery may take place. The interactive virtual object management center 55 provides interactive virtual object response management guidelines 57 to an interactive object servicing center 60 which may be used by the interactive object servicing center 60 to determine the appropriate response upon receipt of an interactive request from a reception site 30. As shown in FIG. 38, communications to the interactive object servicing center 60 and to the operations center 10, or to any other location placing virtual objects into content 36, may be done using modular connector 700. An interface 161 provides interactive virtual objects to the operations center 10 and provides the interactive virtual object response management guidelines 57 to an interactive object servicing center 60. The interface 161 can include a workstation, such as the workstation 164, for example, from which an operator manually enters interactive virtual object definition information used to create the interactive virtual object 38. A processor 162 processes the interactive virtual object definition, performs the appropriate action, and stores interactive virtual object information in database 163.

Interactive virtual objects may be used for a variety applications resulting in the initiation of processing at the reception site 30 or initiation of processing by an external device accessible by the reception site 30. In one embodiment, selection of an interactive virtual object 38 may result in the interactive object processor 770 retrieving an optional virtual object software applet 152 from the interactive virtual object 38 and initiating the optional virtual object software applet 152 at the interactive object processor 770, or storing the optional virtual object software applet 152 in an interactive object processor storage 154 for future initiation at the reception site 30, or providing the optional virtual object software applet 152 to an external device. In another embodiment, selection of an interactive virtual object 38 may result in the interactive object processor 770 initiating an optional virtual object software applet 152 that may have been previously received and stored in an interactive object processor storage 154 or resident elsewhere at the reception site 30. In yet another embodiment, selection of an interactive virtual object 38 may result in the interactive object processor 770 generating an interactive virtual object control command 153 to be provided to a device external to the reception site 30. In one embodiment, the interactive virtual object control command 153 may notify the external device to select a different language of audio to be associated with the content 36. In another embodiment, the interactive virtual object control command 153 may notify the external device to initiate the printing of a coupon or document associated with the interactive virtual object 38. In yet another embodiment, the interactive virtual object control command 153 may notify the external device to cause the selection of a different source for content 36, a different channel of content, or different camera angle for the video content 36 being viewed.

Alternatively, in one embodiment, selection of an interactive virtual object 38 may result in the interactive object processor 770 providing interactive virtual object selection data 155 to the selector processor 740 to control which virtual objects are to be displayed at the reception site 30. In this embodiment, the selector processor 740 may control which virtual object 38 is placed in a virtual object location 37 based on the interactive virtual object 38 being selected or past interactive virtual objects selected. Virtual objects associated with a virtual object location 37 may have different fonts or font sizes, allowing the subscriber to zoom in or zoom out from textual information displayed as a virtual object 38 by selecting the appropriate interactive virtual object 38. Virtual objects associated with a virtual object location 37 may have different orientations, allowing the subscriber to select the desired orientation to display by selecting the appropriate interactive virtual object 38. Virtual objects associated with a virtual object location 37 may have multiple layers, allowing the subscriber to peel away layers one by one by selecting the appropriate interactive virtual object 38. Virtual objects associated with a virtual object location 37 may be opaque in the nature, allowing the subscriber to select whether to make the virtual object 38 transparent, displaying the underlying image by selecting the appropriate interactive virtual object 38. Selection of such an interactive virtual object 38 may be password protected, to allow, for example, a parental control feature, where an opaque virtual object 38 is not removable, exposing the content underneath, unless the appropriate password is entered by the subscriber when selecting the interactive virtual object 38.

In another embodiment, selection of an interactive virtual object 38 may result in the interactive object processor 770 providing interactive virtual object selection data 155 to the placement log 730 to record which interactive virtual objects have been viewed or selected by a subscriber. The viewing information may then be provided to the local data collection center 40 or the central data collection center 50 to be used for future virtual object targeting purposes.

In yet another embodiment, selection of an interactive virtual object 38 may result in the interactive object processor 770 providing placement control 156 to the virtual object insertion processor 760, affecting the location of placement of a virtual object 38 in content 36.

In another embodiment, selection of an interactive virtual object 38 may result in the interactive object processor 770 accessing an Internet website and displaying a Webpage on display 35 at the reception site 30 or on an external device.

Figure 39:
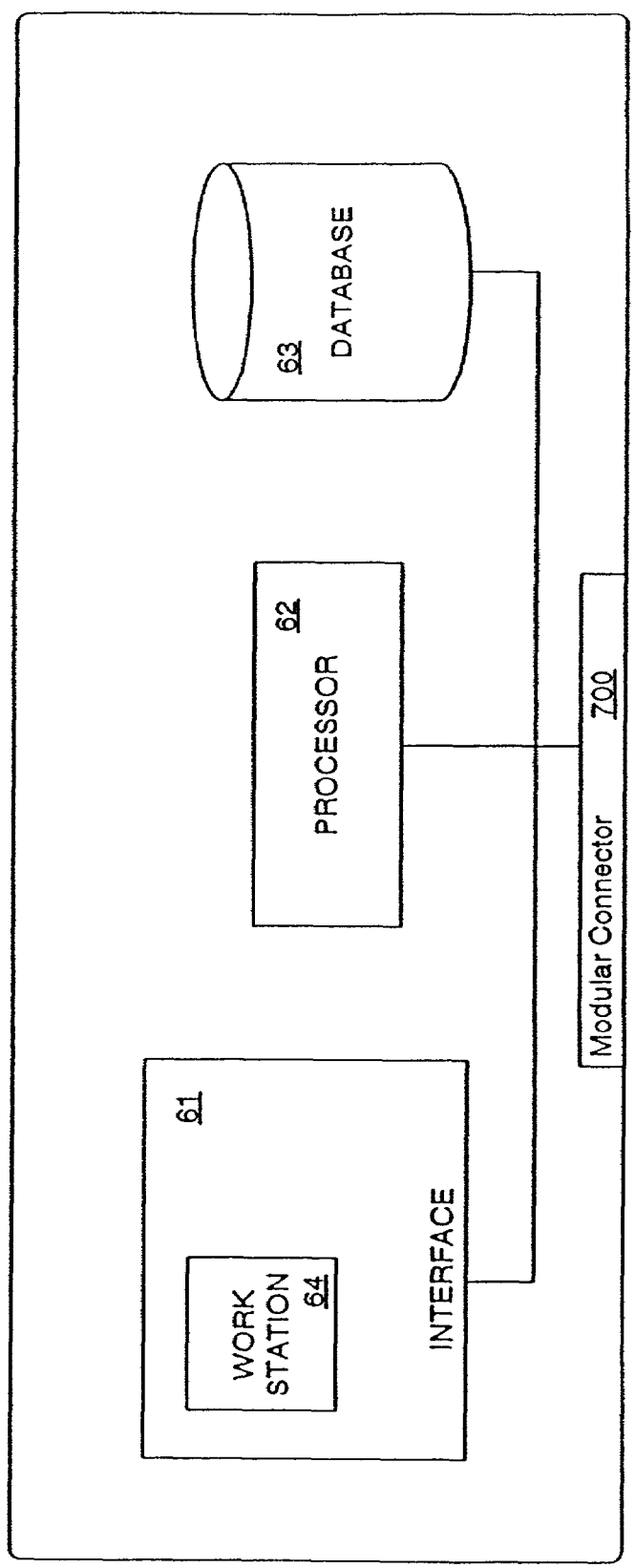
FIG. 39 depicts an interactive object servicing center.
Figure 40:
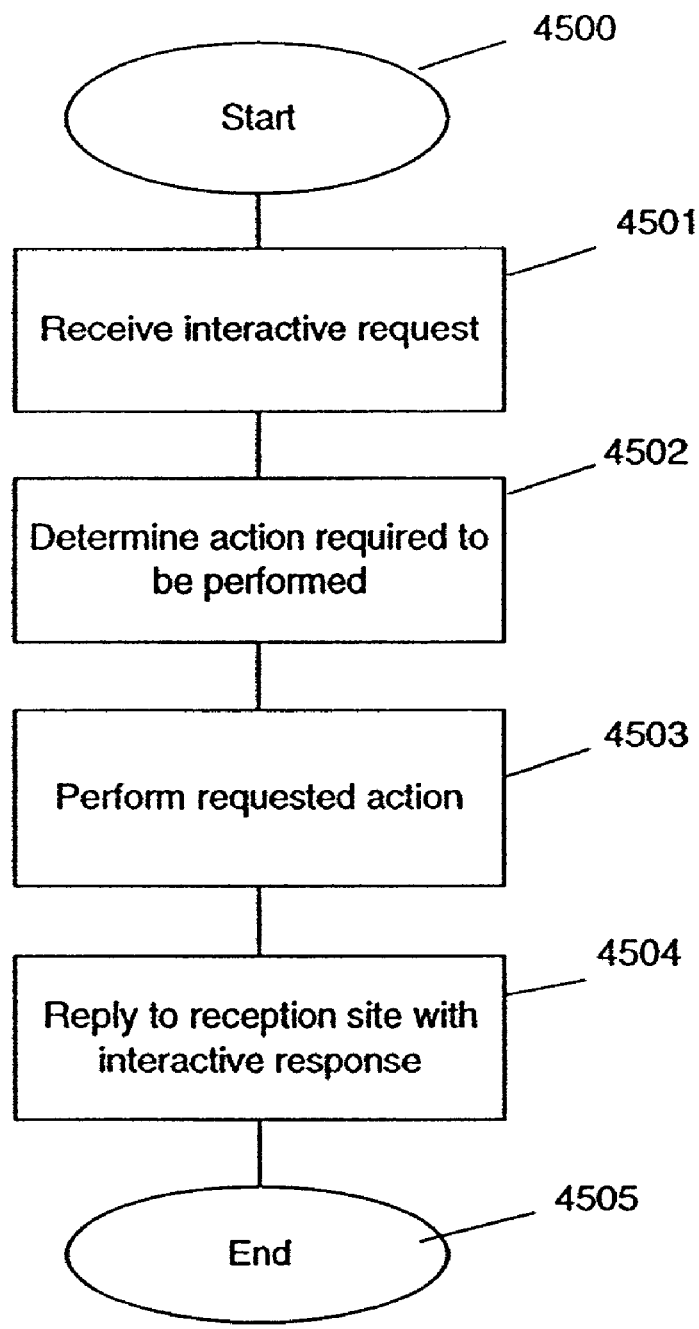
FIG. 40 presents processing performed by an interactive object servicing center.

An interactive object servicing center 60 is depicted in FIG. 39. The interactive object servicing center 60 processes interactive requests and formulates responses to such requests. FIG. 40 presents the process the interactive object servicing center 60 performs. The process begins with block 4500. In block 4501, the interactive object servicing center 60 receives interactive requests from reception sites. In block 4502, the interactive object servicing center 60 determines the appropriate action to be performed based on the received interactive request. In block 4503, the interactive object servicing center 60 performs the appropriate action based on the received interactive request and the interactive virtual object response management guidelines 57 previously provided by the interactive virtual object management center 55. In block 4504, the interactive object servicing center 60 replies to the requesting reception site with an interactive response. Interactive virtual objects may be used for a variety applications resulting in the generation of an interactive request. In one embodiment, an interactive virtual object 38 may result in the generation of an interactive request whereby the interactive object servicing center 60 logs that an interactive virtual object was selected by a reception site 30. This logged information may be used in refining the virtual object targeting algorithm, as this logged information provides a positive indication that a particular segment of content was viewed by a subscriber at the reception site 30. This logged information may alternatively be used by the content provider to bill an advertiser, as the interactive request serves as a positive indication that an advertisement was actively viewed by a subscriber and solicited an action on the part of the subscriber. In another embodiment, an interactive virtual object 38 may result in the generation of an interactive request whereby the interactive object servicing center 60 initiates an electronic transaction that is associated with the selected interactive virtual object 38. For example, the subscriber may have selected an interactive virtual object 38 in a video version of a product catalog and the selection of that interactive virtual object 38 initiates the purchase of the product associated with the selected interactive virtual object 38. In yet another embodiment, selection of an interactive virtual object 38, for example a short video clip on an electronic program guide that is an interactive virtual object, may result in the generation of an interactive request for a video on demand or pay per view purchase, whereby the interactive object servicing center 60 processes the interactive request from the reception site 30 and notifies a video server to begin playback of video on demand content to the requesting reception site 30. In another embodiment, an interactive virtual object 38 may result in the generation of an interactive request whereby the interactive object servicing center 60 responds to the interactive request with an interactive response that contains a software applet to be run on a processor at the reception site 30. In yet another embodiment, an interactive virtual object 38 may result in the generation of an interactive request whereby the interactive object servicing center 60 responds to the interactive request with a webpage to be displayed at the reception site 30.

As shown in FIG. 39, communications to and from the interactive object servicing center 60 over a delivery network may be done using modular connector 700. An interface 61 receives interactive requests from reception sites and receives the interactive virtual object response management guidelines 57 from the interactive virtual object management center 55. The interface 61 can include a workstation, such as the workstation 64, for example, from which an operator manually enters interactive request behavior for the interactive object servicing center 60 or can modify the interactive virtual object response management guidelines 57 received from the interactive virtual object management center 55. A processor 62 processes the received interactive requests and received interactive virtual object response management guidelines 57, performs the appropriate action, retrieving information from database 63 to perform the actions and storing transaction information in database 63 to record the transaction event.

A variety of interactive virtual object targeting delivery systems have been described. One of ordinary skill in the art will recognize that the above description is that of preferred embodiments of the invention and the various changes and modification may be made thereto without departing from the spirit and scope of the invention as defined in the following claims.

The invention claimed is:

1. A method comprising:
    assigning a plurality of interactive virtual advertisement spots to a program;
    generating a retrieval plan; and
    providing the retrieval plan to a terminal, wherein the retrieval plan instructs the terminal to display in one of the virtual advertisement spots an interactive virtual object selected from a ranked list of a plurality of interactive virtual objects, wherein said ranked list is determined at least by a measure of effectiveness for each one of said plurality of interactive virtual objects in each one of said plurality of interactive virtual advertisement spots, wherein each one of the plurality of interactive virtual advertisement spots is in a different spatial location in said program.

2. The method of claim 1, wherein generating the retrieval plan comprises:
    assigning the terminal to one or more groups; and
    assigning each of the one or more of the groups to one or more of the plurality of interactive virtual objects.

3. The method of claim 2, wherein the step of assigning the terminal to one or more groups comprises:
    generating group assignment rules;
    delivering group assignment rules to the terminal;
    storing the group assignment rules at the terminal; and
    determining one or more group assignments based on the group assignment rules and data related to the terminal.

4. The method of claim 3, wherein the data related to the terminal includes one or more of Area of Dominant Influence (ADI), zip code, demographic data and programs watched data, virtual objects viewed, on-screen questionnaires and characteristics imported from marketing databases;

the method further comprising updating the group assignments to reflect changes in the ADI, zip code the demographic data, the programs watched data the virtual objects viewed, the on-screen questionnaires, and the characteristics imported from marketing databases.

5. The method of claim 1, further comprising periodically sending the retrieval plan and group assignment rules to the terminal.

6. The method of claim 1 wherein each different spatial location in said program is a different location within a scene of the program.

7. The method of claim 1 wherein each different spatial location in said program is a different location within a frame of the program.

8. A method of targeting interactive virtual objects, comprising:

providing a program containing a plurality of interactive virtual object locations to a terminal;

providing one or more of a plurality of interactive virtual objects for each one of the plurality of the interactive virtual object locations to the terminal, wherein said one or more of the plurality of interactive virtual objects are selected from a ranked list of the plurality of interactive virtual objects, said ranked list is determined at least by a measure of effectiveness for each one of said plurality of interactive virtual objects in each one of said plurality of interactive virtual object locations, and each one of the plurality of interactive virtual object locations is in a different spatial location in said program;

providing a retrieval plan to the terminal, wherein the retrieval plan designates, for one or more of the plurality of interactive object locations, which of the provided one or more interactive virtual objects to display.

9. The method of claim 8, wherein the program is a television program.

10. The method of claim 8, wherein the program is one of an advertisement, an electronic program guide, and an Internet web page.

11. The method of claim 8, wherein at least one of the plurality of interactive virtual object locations is fixed in position across frames of the program.

12. The method of claim 8, wherein at least one of the plurality of interactive virtual object locations moves spatially in the program with time.

13. The method of claim 8, further comprising providing at least one non-interactive virtual object.

14. The method of claim 8, wherein the terminal is a television set top terminal.

15. The method of claim 8, wherein the terminal is incorporated into one of a television, a personal computer and a PDA with video viewing capabilities.

16. The method of claim 8, wherein the terminal is coupled to a satellite television receiver.

17. The method of claim 8, wherein the retrieval plan is periodically provided with the transmission of the program in a transmission to the terminal.

18. The method of claim 8 further comprising providing a group assignment matrix to the terminal, wherein:

the group assignment matrix classifies the terminal into one or more different predefined groups within each of one or more target user categories, and the retrieval plan designates which of the provided one or more interactive objects to display in the one or more interactive object locations by associating the target categories and the predefined groups with the one or more interactive objects and the one or more interactive object locations.

19. The method of claim 18, further comprising generating the group assignment matrix, wherein the predefined groups within one of the target categories are defined based on characteristics of users.

20. The method of claim 19, wherein the characteristics include user demographic information.

21. The method of claim 19, wherein the characteristics include user entered information.

22. The method of claim 19, wherein the characteristics include programs watched data.

23. The method of claim 19, wherein the characteristics include interactive virtual objects watched data.

24. The method of claim 19, wherein the characteristics include user activation of the interactive virtual objects.

25. The method of claim 18, wherein generating the retrieval plan comprises:

associating one of the target user categories with one of the interactive object locations;

associating each predefined group within the associated one of the target user categories with a respective one of the interactive objects.

26. The method of claim 8, wherein the ranked list is determined by:

scoring a compatibility of program content surrounding a first interactive virtual object location of the interactive virtual object locations with a targeted group of users, scoring compatibilities of each of the plurality of interactive virtual objects with the targeted group of users; and ranking each of the plurality of interactive virtual objects displayed in the first one interactive virtual object location based on combining the scoring of the program content and the scoring of each interactive virtual object.

27. The method of claim 26, wherein the ranked list is further determined by:

scoring a compatibility of program content surrounding a second interactive virtual object location of the interactive virtual object locations with the targeted group of users, and ranking different pairs of the plurality of interactive virtual objects displayed in the first and second interactive virtual object locations and based on combining the scoring of the program content surrounding the first interactive virtual object location, the scoring of the program content surrounding the second interactive virtual object location, and the scoring of each interactive virtual object.

28. The method of claim 8 wherein each different spatial location in said program is a different location within a scene of the program.

29. The method of claim 8 wherein each different spatial location in said program is a different location within a frame of the program.

30. A method comprising:

receiving a program, a plurality of interactive virtual objects, and a retrieval plan at a terminal, wherein the program includes a plurality of interactive virtual object locations, the retrieval plan designates one or more of said plurality of interactive virtual objects to be displayed during a display of the program selected from a ranked list of said plurality of interactive virtual objects, the ranked list is determined at least by a measure of effectiveness for each one of said plurality of interactive virtual objects in each one of said plurality of interactive virtual object locations, and each one of the plurality of interactive virtual object locations is in a different spatial location in said program; and displaying one or more of the interactive virtual objects in one or more of the interactive virtual object locations of the program according to the retrieval plan.

31. The method of claim 30, wherein displaying, comprises:

comparing a group assignment matrix to the retrieval plan, wherein the group assignment matrix assigns the terminal to a targeted user group; and selecting an interactive virtual object for display based on the comparison.

32. The method of claim 31, further comprising generating the group assignment matrix including receiving group assignment rules; and determining one or more group assignments at the terminal based on the group assignment rules and individual terminal data or terminal group data.

33. The method of claim 32, wherein the individual terminal data, comprises one or more of viewer demographic data, programs watched data, virtual objects viewed data, on-screen questionnaires, and characteristics imported from marketing databases, and wherein the terminal group data, comprises one or more ADI, zip code, and geographical data.

34. The method of claim 32, wherein the group assignment rules are stored in the terminal.

35. The method of claim 30, further comprising:

linking a terminal selecting the at least one displayed interactive virtual object to an alternate program.

36. The method of claim 35, wherein the alternate program comprises an Internet web site.

37. The method of claim 30 wherein each different spatial location in said program is a different location within a scene of the program.

38. The method of claim 30 wherein each different spatial location in said program is a different location within a frame of the program.

39. A terminal comprising:

a network interface configured to receive a plurality of interactive virtual objects and a plurality of interactive virtual object locations and metadata an interactive virtual objects extractor processor coupled to the network interface and configured to extract the plurality of interactive virtual objects, the plurality of interactive virtual object locations and the metadata;

a storage processor coupled to the extractor configured to determine which of the extracted plurality of interactive virtual objects are targeted to the terminal and save the extracted targeted interactive virtual objects in a memory; and an interactive virtual object selector processor coupled to the storage processor and configured to determine an interactive virtual object placement for one or more saved interactive virtual objects selected from a ranked list of said plurality of interactive virtual objects, wherein said ranked list is determined at least by a measure of effectiveness for each one of said plurality of interactive virtual objects in each one of said plurality of interactive virtual object locations, and each one of the plurality of interactive virtual advertisement object locations is in a different spatial location in a program.

40. The terminal of claim 39, wherein the plurality of interactive virtual objects are received with programming content of the program, and wherein the extractor processor is configured to extract the plurality of interactive virtual objects from the programming content.

41. The terminal of claim 39, wherein the plurality of interactive virtual objects are received independently of programming content of the program.

42. The terminal of claim 41, wherein the plurality of interactive virtual objects are received over the Internet.

43. The terminal of claim 39, wherein the terminal is a terminal in a television program delivery system.

44. The terminal of claim 43, wherein the terminal is a set top terminal.

45. The terminal of claim 43, wherein the terminal is a television.

46. The terminal of claim 39, wherein the terminal is one of a personal computer, a personal data assistant, and a wireless telephone.

47. The terminal of claim 39, wherein the selector processor is further configured to:

log the placement of an interactive virtual object and an interactive response to the interactive virtual object in the memory, and use the placement and the response in determining placements of future interactive virtual objects.

48. The terminal of claim 39 wherein each different spatial location in said program is a different location within a scene of the program.

49. The terminal of claim 39 wherein each different spatial location in said program is a different location within a frame of the program.

50. A method comprising:

creating a package of a plurality of interactive virtual objects, wherein said plurality of interactive virtual objects are dynamic;

providing the package to a plurality of terminals;

generating a group assignment matrix, wherein the group assignment matrix assigns the terminals to groups;

generating a retrieval plan;

providing a program to one or more of the terminals, the program including a plurality of interactive virtual object locations, wherein the retrieval plan designates one or more of the plurality of interactive virtual objects to be displayed in the plurality of interactive virtual object locations during a display of the program, wherein said plurality of interactive virtual objects are selected from a ranked list of the plurality of interactive virtual objects, wherein said ranked list is determined at least by a measure of effectiveness for each one of said plurality of interactive virtual objects in each one of said plurality of interactive virtual object locations, and each one of the plurality of interactive virtual advertisement object locations is in a different spatial location in said program.

51. The method of claim 50, wherein at least one of said plurality of interactive virtual objects includes triggers that initiate a signal from the terminals the method further comprising:

receiving a trigger from one of the terminals;

retrieving an interactive virtual object trigger action in response to receipt of the trigger; and determining that the interactive virtual object trigger action requires initiation of an interactive request.

52. The method of claim 51, the method further comprising:

sending the interactive request to the terminal which sent the trigger;

awaiting an interactive response from the terminal which sent the trigger; and initiating an interactive action based on the interactive response.

53. The method of claim 50, further comprising:
linking a terminal selecting the at least one designated interactive virtual object to an alternate program.

54. The method of claim 53, wherein the alternative program comprises an Internet web site.

55. The method of claim 50 wherein each different spatial location in said program is a different location within a scene of the program.

56. The method of claim 50 wherein each different spatial location in said program is a different location within a frame of the program.

57. A system comprising:
an operations center including a network interface and one or more processors configured to:
provide, through a network, a program containing a plurality of interactive virtual object locations to a terminal;
provide one or more of a plurality of interactive virtual objects for each one of the plurality of the interactive virtual object locations to the terminal, wherein said one or more of the plurality of interactive virtual objects are selected from a ranked list of the plurality of interactive virtual objects, wherein said ranked list is determined at least by a measure of effectiveness for each one of said plurality of interactive virtual objects in each one of said plurality of interactive virtual object locations, and each one of the plurality of interactive virtual object locations is in a different spatial location in said program;
provide a retrieval plan to the terminal, wherein the retrieval plan designates, for one or more of the plurality of interactive object locations, which of the provided one or more interactive virtual objects to display; and
a terminal comprising:
one or more terminal network interfaces configured to receive the program, the plurality of interactive virtual objects, and the retrieval plan;
an interactive virtual objects extractor processor coupled to the terminal network interfaces and configured to extract the plurality of interactive virtual objects, the plurality of interactive virtual object locations and the retrieval plan;
a storage processor coupled to the extractor configured to determine which of the extracted plurality of interactive virtual objects are targeted to the terminal and save the extracted targeted interactive virtual objects in a memory; and
an interactive virtual object selector processor coupled to the storage processor configured to determine an interactive virtual object placement for the one or more stored interactive virtual objects.

58. The system of claim 57, wherein the selector processor is further configured to:
log the placement of an interactive virtual object and an interactive response to the interactive virtual object in the memory, and
communicate the placement and the response to the operation center.

59. The system of claim 57 wherein each different spatial location in said program is a different location within a scene of the program.

60. The system of claim 57 wherein each different spatial location in said program is a different location within a frame of the program.

61. The system of claim 57, wherein the plurality of interactive virtual objects are provided to the terminal by one of a cable television system, a wireless broadcast system, a satellite broadcast system, a wired data network, a wireless PCS network, and a terrestrial television broadcast network.

62. The system of claim 57, wherein the plurality of interactive virtual objects and the retrieval plan are derived through the network with the program.

63. The system of claim 62, wherein the one or more terminal network interfaces are further configured to receive replacement interactive virtual objects and a replacement interactive virtual object retrieval plan, wherein the replacement interactive virtual objects and the replacement retrieval plan are delivered from the operations center.

64. The system of claim 57, wherein an interactive virtual object of the plurality of interactive virtual objects, comprises:
an interactive virtual object identifier;
interactive virtual object placement rules, wherein the rules provide guidance to the terminal in managing insertion of interactive virtual objects into the program content;
a digital representation of the interactive virtual object; and
an interactive virtual object trigger action that defines an action to be taken upon triggering of the virtual object at the terminal.

65. The system of claim 64, wherein the interactive virtual object further comprises a virtual object applet that provides software capable of initiation by a source external to the terminal.

66. The system of claim 64, wherein the interactive virtual object trigger action initiated an interactive request to a location external to the terminal.

67. The system of claim 66, wherein the location external to the system further comprises:
an interactive virtual object management center; and
an interactive virtual object servicing center coupled to the interactive virtual object management center, wherein the management center provides interactive virtual object response management guidelines to the servicing center, and wherein the guidelines determine an appropriate response based on receipt of an interactive request from the terminal.

68. The system of claim 57, wherein the terminal further comprises:
an interactive virtual object extractor that extracts interactive virtual objects from data received at the terminal;
an interactive virtual object location detector processor, coupled to the extractor, that determines the allowable content locations for the plurality of interactive virtual objects; and
an interactive virtual object insertion processor, coupled to the selector processor, that inserts the selected interactive virtual objects into the allowable content locations.

69. The system of claim 68, wherein the terminal further comprises a storage management processor coupled to the extractor, wherein the management processor uses an interactive virtual object retrieval plan to determine which received interactive virtual objects are to be stored at the terminal.

70. The system of claim 57, wherein the plurality of interactive virtual objects are selectable by a user at the terminal.

71. The system of claim 70, wherein an interactive selection by the user is processed automatically by the terminal.

* * * * *